US012783577B2

(12) United States Patent
Graham et al.

(10) Patent No.: US 12,783,577 B2
(45) Date of Patent: *Nov. 3, 2026

(54) INTELLIGENT AUTOMATED ASSISTANT FOR MEDIA EXPLORATION

(71) Applicant: Apple Inc., Cupertino, CA (US)

(72) Inventors: David Chance Graham, Columbus, OH (US); Cyrus Daniel Irani, Menlo Park, CA (US); Aimee Piercy, Mountain View, CA (US); Thomas Alsina, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/669,458

(22) Filed: May 20, 2024

(65) Prior Publication Data

US 2024/0303268 A1 Sep. 12, 2024

Related U.S. Application Data

(63) Continuation of application No. 18/138,234, filed on Apr. 24, 2023, now Pat. No. 12,026,197, which is a (Continued)

(30) Foreign Application Priority Data

Jun. 1, 2017 (DK) ............................. PA201770425
Jun. 1, 2017 (DK) ............................. PA201770426

(51) Int. Cl.
*G10L 15/22* (2006.01)
*G06F 3/16* (2006.01)

(Continued)

(52) U.S. Cl.
CPC ............ *G06F 16/634* (2019.01); *G06F 3/167* (2013.01); *G06F 9/453* (2018.02);

(Continued)

(58) Field of Classification Search
CPC ..... G10L 15/1815; G10L 15/22; G10L 15/30; G10L 2015/223; G10L 15/26;

(Continued)

(56) References Cited

U.S. PATENT DOCUMENTS 6,584,180 B2 6/2003 Nemoto
6,975,994 B2 * 12/2005 Black ...................... G10L 15/26 704/235

(Continued)

FOREIGN PATENT DOCUMENTS

AU 2014100581 B4 9/2014
AU 2015203483 A1 7/2015

(Continued)

OTHER PUBLICATIONS

Office Action received for Chinese Patent Application No. 201880000763.2, mailed on Apr. 28, 2025, 20 pages (11 pages of English Translation and 9 pages of Official Copy).

(Continued)

*Primary Examiner* — Vijay B Chawan
(74) *Attorney, Agent, or Firm* — YHE Law LLP

(57) ABSTRACT

Systems and processes for operating an intelligent automated assistant are provided. In accordance with one example, a method includes, at an electronic device with one or more processors and memory, receiving a first natural-language speech input indicative of a request for media, where the first natural-language speech input comprises a first search parameter; providing, by a digital assistant, a first media item identified based on the first search parameter. The method further includes, while providing the first media item, receiving a second natural-language speech input and determining whether the second input corresponds to a user intent of refining the request for media. The method further includes, in accordance with a determination that the second (Continued)

speech input corresponds to a user intent of refining the request for media: identifying, based on the first parameter and the second speech input, a second media item and providing the second media item.

37 Claims, 23 Drawing Sheets

Related U.S. Application Data continuation of application No. 17/162,448, filed on Jan. 29, 2021, now Pat. No. 11,675,829, which is a continuation of application No. 16/290,737, filed on Mar. 1, 2019, now Pat. No. 10,909,171, which is a continuation of application No. 15/940,203, filed on Mar. 29, 2018, now abandoned.

(60) Provisional application No. 62/506,981, filed on May 16, 2017.

(51) Int. Cl.

| | |
|---|---|
| ***G06F 9/451*** | (2018.01) |
| ***G06F 16/3329*** | (2025.01) |
| ***G06F 16/432*** | (2019.01) |
| ***G06F 16/435*** | (2019.01) |
| ***G06F 16/632*** | (2019.01) |
| ***G06F 16/635*** | (2019.01) |
| ***G06F 16/683*** | (2019.01) |
| ***G10L 15/18*** | (2013.01) |
| ***G10L 15/30*** | (2013.01) |

(52) U.S. Cl.

CPC ........ *G06F 16/3329* (2019.01); *G06F 16/433* (2019.01); *G06F 16/435* (2019.01); *G06F 16/635* (2019.01); *G06F 16/685* (2019.01); *G10L 15/1815* (2013.01); *G10L 15/22* (2013.01); *G10L 15/30* (2013.01); *G10L 2015/223* (2013.01)

(58) Field of Classification Search

CPC ... G10L 17/22; G10L 2015/228; G10L 15/00; G10L 25/84; G10L 15/32; G10L 15/01

USPC .......................................................... 704/270

See application file for complete search history.

(56) References Cited

U.S. PATENT DOCUMENTS

| | | | |
|---|---|---|---|
| 7,684,990 | B2 | 3/2010 | Caskey et al. |
| 7,716,077 | B1 | 5/2010 | Mikurak |
| 8,032,409 | B1 | 10/2011 | Mikurak |
| 8,433,572 | B2 | 4/2013 | Caskey et al. |
| 8,473,485 | B2 | 6/2013 | Wong et al. |
| 8,560,366 | B2 | 10/2013 | Mikurak |
| 8,626,681 | B1 | 1/2014 | Jurca et al. |
| 8,630,841 | B2 | 1/2014 | Van Caldwell et al. |
| 8,635,073 | B2 | 1/2014 | Chang |
| 8,638,363 | B2 | 1/2014 | King et al. |
| 8,639,516 | B2 | 1/2014 | Lindahl et al. |
| 8,645,128 | B1 | 2/2014 | Agiomyrgiannakis |
| 8,645,137 | B2 | 2/2014 | Bellegarda et al. |
| 8,645,138 | B1 | 2/2014 | Weinstein et al. |
| 8,654,936 | B1 | 2/2014 | Eslambolchi et al. |
| 8,655,646 | B2 | 2/2014 | Lee et al. |
| 8,655,901 | B1 | 2/2014 | Li et al. |
| 8,660,843 | B2 | 2/2014 | Falcon et al. |
| 8,660,849 | B2 | 2/2014 | Gruber et al. |
| 8,660,924 | B2 | 2/2014 | Hoch et al. |
| 8,660,970 | B1 | 2/2014 | Fiedorowicz |
| 8,661,112 | B2 | 2/2014 | Creamer et al. |
| 8,661,340 | B2 | 2/2014 | Goldsmith et al. |
| 8,670,979 | B2 | 3/2014 | Gruber et al. |
| 8,675,084 | B2 | 3/2014 | Bolton et al. |
| 8,676,273 | B1 | 3/2014 | Fujisaki |
| 8,676,583 | B2 | 3/2014 | Gupta et al. |
| 8,676,904 | B2 | 3/2014 | Lindahl |
| 8,677,377 | B2 | 3/2014 | Cheyer et al. |
| 8,681,950 | B2 | 3/2014 | Mack et al. |
| 8,682,667 | B2 | 3/2014 | Haughay |
| 8,687,777 | B1 | 4/2014 | Lavian et al. |
| 8,688,446 | B2 | 4/2014 | Yanagihara |
| 8,688,453 | B1 | 4/2014 | Joshi et al. |
| 8,689,135 | B2 | 4/2014 | Portele et al. |
| 8,694,322 | B2 | 4/2014 | Snitkovskiy et al. |
| 8,695,074 | B2 | 4/2014 | Saraf et al. |
| 8,696,364 | B2 | 4/2014 | Cohen |
| 8,706,472 | B2 | 4/2014 | Ramerth et al. |
| 8,706,474 | B2 | 4/2014 | Blume et al. |
| 8,706,503 | B2 | 4/2014 | Cheyer et al. |
| 8,707,195 | B2 | 4/2014 | Fleizach et al. |
| 8,707,419 | B2 | 4/2014 | Kurapati et al. |
| 8,712,778 | B1 | 4/2014 | Thenthiruperai |
| 8,713,119 | B2 | 4/2014 | Lindahl et al. |
| 8,713,418 | B2 | 4/2014 | King et al. |
| 8,719,006 | B2 | 5/2014 | Bellegarda |
| 8,719,014 | B2 | 5/2014 | Wagner |
| 8,719,039 | B1 | 5/2014 | Sharifi |
| 8,731,610 | B2 | 5/2014 | Appaji |
| 8,731,912 | B1 | 5/2014 | Tickner et al. |
| 8,731,942 | B2 | 5/2014 | Cheyer et al. |
| 8,739,208 | B2 | 5/2014 | Davis et al. |
| 8,744,852 | B1 | 6/2014 | Seymour et al. |
| 8,751,971 | B2 | 6/2014 | Fleizach et al. |
| 8,760,537 | B2 | 6/2014 | Johnson et al. |
| 8,762,145 | B2 | 6/2014 | Ouchi et al. |
| 8,762,156 | B2 | 6/2014 | Chen |
| 8,762,469 | B2 | 6/2014 | Lindahl |
| 8,768,693 | B2 | 7/2014 | Somekh et al. |
| 8,768,702 | B2 | 7/2014 | Mason et al. |
| 8,775,154 | B2 | 7/2014 | Clinchant et al. |
| 8,775,177 | B1 | 7/2014 | Heigold et al. |
| 8,775,341 | B1 | 7/2014 | Commons |
| 8,775,931 | B2 | 7/2014 | Fux et al. |
| 8,781,456 | B2 | 7/2014 | Prociw |
| 8,781,841 | B1 | 7/2014 | Wang |
| 8,788,271 | B2 | 7/2014 | James et al. |
| 8,793,301 | B2 | 7/2014 | Wegenkittl et al. |
| 8,798,255 | B2 | 8/2014 | Lubowich et al. |
| 8,798,995 | B1 | 8/2014 | Edara |
| 8,799,000 | B2 | 8/2014 | Guzzoni et al. |
| 8,805,684 | B1 | 8/2014 | Aleksic et al. |
| 8,805,690 | B1 | 8/2014 | Lebeau et al. |
| 8,812,299 | B1 | 8/2014 | Su |
| 8,812,302 | B2 | 8/2014 | Xiao et al. |
| 8,812,321 | B2 | 8/2014 | Gilbert et al. |
| 8,823,507 | B1 | 9/2014 | Touloumtzis |
| 8,823,793 | B2 | 9/2014 | Clayton et al. |
| 8,825,474 | B1 | 9/2014 | Zhai et al. |
| 8,831,947 | B2 | 9/2014 | Wasserblat et al. |
| 8,831,949 | B1 | 9/2014 | Smith et al. |
| 8,838,457 | B2 | 9/2014 | Cerra et al. |
| 8,843,369 | B1 | 9/2014 | Sharifi |
| 8,855,915 | B2 | 10/2014 | Furuhata et al. |
| 8,861,925 | B1 | 10/2014 | Ohme |
| 8,862,252 | B2 | 10/2014 | Rottler et al. |
| 8,868,111 | B1 | 10/2014 | Kahn et al. |
| 8,868,400 | B2 | 10/2014 | Susarla et al. |
| 8,868,409 | B1 | 10/2014 | Mengibar et al. |
| 8,868,431 | B2 | 10/2014 | Yamazaki et al. |
| 8,868,469 | B2 | 10/2014 | Xu et al. |
| 8,868,529 | B2 | 10/2014 | Lerenc |
| 8,880,405 | B2 | 11/2014 | Cerra et al. |
| 8,886,534 | B2 | 11/2014 | Nakano et al. |
| 8,886,540 | B2 | 11/2014 | Cerra et al. |
| 8,886,541 | B2 | 11/2014 | Friedlander |
| 8,892,446 | B2 | 11/2014 | Cheyer et al. |
| 8,893,023 | B2 | 11/2014 | Perry et al. |
| 8,897,822 | B2 | 11/2014 | Martin |
| 8,898,064 | B1 | 11/2014 | Thomas et al. |
| 8,898,568 | B2 | 11/2014 | Bull et al. |

(56) References Cited

U.S. PATENT DOCUMENTS 8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,954,440 B1 2/2015 Gattani et al.
8,964,947 B1 2/2015 Noolu et al.
8,965,770 B2 2/2015 Petrushin
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,984,098 B1 3/2015 Tomkins et al.
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,550 B2 3/2015 Ko et al.
8,996,639 B1 3/2015 Faaborg et al.
9,002,714 B2 4/2015 Kim et al.
9,009,046 B1 4/2015 Stewart
9,013,992 B2 4/2015 Perkins
9,015,036 B2 4/2015 Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,210 B1 5/2015 Adcock et al.
9,043,211 B2 5/2015 Haiut et al.
9,043,319 B1 5/2015 Burns et al.
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,075,824 B2 7/2015 Gordo et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,087,508 B1 7/2015 Dzik
9,092,433 B2 7/2015 Rodriguez
9,092,789 B2 7/2015 Anshul
9,094,576 B1 7/2015 Karakotsios
9,094,636 B1 7/2015 Sanders et al.
9,098,467 B1 8/2015 Blanksteen et al.
9,101,279 B2 8/2015 Ritchey et al.
9,110,635 B2 8/2015 Knox et al.
9,112,984 B2 8/2015 Sejnoha et al.
9,117,212 B2 8/2015 Sheets et al.
9,117,447 B2 8/2015 Gruber et al.
9,122,697 B1 9/2015 Bono et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,172,747 B2 10/2015 Walters et al.
9,183,845 B1 11/2015 Gopalakrishnan et al.
9,190,062 B2 11/2015 Haughay
9,196,245 B2 11/2015 Larcheveque et al.
9,197,848 B2 11/2015 Felkai et al.
9,201,955 B1 12/2015 Quintao et al.
9,202,520 B1 12/2015 Tang
9,208,153 B1 12/2015 Zaveri et al.
9,213,754 B1 12/2015 Zhan et al.
9,214,137 B2 12/2015 Bala et al.
9,218,122 B2 12/2015 Thoma et al.
9,218,809 B2 12/2015 Bellegard et al.
9,218,819 B1 12/2015 Stekkelpa et al.
9,223,529 B1 12/2015 Khafizova
9,223,537 B2 12/2015 Brown et al.
9,230,561 B2 1/2016 Ostermann et al.
9,232,293 B1 1/2016 Hanson
9,236,047 B2 1/2016 Rasmussen
9,240,022 B2 1/2016 Treyz et al.
9,241,073 B1 1/2016 Rensburg et al.
9,245,151 B2 1/2016 LeBeau et al.
9,245,388 B2 1/2016 Poulos et al.
9,246,984 B2 1/2016 Zises
9,247,377 B2 1/2016 Pai et al.
9,247,525 B2 1/2016 Jacobs et al.
9,250,703 B2 2/2016 Hernandez-Abrego et al.
9,251,713 B1 2/2016 Giovanniello et al.
9,251,787 B1 2/2016 Hart et al.
9,255,812 B2 2/2016 Maeoka et al.
9,256,596 B2 2/2016 Nissan et al.
9,257,120 B1 2/2016 Guevara et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,274,598 B2 3/2016 Beymer et al.
9,280,535 B2 * 3/2016 Varma .................. G06F 16/243
9,282,211 B2 3/2016 Osawa
9,286,727 B2 3/2016 Kim et al.
9,286,910 B1 3/2016 Li et al.
9,292,487 B1 3/2016 Weber
9,292,489 B1 3/2016 Sak et al.
9,292,492 B2 3/2016 Sarikaya et al.
9,298,358 B1 3/2016 Wilden et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,057 B2 5/2016 Jangra et al.
9,338,242 B1 5/2016 Suchland et al.
9,338,493 B2 5/2016 Van Os et al.
9,342,829 B2 5/2016 Zhou et al.
9,342,930 B1 5/2016 Kraft et al.
9,349,368 B1 5/2016 Lebeau et al.
9,355,472 B2 5/2016 Kocienda et al.
9,361,084 B1 6/2016 Costa
9,361,625 B2 6/2016 Parker et al.
9,367,541 B1 6/2016 Servan et al.
9,368,114 B2 6/2016 Larson et al.

(56) References Cited

U.S. PATENT DOCUMENTS 9,377,865 B2 6/2016 Berenson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,400,779 B2 7/2016 Convertino et al.
9,401,140 B1 7/2016 Weber et al.
9,401,147 B2 7/2016 Jitkoff et al.
9,405,741 B1 8/2016 Schaaf et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 8/2016 Clark et al.
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,445,230 B1 9/2016 Sipher et al.
9,454,599 B2 9/2016 Golden et al.
9,454,957 B1 9/2016 Mathias et al.
9,460,713 B1 10/2016 Mengibar et al.
9,465,798 B2 10/2016 Lin
9,465,833 B2 * 10/2016 Aravamudan ...... G06F 16/3328
9,465,864 B2 10/2016 Hu et al.
9,466,027 B2 10/2016 Byrne et al.
9,466,121 B2 10/2016 Yang et al.
9,466,294 B1 10/2016 Tunstall-Pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,483,529 B1 11/2016 Pasoi et al.
9,484,021 B1 11/2016 Mairesse et al.
9,485,286 B1 11/2016 Sellier et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,516,014 B2 12/2016 Zafiroglu et al.
9,519,453 B2 12/2016 Perkuhn et al.
9,524,355 B2 12/2016 Forbes et al.
9,529,500 B1 12/2016 Gauci et al.
9,531,803 B2 12/2016 Chen et al.
9,531,823 B1 12/2016 Suchland et al.
9,531,862 B1 12/2016 Vadodaria
9,535,906 B2 1/2017 Lee et al.
9,536,518 B2 1/2017 Itoh et al.
9,536,527 B1 1/2017 Carlson
9,536,544 B2 1/2017 Osterman et al.
9,547,647 B2 1/2017 Badaskar
9,548,050 B2 1/2017 Gruber et al.
9,548,053 B1 1/2017 Basye et al.
9,548,979 B1 1/2017 Johnson et al.
9,569,549 B1 2/2017 Jenkins et al.
9,571,645 B2 2/2017 Quast et al.
9,571,995 B1 2/2017 Scheer et al.
9,574,894 B1 2/2017 Karakotsios et al.
9,575,964 B2 2/2017 Yadgar et al.
9,576,575 B2 2/2017 Heide
9,578,173 B2 2/2017 Sanghavi et al.
9,584,946 B1 2/2017 Lyren et al.
9,586,318 B2 3/2017 Djugash et al.
9,602,946 B2 3/2017 Karkkainen et al.
9,606,986 B2 3/2017 Bellegarda
9,607,612 B2 3/2017 Deleeuw
9,612,999 B2 4/2017 Prakah-Asante et al.
9,619,200 B2 4/2017 Chakladar et al.
9,619,459 B2 4/2017 Hebert et al.
9,620,113 B2 4/2017 Kennewick et al.
9,620,126 B2 4/2017 Chiba
9,626,695 B2 4/2017 Balasubramanian et al.
9,626,799 B2 4/2017 McArdle et al.
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,633,674 B2 4/2017 Sinha
9,646,313 B2 5/2017 Kim et al.
9,648,107 B1 5/2017 Penilla et al.
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,672,822 B2 6/2017 Brown et al.
9,678,664 B2 6/2017 Zhai et al.
9,679,570 B1 6/2017 Edara
9,690,542 B2 6/2017 Reddy et al.
9,691,161 B1 6/2017 Yalniz et al.
9,691,378 B1 6/2017 Meyers et al.
9,691,384 B1 6/2017 Wang et al.
9,696,963 B2 7/2017 Son et al.
9,697,016 B2 7/2017 Jacob
9,697,822 B1 7/2017 Naik et al.
9,697,827 B1 7/2017 Lilly et al.
9,697,828 B1 7/2017 Prasad et al.
9,697,829 B1 7/2017 Tickner et al.
9,698,999 B2 7/2017 Mutagi
9,711,148 B1 7/2017 Sharifi et al.
9,715,875 B2 7/2017 Piernot et al.
9,720,907 B2 8/2017 Bangalore et al.
9,721,566 B2 8/2017 Newendorp et al.
9,721,570 B1 8/2017 Beal et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,754,591 B1 9/2017 Kumar et al.
9,755,605 B1 9/2017 Li et al.
9,760,566 B2 9/2017 Heck et al.
9,767,710 B2 9/2017 Lee et al.
9,772,994 B2 9/2017 Karov et al.
9,786,271 B1 10/2017 Combs et al.
9,792,907 B2 10/2017 Bocklet et al.
9,798,719 B2 10/2017 Karov et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,824,379 B2 11/2017 Khandelwal et al.
9,824,691 B1 11/2017 Montero et al.
9,824,692 B1 11/2017 Khoury et al.
9,830,044 B2 11/2017 Brown et al.
9,830,449 B1 11/2017 Wagner
9,842,168 B2 12/2017 Heck et al.
9,842,584 B1 12/2017 Hart et al.
9,846,685 B2 12/2017 Li
9,846,836 B2 12/2017 Gao et al.
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,891,811 B2 2/2018 Federighi et al.
9,892,732 B1 2/2018 Tian et al.
9,911,415 B2 3/2018 Vanblon et al.

(56) References Cited

U.S. PATENT DOCUMENTS

| | | | |
|---|---|---|---|
| 9,916,839 | B1 | 3/2018 | Scalise et al. |
| 9,922,642 | B2 | 3/2018 | Pitschel et al. |
| 9,928,835 | B1 | 3/2018 | Tang |
| 9,934,777 | B1 | 4/2018 | Joseph et al. |
| 9,934,785 | B1 | 4/2018 | Hulaud |
| 9,940,616 | B1 | 4/2018 | Morgan et al. |
| 9,946,862 | B2 | 4/2018 | Yun et al. |
| 9,948,728 | B2 | 4/2018 | Linn et al. |
| 9,953,634 | B1 | 4/2018 | Pearce et al. |
| 9,959,129 | B2 | 5/2018 | Kannan et al. |
| 9,959,506 | B1 | 5/2018 | Karppanen |
| 9,959,867 | B2 | 5/2018 | Lindahl |
| 9,966,065 | B2 | 5/2018 | Gruber et al. |
| 9,966,068 | B2 | 5/2018 | Cash et al. |
| 9,967,381 | B1 | 5/2018 | Kashimba et al. |
| 9,971,495 | B2 | 5/2018 | Shetty et al. |
| 9,972,304 | B2 | 5/2018 | Paulik et al. |
| 9,972,318 | B1 | 5/2018 | Kelly et al. |
| 9,983,785 | B2 | 5/2018 | Wong et al. |
| 9,984,686 | B1 | 5/2018 | Mutagi et al. |
| 9,986,419 | B2 | 5/2018 | Naik et al. |
| 9,990,129 | B2 | 6/2018 | Yang et al. |
| 9,990,176 | B1 | 6/2018 | Gray |
| 9,990,921 | B2 | 6/2018 | Vanblon et al. |
| 9,990,926 | B1 | 6/2018 | Pearce |
| 9,996,626 | B1 | 6/2018 | Bailey et al. |
| 9,998,552 | B1 | 6/2018 | Ledet |
| 10,001,817 | B2 | 6/2018 | Zambetti et al. |
| 10,009,666 | B1 | 6/2018 | Van Scheltinga et al. |
| 10,013,416 | B1 | 7/2018 | Bhardwaj et al. |
| 10,013,654 | B1 | 7/2018 | Levy et al. |
| 10,013,979 | B1 | 7/2018 | Roma et al. |
| 10,019,436 | B2 | 7/2018 | Huang |
| 10,025,378 | B2 | 7/2018 | Venable et al. |
| 10,026,209 | B1 | 7/2018 | Dagley et al. |
| 10,026,401 | B1 | 7/2018 | Mutagi et al. |
| 10,027,662 | B1 | 7/2018 | Mutagi et al. |
| 10,032,451 | B1 | 7/2018 | Mamkina et al. |
| 10,032,455 | B2 | 7/2018 | Newman et al. |
| 10,037,758 | B2 | 7/2018 | Jing et al. |
| 10,043,516 | B2 | 8/2018 | Saddler et al. |
| 10,048,748 | B2 | 8/2018 | Sridharan et al. |
| 10,049,161 | B2 | 8/2018 | Kaneko |
| 10,049,663 | B2 * | 8/2018 | Orr ......................... G10L 17/22 |
| 10,049,668 | B2 | 8/2018 | Huang et al. |
| 10,055,390 | B2 | 8/2018 | Sharifi et al. |
| 10,055,681 | B2 | 8/2018 | Brown et al. |
| 10,068,570 | B2 | 9/2018 | Dai et al. |
| 10,074,360 | B2 | 9/2018 | Kim |
| 10,074,371 | B1 | 9/2018 | Wang et al. |
| 10,078,487 | B2 | 9/2018 | Gruber et al. |
| 10,083,213 | B1 | 9/2018 | Podgorny et al. |
| 10,083,688 | B2 | 9/2018 | Piernot et al. |
| 10,083,690 | B2 | 9/2018 | Giuli et al. |
| 10,088,972 | B2 | 10/2018 | Brown et al. |
| 10,089,072 | B2 | 10/2018 | Piersol et al. |
| 10,089,393 | B2 | 10/2018 | Agarwal et al. |
| 10,089,983 | B1 | 10/2018 | Gella et al. |
| 10,096,319 | B1 | 10/2018 | Jin et al. |
| 10,101,887 | B2 | 10/2018 | Bernstein et al. |
| 10,102,359 | B2 | 10/2018 | Cheyer |
| 10,102,851 | B1 | 10/2018 | Kiss et al. |
| 10,115,055 | B2 | 10/2018 | Weiss et al. |
| 10,127,901 | B2 | 11/2018 | Zhao et al. |
| 10,127,908 | B1 | 11/2018 | Deller et al. |
| 10,127,926 | B2 | 11/2018 | James |
| 10,134,425 | B1 | 11/2018 | Johnson, Jr. |
| 10,135,965 | B2 | 11/2018 | Woolsey et al. |
| 10,140,845 | B1 | 11/2018 | Knas |
| 10,142,222 | B1 | 11/2018 | Zhang |
| 10,146,923 | B2 | 12/2018 | Pitkanen et al. |
| 10,147,421 | B2 | 12/2018 | Liddell et al. |
| 10,147,441 | B1 | 12/2018 | Pogue et al. |
| 10,149,156 | B1 | 12/2018 | Tiku et al. |
| 10,158,728 | B1 | 12/2018 | Vanblon et al. |
| 10,162,512 | B2 | 12/2018 | Seo et al. |
| 10,162,817 | B2 | 12/2018 | Schlesinger et al. |
| 10,169,329 | B2 | 1/2019 | Futrell et al. |
| 10,170,123 | B2 | 1/2019 | Orr et al. |
| 10,170,135 | B1 | 1/2019 | Pearce et al. |
| 10,175,879 | B2 | 1/2019 | Missig et al. |
| 10,176,167 | B2 | 1/2019 | Evermann |
| 10,176,802 | B1 | 1/2019 | Ladhak et al. |
| 10,176,808 | B1 | 1/2019 | Lovitt et al. |
| 10,178,301 | B1 | 1/2019 | Welbourne et al. |
| 10,185,542 | B2 | 1/2019 | Carson et al. |
| 10,186,254 | B2 | 1/2019 | Williams et al. |
| 10,186,266 | B1 | 1/2019 | Devaraj et al. |
| 10,191,627 | B2 | 1/2019 | Cieplinski et al. |
| 10,191,646 | B2 | 1/2019 | Zambetti et al. |
| 10,191,718 | B2 | 1/2019 | Rhee et al. |
| 10,192,546 | B1 | 1/2019 | Piersol et al. |
| 10,192,552 | B2 | 1/2019 | Raitio et al. |
| 10,192,557 | B2 | 1/2019 | Lee et al. |
| 10,193,840 | B1 | 1/2019 | Dar |
| 10,198,877 | B1 | 2/2019 | Maltsev et al. |
| 10,199,051 | B2 | 2/2019 | Binder et al. |
| 10,200,824 | B2 | 2/2019 | Gross et al. |
| 10,204,627 | B2 | 2/2019 | Nitz et al. |
| 10,210,860 | B1 | 2/2019 | Ward et al. |
| 10,216,351 | B2 | 2/2019 | Yang |
| 10,216,832 | B2 | 2/2019 | Bangalore et al. |
| 10,223,066 | B2 | 3/2019 | Martel et al. |
| 10,224,030 | B1 | 3/2019 | Kiss et al. |
| 10,225,711 | B2 | 3/2019 | Parks et al. |
| 10,228,904 | B2 | 3/2019 | Raux |
| 10,229,109 | B1 | 3/2019 | Cherepanov et al. |
| 10,229,356 | B1 | 3/2019 | Liu et al. |
| 10,229,680 | B1 | 3/2019 | Gillespie et al. |
| 10,236,016 | B1 | 3/2019 | Li et al. |
| 10,237,711 | B2 | 3/2019 | Linn et al. |
| 10,241,644 | B2 | 3/2019 | Gruber et al. |
| 10,242,501 | B1 | 3/2019 | Pusch et al. |
| 10,248,308 | B2 | 4/2019 | Karunamuni et al. |
| 10,248,771 | B1 | 4/2019 | Ziraknejad et al. |
| 10,249,300 | B2 | 4/2019 | Booker et al. |
| 10,249,305 | B2 | 4/2019 | Yu |
| 10,255,922 | B1 | 4/2019 | Sharifi et al. |
| 10,257,314 | B2 | 4/2019 | Agrawal et al. |
| 10,261,672 | B1 | 4/2019 | Dolbakian et al. |
| 10,261,830 | B2 | 4/2019 | Gupta et al. |
| 10,269,345 | B2 | 4/2019 | Sanchez et al. |
| 10,271,093 | B1 | 4/2019 | Jobanputra et al. |
| 10,275,513 | B1 | 4/2019 | Cowan et al. |
| 10,276,170 | B2 | 4/2019 | Gruber et al. |
| 10,282,737 | B2 | 5/2019 | Clark et al. |
| 10,283,111 | B1 | 5/2019 | Mairesse et al. |
| 10,289,205 | B1 | 5/2019 | Sumter et al. |
| 10,291,066 | B1 | 5/2019 | Leabman et al. |
| 10,296,160 | B2 | 5/2019 | Shah et al. |
| 10,297,253 | B2 | 5/2019 | Walker, II et al. |
| 10,303,715 | B2 * | 5/2019 | Graham ................ G06F 16/433 |
| 10,303,772 | B2 | 5/2019 | Hosn et al. |
| 10,304,463 | B2 | 5/2019 | Mixter et al. |
| 10,311,482 | B2 | 6/2019 | Baldwin |
| 10,311,871 | B2 | 6/2019 | Newendorp et al. |
| 10,317,992 | B2 | 6/2019 | Prokofieva et al. |
| 10,325,598 | B2 | 6/2019 | Basye et al. |
| 10,331,312 | B2 | 6/2019 | Napolitano et al. |
| 10,332,509 | B2 | 6/2019 | Catanzaro et al. |
| 10,332,513 | B1 | 6/2019 | D'Souza et al. |
| 10,332,518 | B2 | 6/2019 | Garg et al. |
| 10,339,224 | B2 | 7/2019 | Fukuoka |
| 10,339,714 | B2 | 7/2019 | Corso et al. |
| 10,339,721 | B1 | 7/2019 | Dascola et al. |
| 10,339,925 | B1 | 7/2019 | Rastrow et al. |
| 10,346,540 | B2 | 7/2019 | Karov et al. |
| 10,346,541 | B1 | 7/2019 | Phillips et al. |
| 10,346,753 | B2 | 7/2019 | Soon-Shiong et al. |
| 10,346,878 | B1 | 7/2019 | Ostermann et al. |
| 10,353,975 | B2 | 7/2019 | Oh et al. |
| 10,354,168 | B2 | 7/2019 | Bluche |
| 10,354,677 | B2 | 7/2019 | Mohamed et al. |
| 10,356,243 | B2 | 7/2019 | Sanghavi et al. |

(56) References Cited

U.S. PATENT DOCUMENTS

| | | | |
|---|---|---|---|
| 10,360,305 | B2 | 7/2019 | Larcheveque et al. |
| 10,360,716 | B1 | 7/2019 | Van Der Meulen et al. |
| 10,365,887 | B1 | 7/2019 | Mulherkar |
| 10,366,160 | B2 | 7/2019 | Castelli et al. |
| 10,366,692 | B1 | 7/2019 | Adams et al. |
| 10,372,814 | B2 | 8/2019 | Gliozzo et al. |
| 10,372,881 | B2 | 8/2019 | Ingrassia, Jr. et al. |
| 10,373,381 | B2 | 8/2019 | Nuernberger et al. |
| 10,382,799 | B1 | 8/2019 | Walters et al. |
| 10,387,461 | B2 | 8/2019 | Sharifi et al. |
| 10,389,876 | B2 | 8/2019 | Engelke et al. |
| 10,402,066 | B2 | 9/2019 | Kawana |
| 10,403,272 | B1 | 9/2019 | Fanty et al. |
| 10,403,283 | B1 | 9/2019 | Schramm et al. |
| 10,409,454 | B2 | 9/2019 | Kagan et al. |
| 10,410,637 | B2 | 9/2019 | Paulik et al. |
| 10,416,760 | B2 | 9/2019 | Burns et al. |
| 10,417,037 | B2 | 9/2019 | Gruber et al. |
| 10,417,344 | B2 | 9/2019 | Futrell et al. |
| 10,417,554 | B2 | 9/2019 | Scheffler |
| 10,418,032 | B1 | 9/2019 | Mohajer et al. |
| 10,431,210 | B1 | 10/2019 | Huang et al. |
| 10,437,928 | B2 | 10/2019 | Bhaya et al. |
| 10,446,142 | B2 | 10/2019 | Lim et al. |
| 10,453,117 | B1 | 10/2019 | Reavely et al. |
| 10,469,665 | B1 | 11/2019 | Bell et al. |
| 10,474,961 | B2 | 11/2019 | Brigham et al. |
| 10,475,446 | B2 | 11/2019 | Gruber et al. |
| 10,482,875 | B2 | 11/2019 | Henry |
| 10,482,904 | B1 | 11/2019 | Hardie et al. |
| 10,490,195 | B1 | 11/2019 | Krishnamoorthy et al. |
| 10,496,364 | B2 | 12/2019 | Yao |
| 10,496,705 | B1 | 12/2019 | Irani et al. |
| 10,497,250 | B1 | 12/2019 | Hayward et al. |
| 10,497,365 | B2 | 12/2019 | Gruber et al. |
| 10,497,366 | B2 | 12/2019 | Sapugay et al. |
| 10,499,146 | B2 | 12/2019 | Lang et al. |
| 10,504,513 | B1 | 12/2019 | Gray et al. |
| 10,504,518 | B1 | 12/2019 | Irani et al. |
| 10,512,750 | B1 | 12/2019 | Lewin et al. |
| 10,515,133 | B1 | 12/2019 | Sharifi |
| 10,515,623 | B1 | 12/2019 | Grizzel |
| 10,521,946 | B1 | 12/2019 | Roche et al. |
| 10,528,386 | B2 | 1/2020 | Yu |
| 10,540,976 | B2 | 1/2020 | Van Os et al. |
| 10,558,893 | B2 | 2/2020 | Bluche |
| 10,559,225 | B1 | 2/2020 | Tao et al. |
| 10,559,299 | B1 | 2/2020 | Arel et al. |
| 10,566,007 | B2 | 2/2020 | Fawaz et al. |
| 10,568,032 | B2 | 2/2020 | Freeman et al. |
| 10,572,885 | B1 | 2/2020 | Guo et al. |
| 10,579,401 | B2 | 3/2020 | Dawes |
| 10,580,409 | B2 | 3/2020 | Walker, II et al. |
| 10,582,355 | B1 | 3/2020 | Lebeau et al. |
| 10,585,957 | B2 | 3/2020 | Heck et al. |
| 10,586,369 | B1 | 3/2020 | Roche et al. |
| 10,599,449 | B1 | 3/2020 | Chatzipanagiotis et al. |
| 10,599,758 | B1 | 3/2020 | Yu et al. |
| 10,628,483 | B1 | 4/2020 | Rao et al. |
| 10,629,186 | B1 | 4/2020 | Slifka |
| 10,630,795 | B2 | 4/2020 | Aoki et al. |
| 10,642,934 | B2 | 5/2020 | Heck et al. |
| 10,643,611 | B2 | 5/2020 | Lindahl |
| 10,649,652 | B2 | 5/2020 | Sun |
| 10,652,392 | B1 | 5/2020 | Eades |
| 10,652,394 | B2 | 5/2020 | Van Os et al. |
| 10,659,851 | B2 | 5/2020 | Lister et al. |
| 10,671,428 | B2 | 6/2020 | Zeitlin |
| 10,679,007 | B2 | 6/2020 | Jia et al. |
| 10,679,608 | B2 | 6/2020 | Mixter et al. |
| 10,684,099 | B2 | 6/2020 | Zaetterqvist |
| 10,684,703 | B2 | 6/2020 | Hindi et al. |
| 10,685,187 | B2 | 6/2020 | Badr et al. |
| 10,691,473 | B2 | 6/2020 | Karashchuk et al. |
| 10,699,697 | B2 | 6/2020 | Qian et al. |
| 10,706,841 | B2 | 7/2020 | Gruber et al. |
| 10,706,848 | B1 | 7/2020 | Greene et al. |
| 10,721,190 | B2 | 7/2020 | Zhao et al. |
| 10,732,708 | B1 | 8/2020 | Roche et al. |
| 10,743,107 | B1 | 8/2020 | Yoshioka et al. |
| 10,747,498 | B2 | 8/2020 | Stasior et al. |
| 10,748,529 | B1 | 8/2020 | Milden |
| 10,748,546 | B2 | 8/2020 | Kim et al. |
| 10,754,658 | B2 | 8/2020 | Tamiya |
| 10,755,032 | B2 | 8/2020 | Douglas et al. |
| 10,757,499 | B1 | 8/2020 | Vautrin et al. |
| 10,757,552 | B2 | 8/2020 | Gross et al. |
| 10,769,385 | B2 | 9/2020 | Evermann |
| 10,776,933 | B2 | 9/2020 | Faulkner |
| 10,778,839 | B1 | 9/2020 | Newstadt et al. |
| 10,783,151 | B1 | 9/2020 | Bushkin et al. |
| 10,783,166 | B2 | 9/2020 | Hurley et al. |
| 10,783,883 | B2 | 9/2020 | Mixter et al. |
| 10,789,945 | B2 | 9/2020 | Acero et al. |
| 10,791,176 | B2 | 9/2020 | Phipps et al. |
| 10,791,215 | B2 | 9/2020 | Ly et al. |
| 10,795,944 | B2 | 10/2020 | Brown et al. |
| 10,796,100 | B2 | 10/2020 | Bangalore et al. |
| 10,803,255 | B2 | 10/2020 | Dubyak et al. |
| 10,811,013 | B1 | 10/2020 | Secker-Walker et al. |
| 10,818,288 | B2 | 10/2020 | Garcia et al. |
| 10,831,494 | B2 | 11/2020 | Grocutt et al. |
| 10,832,031 | B2 | 11/2020 | Kienzle et al. |
| 10,832,684 | B2 | 11/2020 | Sarkaya |
| 10,842,968 | B1 | 11/2020 | Kahn et al. |
| 10,846,618 | B2 | 11/2020 | Ravi et al. |
| 10,847,142 | B2 | 11/2020 | Newendorp et al. |
| 10,860,629 | B1 | 12/2020 | Gangadharaiah et al. |
| 10,861,483 | B2 | 12/2020 | Feinauer et al. |
| 10,877,637 | B1 | 12/2020 | Antos et al. |
| 10,878,047 | B1 | 12/2020 | Mutagi et al. |
| 10,880,668 | B1 | 12/2020 | Robinson et al. |
| 10,885,277 | B2 | 1/2021 | Ravi et al. |
| 10,891,968 | B2 | 1/2021 | Chung et al. |
| 10,892,996 | B2 | 1/2021 | Piersol |
| 10,904,488 | B1 | 1/2021 | Weisz et al. |
| 10,909,171 | B2 * | 2/2021 | Graham ................ G06F 16/634 |
| 10,909,459 | B2 | 2/2021 | Tsatsin et al. |
| 10,931,999 | B1 | 2/2021 | Jobanputra et al. |
| 10,937,263 | B1 | 3/2021 | Tout et al. |
| 10,937,410 | B1 | 3/2021 | Rule |
| 10,942,702 | B2 | 3/2021 | Piersol et al. |
| 10,942,703 | B2 | 3/2021 | Martel et al. |
| 10,944,859 | B2 | 3/2021 | Weinstein et al. |
| 10,957,310 | B1 | 3/2021 | Mohajer et al. |
| 10,957,311 | B2 | 3/2021 | Solomon et al. |
| 10,957,337 | B2 | 3/2021 | Chen et al. |
| 10,970,660 | B1 | 4/2021 | Harris et al. |
| 10,974,139 | B2 | 4/2021 | Feder et al. |
| 10,978,056 | B1 | 4/2021 | Challa et al. |
| 10,978,090 | B2 | 4/2021 | Binder et al. |
| 10,983,971 | B2 | 4/2021 | Carvalho et al. |
| 11,009,970 | B2 | 5/2021 | Hindi et al. |
| 11,010,127 | B2 | 5/2021 | Orr et al. |
| 11,010,763 | B1 | 5/2021 | Fillinger |
| 11,012,942 | B2 | 5/2021 | Freeman et al. |
| 11,017,766 | B2 | 5/2021 | Chao et al. |
| 11,037,565 | B2 | 6/2021 | Kudurshian et al. |
| 11,038,934 | B1 | 6/2021 | Hansen et al. |
| 11,043,086 | B1 | 6/2021 | Daoura et al. |
| 11,043,220 | B1 | 6/2021 | Hansen et al. |
| 11,048,473 | B2 | 6/2021 | Carson et al. |
| 11,061,543 | B1 | 7/2021 | Blatz et al. |
| 11,062,696 | B2 | 7/2021 | Tadpatrikar et al. |
| 11,072,344 | B2 | 7/2021 | Provost et al. |
| 11,076,039 | B2 | 7/2021 | Weinstein et al. |
| 11,080,336 | B2 | 8/2021 | Van Dusen |
| 11,086,858 | B1 | 8/2021 | Koukoumidis et al. |
| 11,087,759 | B2 | 8/2021 | Lemay et al. |
| 11,094,311 | B2 | 8/2021 | Candelore et al. |
| 11,112,875 | B1 | 9/2021 | Zhou et al. |
| 11,113,598 | B2 | 9/2021 | Socher et al. |
| 11,126,331 | B2 | 9/2021 | Lo et al. |
| 11,126,400 | B2 | 9/2021 | Stasior et al. |

(56) References Cited

U.S. PATENT DOCUMENTS

| | | | |
|---|---|---|---|
| 11,132,172 B1 | 9/2021 | Naik et al. | |
| 11,133,008 B2 | 9/2021 | Piernot et al. | |
| 11,151,899 B2 | 10/2021 | Pitschel et al. | |
| 11,152,002 B2 | 10/2021 | Walker et al. | |
| 11,169,660 B2 | 11/2021 | Gupta et al. | |
| 11,181,988 B1 | 11/2021 | Bellegarda et al. | |
| 11,183,193 B1 | 11/2021 | Hansen et al. | |
| 11,183,205 B1 | 11/2021 | Ebenezer et al. | |
| 11,200,027 B2 | 12/2021 | Aggarwal et al. | |
| 11,204,787 B2 | 12/2021 | Radebaugh et al. | |
| 11,205,192 B1 | 12/2021 | Rivera et al. | |
| 11,210,062 B1 | 12/2021 | Heikinheimo et al. | |
| 11,210,477 B2 | 12/2021 | Srinivasan et al. | |
| 11,211,048 B2 | 12/2021 | Kim et al. | |
| 11,211,058 B1 | 12/2021 | Eakin et al. | |
| 11,217,255 B2 | 1/2022 | Kim et al. | |
| 11,223,699 B1 | 1/2022 | Niewczas | |
| 11,235,248 B1 | 2/2022 | Orrino et al. | |
| 11,269,426 B2 | 3/2022 | Jorasch et al. | |
| 11,269,678 B2 | 3/2022 | Gruber et al. | |
| 11,283,631 B2 | 3/2022 | Yan et al. | |
| 11,289,082 B1 | 3/2022 | Lacy et al. | |
| 11,301,766 B2 | 4/2022 | Muramoto et al. | |
| 11,302,310 B1 | 4/2022 | Gandhe et al. | |
| 11,347,754 B1 | 5/2022 | Ho et al. | |
| 11,348,582 B2 | 5/2022 | Lindahl | |
| 11,361,863 B2 | 6/2022 | Gass et al. | |
| 11,373,645 B1 | 6/2022 | Mathew et al. | |
| 11,380,310 B2 | 7/2022 | Acero et al. | |
| 11,380,323 B2 | 7/2022 | Shin et al. | |
| 11,388,291 B2 | 7/2022 | Van Os et al. | |
| 11,418,461 B1 | 8/2022 | Elfardy et al. | |
| 11,423,866 B2 | 8/2022 | Park et al. | |
| 11,449,802 B2 | 9/2022 | Maalouf et al. | |
| 11,481,552 B2 | 10/2022 | Krause et al. | |
| 11,481,559 B1 | 10/2022 | Asefi et al. | |
| 11,487,932 B2 | 11/2022 | Kramer | |
| 11,495,218 B2 | 11/2022 | Newendorp et al. | |
| 11,507,183 B2 | 11/2022 | Manjunath et al. | |
| 11,508,380 B2 | 11/2022 | Hu et al. | |
| 11,538,469 B2 | 12/2022 | Acero et al. | |
| 11,580,990 B2 | 2/2023 | Paulik et al. | |
| 11,669,788 B2 | 6/2023 | Balasubramanian et al. | |
| 11,671,920 B2 | 6/2023 | Freeman et al. | |
| 11,675,829 B2 * | 6/2023 | Graham | G06F 9/453 704/270 |
| 11,756,548 B1 | 9/2023 | Perkins et al. | |
| 11,768,880 B1 | 9/2023 | Nemani et al. | |
| 11,769,497 B2 | 9/2023 | Manjunath et al. | |
| 11,783,805 B1 | 10/2023 | Nadig et al. | |
| 11,784,893 B1 | 10/2023 | Chang | |
| 11,818,111 B1 | 11/2023 | Debolt | |
| 11,837,232 B2 | 12/2023 | Manjunath et al. | |
| 12,026,197 B2 * | 7/2024 | Graham | G06F 16/685 |
| 2001/0010714 A1 | 8/2001 | Nemoto | |
| 2007/0075965 A1 | 4/2007 | Huppi et al. | |
| 2008/0189110 A1 | 8/2008 | Freeman et al. | |
| 2011/0106536 A1 | 5/2011 | Klappert | |
| 2011/0295590 A1 | 12/2011 | Lloyd et al. | |
| 2013/0054945 A1 | 2/2013 | Free et al. | |
| 2013/0063256 A1 | 3/2013 | Tartz et al. | |
| 2013/0097709 A1 | 4/2013 | Basavapatna et al. | |
| 2013/0109412 A1 | 5/2013 | Nguyen et al. | |
| 2013/0185074 A1 | 7/2013 | Gruber et al. | |
| 2013/0238326 A1 | 9/2013 | Kim et al. | |
| 2013/0325844 A1 | 12/2013 | Plaisant | |
| 2013/0325967 A1 | 12/2013 | Parks et al. | |
| 2014/0001255 A1 | 1/2014 | Anthoine | |
| 2014/0002338 A1 | 1/2014 | Raffa et al. | |
| 2014/0006012 A1 | 1/2014 | Zhou et al. | |
| 2014/0006025 A1 | 1/2014 | Krishnan et al. | |
| 2014/0006027 A1 | 1/2014 | Kim et al. | |
| 2014/0006028 A1 | 1/2014 | Hu | |
| 2014/0006030 A1 | 1/2014 | Fleizach et al. | |
| 2014/0006153 A1 | 1/2014 | Thangam et al. | |
| 2014/0006191 A1 | 1/2014 | Shankar et al. | |
| 2014/0006483 A1 | 1/2014 | Garmark et al. | |
| 2014/0006496 A1 | 1/2014 | Dearman et al. | |
| 2014/0006562 A1 | 1/2014 | Handa et al. | |
| 2014/0006944 A1 | 1/2014 | Selig et al. | |
| 2014/0006947 A1 | 1/2014 | Garmark et al. | |
| 2014/0006951 A1 | 1/2014 | Hunter | |
| 2014/0006955 A1 | 1/2014 | Greenzeiger et al. | |
| 2014/0008163 A1 | 1/2014 | Mikonaho et al. | |
| 2014/0012574 A1 | 1/2014 | Pasupalak et al. | |
| 2014/0012575 A1 | 1/2014 | Ganong et al. | |
| 2014/0012580 A1 | 1/2014 | Ganong, III et al. | |
| 2014/0012586 A1 | 1/2014 | Rubin et al. | |
| 2014/0012587 A1 | 1/2014 | Park | |
| 2014/0013336 A1 | 1/2014 | Yang | |
| 2014/0019116 A1 | 1/2014 | Lundberg et al. | |
| 2014/0019133 A1 | 1/2014 | Bao et al. | |
| 2014/0019135 A1 | 1/2014 | Talwar et al. | |
| 2014/0019460 A1 | 1/2014 | Sambrani et al. | |
| 2014/0019873 A1 | 1/2014 | Gupta et al. | |
| 2014/0025383 A1 | 1/2014 | Dai et al. | |
| 2014/0026037 A1 | 1/2014 | Garb et al. | |
| 2014/0028029 A1 | 1/2014 | Jochman | |
| 2014/0028477 A1 | 1/2014 | Michalske | |
| 2014/0028603 A1 | 1/2014 | Xie et al. | |
| 2014/0028735 A1 | 1/2014 | Williams et al. | |
| 2014/0032453 A1 | 1/2014 | Eustice et al. | |
| 2014/0032678 A1 | 1/2014 | Koukoumidis et al. | |
| 2014/0032706 A1 | 1/2014 | Kuscher et al. | |
| 2014/0033071 A1 | 1/2014 | Gruber et al. | |
| 2014/0035823 A1 | 2/2014 | Khoe et al. | |
| 2014/0035824 A1 | 2/2014 | Bernstein et al. | |
| 2014/0037075 A1 | 2/2014 | Bouzid et al. | |
| 2014/0039888 A1 | 2/2014 | Taubman et al. | |
| 2014/0039893 A1 | 2/2014 | Weiner et al. | |
| 2014/0039894 A1 | 2/2014 | Shostak | |
| 2014/0040228 A1 | 2/2014 | Kritt et al. | |
| 2014/0040274 A1 | 2/2014 | Aravamudan et al. | |
| 2014/0040748 A1 | 2/2014 | Lemay et al. | |
| 2014/0040754 A1 | 2/2014 | Donelli | |
| 2014/0040801 A1 | 2/2014 | Patel et al. | |
| 2014/0040905 A1 | 2/2014 | Tsunoda et al. | |
| 2014/0040918 A1 | 2/2014 | Li | |
| 2014/0040961 A1 | 2/2014 | Green et al. | |
| 2014/0045547 A1 | 2/2014 | Singamsetty et al. | |
| 2014/0046922 A1 | 2/2014 | Crook et al. | |
| 2014/0046934 A1 | 2/2014 | Zhou et al. | |
| 2014/0047001 A1 | 2/2014 | Phillips et al. | |
| 2014/0051399 A1 | 2/2014 | Walker | |
| 2014/0052451 A1 | 2/2014 | Cheong et al. | |
| 2014/0052680 A1 | 2/2014 | Nitz et al. | |
| 2014/0052791 A1 | 2/2014 | Chakra et al. | |
| 2014/0053082 A1 | 2/2014 | Park | |
| 2014/0053101 A1 | 2/2014 | Buehler et al. | |
| 2014/0053198 A1 | 2/2014 | Sirpal et al. | |
| 2014/0053210 A1 | 2/2014 | Cheong et al. | |
| 2014/0056439 A1 | 2/2014 | Kim | |
| 2014/0057610 A1 | 2/2014 | Olincy et al. | |
| 2014/0058732 A1 | 2/2014 | Labsky et al. | |
| 2014/0059030 A1 | 2/2014 | Hakkani-Tur et al. | |
| 2014/0059423 A1 | 2/2014 | Gorga et al. | |
| 2014/0067361 A1 | 3/2014 | Nikoulina et al. | |
| 2014/0067371 A1 | 3/2014 | Liensberger | |
| 2014/0067402 A1 | 3/2014 | Kim | |
| 2014/0067649 A1 | 3/2014 | Kannan et al. | |
| 2014/0067738 A1 | 3/2014 | Kingsbury | |
| 2014/0067740 A1 | 3/2014 | Solari | |
| 2014/0068751 A1 | 3/2014 | Last | |
| 2014/0071069 A1 | 3/2014 | Anderson et al. | |
| 2014/0071241 A1 | 3/2014 | Yang et al. | |
| 2014/0074454 A1 | 3/2014 | Brown et al. | |
| 2014/0074466 A1 | 3/2014 | Sharifi et al. | |
| 2014/0074470 A1 | 3/2014 | Jansche et al. | |
| 2014/0074472 A1 | 3/2014 | Lin et al. | |
| 2014/0074482 A1 | 3/2014 | Ohno | |
| 2014/0074483 A1 | 3/2014 | Van Os | |
| 2014/0074589 A1 | 3/2014 | Nielsen et al. | |
| 2014/0074815 A1 | 3/2014 | Plimton | |
| 2014/0074846 A1 | 3/2014 | Moss et al. | |

(56) References Cited

U.S. PATENT DOCUMENTS

| | | | |
|---|---|---|---|
| 2014/0075453 | A1 | 3/2014 | Bellessort et al. |
| 2014/0078065 | A1 | 3/2014 | Akkok |
| 2014/0079195 | A1 | 3/2014 | Srivastava et al. |
| 2014/0080410 | A1 | 3/2014 | Jung et al. |
| 2014/0080428 | A1 | 3/2014 | Rhoads et al. |
| 2014/0081619 | A1 | 3/2014 | Solntseva et al. |
| 2014/0081633 | A1* | 3/2014 | Badaskar .............. G06F 16/587 707/723 |
| 2014/0081635 | A1 | 3/2014 | Yanagihara |
| 2014/0081829 | A1 | 3/2014 | Milne |
| 2014/0081941 | A1 | 3/2014 | Bai et al. |
| 2014/0082500 | A1 | 3/2014 | Wilensky et al. |
| 2014/0082501 | A1 | 3/2014 | Bae et al. |
| 2014/0082545 | A1 | 3/2014 | Zhai et al. |
| 2014/0082569 | A1 | 3/2014 | Borgman |
| 2014/0082715 | A1 | 3/2014 | Grajek et al. |
| 2014/0086458 | A1 | 3/2014 | Rogers |
| 2014/0087711 | A1 | 3/2014 | Geyer et al. |
| 2014/0088952 | A1 | 3/2014 | Fife et al. |
| 2014/0088961 | A1 | 3/2014 | Woodward et al. |
| 2014/0088964 | A1 | 3/2014 | Bellegarda |
| 2014/0088970 | A1 | 3/2014 | Kang |
| 2014/0088989 | A1 | 3/2014 | Krishnapuram et al. |
| 2014/0092007 | A1 | 4/2014 | Kim et al. |
| 2014/0095171 | A1 | 4/2014 | Lynch et al. |
| 2014/0095172 | A1 | 4/2014 | Cabaco et al. |
| 2014/0095173 | A1 | 4/2014 | Lynch et al. |
| 2014/0095432 | A1 | 4/2014 | Trumbull et al. |
| 2014/0095601 | A1 | 4/2014 | Abuelsaad et al. |
| 2014/0095965 | A1 | 4/2014 | Li |
| 2014/0096077 | A1 | 4/2014 | Jacob et al. |
| 2014/0096209 | A1 | 4/2014 | Saraf et al. |
| 2014/0098247 | A1 | 4/2014 | Rao et al. |
| 2014/0100847 | A1 | 4/2014 | Ishii et al. |
| 2014/0101127 | A1 | 4/2014 | Simhon et al. |
| 2014/0104175 | A1 | 4/2014 | Ouyang et al. |
| 2014/0108010 | A1 | 4/2014 | Maltseff et al. |
| 2014/0108017 | A1 | 4/2014 | Mason et al. |
| 2014/0108357 | A1 | 4/2014 | Procops et al. |
| 2014/0108391 | A1 | 4/2014 | Volkert |
| 2014/0108792 | A1 | 4/2014 | Borzycki et al. |
| 2014/0112556 | A1 | 4/2014 | Kalinli-Akbacak |
| 2014/0114554 | A1 | 4/2014 | Lagassey |
| 2014/0115062 | A1 | 4/2014 | Liu et al. |
| 2014/0115114 | A1 | 4/2014 | Garmark et al. |
| 2014/0118155 | A1 | 5/2014 | Bowers et al. |
| 2014/0118624 | A1 | 5/2014 | Jang et al. |
| 2014/0120961 | A1 | 5/2014 | Buck |
| 2014/0122057 | A1 | 5/2014 | Chelba et al. |
| 2014/0122059 | A1 | 5/2014 | Patel et al. |
| 2014/0122085 | A1 | 5/2014 | Piety et al. |
| 2014/0122086 | A1 | 5/2014 | Kapur et al. |
| 2014/0122136 | A1 | 5/2014 | Jayanthi |
| 2014/0122153 | A1 | 5/2014 | Truitt |
| 2014/0122589 | A1 | 5/2014 | Fyke et al. |
| 2014/0123022 | A1 | 5/2014 | Lee et al. |
| 2014/0128021 | A1 | 5/2014 | Walker et al. |
| 2014/0129006 | A1 | 5/2014 | Chen et al. |
| 2014/0129226 | A1 | 5/2014 | Lee et al. |
| 2014/0132935 | A1 | 5/2014 | Kim et al. |
| 2014/0134983 | A1 | 5/2014 | Jung et al. |
| 2014/0135036 | A1 | 5/2014 | Bonanni et al. |
| 2014/0136013 | A1 | 5/2014 | Wolverton et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0136987 | A1 | 5/2014 | Rodriguez |
| 2014/0142922 | A1 | 5/2014 | Liang et al. |
| 2014/0142923 | A1 | 5/2014 | Jones et al. |
| 2014/0142934 | A1 | 5/2014 | Kim |
| 2014/0142935 | A1 | 5/2014 | Lindahl et al. |
| 2014/0142953 | A1 | 5/2014 | Kim et al. |
| 2014/0143550 | A1 | 5/2014 | Ganong, III et al. |
| 2014/0143721 | A1 | 5/2014 | Suzuki et al. |
| 2014/0143784 | A1 | 5/2014 | Mistry et al. |
| 2014/0145914 | A1 | 5/2014 | Latta et al. |
| 2014/0146200 | A1 | 5/2014 | Scott et al. |
| 2014/0148209 | A1 | 5/2014 | Weng et al. |
| 2014/0149118 | A1 | 5/2014 | Lee et al. |
| 2014/0152577 | A1 | 6/2014 | Yuen et al. |
| 2014/0153709 | A1 | 6/2014 | Byrd et al. |
| 2014/0155031 | A1 | 6/2014 | Lee et al. |
| 2014/0156262 | A1 | 6/2014 | Yuen et al. |
| 2014/0156268 | A1 | 6/2014 | Arizmendi et al. |
| 2014/0156269 | A1 | 6/2014 | Lee et al. |
| 2014/0156279 | A1 | 6/2014 | Okamoto et al. |
| 2014/0156564 | A1 | 6/2014 | Knight et al. |
| 2014/0157319 | A1 | 6/2014 | Kimura et al. |
| 2014/0157422 | A1 | 6/2014 | Livshits et al. |
| 2014/0160032 | A1 | 6/2014 | Che et al. |
| 2014/0160157 | A1 | 6/2014 | Poulos et al. |
| 2014/0163751 | A1 | 6/2014 | Davis et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163962 | A1 | 6/2014 | Castelli et al. |
| 2014/0163976 | A1 | 6/2014 | Park et al. |
| 2014/0163977 | A1 | 6/2014 | Hoffmeister et al. |
| 2014/0163978 | A1 | 6/2014 | Basye et al. |
| 2014/0163981 | A1 | 6/2014 | Cook et al. |
| 2014/0163995 | A1 | 6/2014 | Burns et al. |
| 2014/0164305 | A1 | 6/2014 | Lynch et al. |
| 2014/0164312 | A1 | 6/2014 | Lynch et al. |
| 2014/0164476 | A1 | 6/2014 | Thomson |
| 2014/0164508 | A1 | 6/2014 | Lynch et al. |
| 2014/0164532 | A1 | 6/2014 | Lynch et al. |
| 2014/0164533 | A1 | 6/2014 | Lynch et al. |
| 2014/0164953 | A1 | 6/2014 | Lynch et al. |
| 2014/0165006 | A1 | 6/2014 | Chaudhri et al. |
| 2014/0165187 | A1 | 6/2014 | Daesung et al. |
| 2014/0168344 | A1 | 6/2014 | Shoemake et al. |
| 2014/0169795 | A1 | 6/2014 | Clough |
| 2014/0171064 | A1 | 6/2014 | Das |
| 2014/0172412 | A1 | 6/2014 | Viegas et al. |
| 2014/0172878 | A1 | 6/2014 | Clark et al. |
| 2014/0173445 | A1 | 6/2014 | Grassiotto |
| 2014/0173460 | A1 | 6/2014 | Kim |
| 2014/0176814 | A1 | 6/2014 | Ahn |
| 2014/0179295 | A1 | 6/2014 | Luebbers et al. |
| 2014/0180499 | A1 | 6/2014 | Cooper et al. |
| 2014/0180689 | A1 | 6/2014 | Kim |
| 2014/0180697 | A1 | 6/2014 | Torok et al. |
| 2014/0181123 | A1 | 6/2014 | Blaise et al. |
| 2014/0181703 | A1 | 6/2014 | Sullivan et al. |
| 2014/0181715 | A1 | 6/2014 | Axelrod et al. |
| 2014/0181741 | A1 | 6/2014 | Apacible et al. |
| 2014/0181865 | A1 | 6/2014 | Koganei |
| 2014/0184542 | A1 | 7/2014 | Mao et al. |
| 2014/0188335 | A1 | 7/2014 | Madhok et al. |
| 2014/0188460 | A1 | 7/2014 | Ouyang et al. |
| 2014/0188477 | A1 | 7/2014 | Zhang |
| 2014/0188478 | A1 | 7/2014 | Zhang |
| 2014/0188485 | A1 | 7/2014 | Kim et al. |
| 2014/0188835 | A1 | 7/2014 | Zhang et al. |
| 2014/0195226 | A1 | 7/2014 | Yun et al. |
| 2014/0195230 | A1 | 7/2014 | Han et al. |
| 2014/0195233 | A1 | 7/2014 | Bapat et al. |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0200891 | A1 | 7/2014 | Larcheveque et al. |
| 2014/0201655 | A1 | 7/2014 | Mahaffey et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207447 | A1 | 7/2014 | Jiang et al. |
| 2014/0207466 | A1 | 7/2014 | Smadi |
| 2014/0207468 | A1 | 7/2014 | Bartnik |
| 2014/0207582 | A1 | 7/2014 | Flinn et al. |
| 2014/0211944 | A1 | 7/2014 | Hayward et al. |
| 2014/0214429 | A1 | 7/2014 | Pantel |

(56) References Cited

U.S. PATENT DOCUMENTS

| | | | |
|---|---|---|---|
| 2014/0214537 | A1 | 7/2014 | Yoo et al. |
| 2014/0215367 | A1 | 7/2014 | Kim et al. |
| 2014/0215513 | A1 | 7/2014 | Ramer et al. |
| 2014/0218372 | A1 | 8/2014 | Missig et al. |
| 2014/0222422 | A1 | 8/2014 | Sarikaya et al. |
| 2014/0222435 | A1 | 8/2014 | Li et al. |
| 2014/0222436 | A1 | 8/2014 | Binder et al. |
| 2014/0222678 | A1 | 8/2014 | Sheets et al. |
| 2014/0222967 | A1 | 8/2014 | Harrang et al. |
| 2014/0223377 | A1 | 8/2014 | Shaw et al. |
| 2014/0223481 | A1 | 8/2014 | Fundament |
| 2014/0223586 | A1 | 8/2014 | Berger et al. |
| 2014/0226503 | A1 | 8/2014 | Cooper et al. |
| 2014/0229158 | A1 | 8/2014 | Zweig et al. |
| 2014/0229184 | A1 | 8/2014 | Shires |
| 2014/0229847 | A1 | 8/2014 | Park |
| 2014/0230055 | A1 | 8/2014 | Boehl |
| 2014/0232570 | A1 | 8/2014 | Skinder et al. |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0237366 | A1 | 8/2014 | Poulos et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244266 | A1 | 8/2014 | Brown et al. |
| 2014/0244268 | A1 | 8/2014 | Abdelsamie et al. |
| 2014/0244270 | A1 | 8/2014 | Han et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249812 | A1 | 9/2014 | Bou-Ghazale et al. |
| 2014/0249816 | A1 | 9/2014 | Pickering et al. |
| 2014/0249817 | A1 | 9/2014 | Hart et al. |
| 2014/0249820 | A1 | 9/2014 | Hsu et al. |
| 2014/0249821 | A1 | 9/2014 | Kennewick et al. |
| 2014/0250046 | A1 | 9/2014 | Winn et al. |
| 2014/0253455 | A1 | 9/2014 | Mauro et al. |
| 2014/0257809 | A1 | 9/2014 | Goel et al. |
| 2014/0257815 | A1 | 9/2014 | Zhao et al. |
| 2014/0257902 | A1 | 9/2014 | Moore et al. |
| 2014/0258324 | A1 | 9/2014 | Mauro et al. |
| 2014/0258357 | A1 | 9/2014 | Singh et al. |
| 2014/0258857 | A1 | 9/2014 | Dykstra-Erickson et al. |
| 2014/0258905 | A1 | 9/2014 | Lee et al. |
| 2014/0267022 | A1 | 9/2014 | Kim |
| 2014/0267599 | A1 | 9/2014 | Drouin et al. |
| 2014/0267933 | A1 | 9/2014 | Young |
| 2014/0272821 | A1 | 9/2014 | Pitschel et al. |
| 2014/0273974 | A1 | 9/2014 | Varghese et al. |
| 2014/0273979 | A1 | 9/2014 | Van Os et al. |
| 2014/0274005 | A1 | 9/2014 | Luna et al. |
| 2014/0274203 | A1 | 9/2014 | Ganong, III et al. |
| 2014/0274211 | A1 | 9/2014 | Sejnoha et al. |
| 2014/0278051 | A1 | 9/2014 | McGavran et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278419 | A1 | 9/2014 | Bishop et al. |
| 2014/0278426 | A1 | 9/2014 | Jost et al. |
| 2014/0278429 | A1 | 9/2014 | Ganong, III |
| 2014/0278435 | A1 | 9/2014 | Ganong, III et al. |
| 2014/0278436 | A1 | 9/2014 | Khanna et al. |
| 2014/0278438 | A1 | 9/2014 | Hart et al. |
| 2014/0278443 | A1 | 9/2014 | Gunn et al. |
| 2014/0278444 | A1 | 9/2014 | Larson et al. |
| 2014/0278513 | A1 | 9/2014 | Prakash et al. |
| 2014/0279622 | A1 | 9/2014 | Lamoureux et al. |
| 2014/0279739 | A1 | 9/2014 | Elkington et al. |
| 2014/0279787 | A1 | 9/2014 | Cheng et al. |
| 2014/0280072 | A1 | 9/2014 | Coleman |
| 2014/0280107 | A1 | 9/2014 | Heymans et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0280757 | A1 | 9/2014 | Tran |
| 2014/0281944 | A1 | 9/2014 | Winer |
| 2014/0281983 | A1 | 9/2014 | Xian et al. |
| 2014/0281997 | A1 | 9/2014 | Fleizach et al. |
| 2014/0282003 | A1 | 9/2014 | Gruber et al. |
| 2014/0282007 | A1 | 9/2014 | Fleizach |
| 2014/0282016 | A1 | 9/2014 | Hosier, Jr. |
| 2014/0282045 | A1 | 9/2014 | Ayanam et al. |
| 2014/0282178 | A1 | 9/2014 | Borzello et al. |
| 2014/0282201 | A1 | 9/2014 | Pasquero et al. |
| 2014/0282203 | A1 | 9/2014 | Pasquero et al. |
| 2014/0282559 | A1 | 9/2014 | Verduzco et al. |
| 2014/0282586 | A1 | 9/2014 | Shear et al. |
| 2014/0282743 | A1 | 9/2014 | Howard et al. |
| 2014/0283111 | A1 | 9/2014 | Dolph et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |
| 2014/0297288 | A1 | 10/2014 | Yu et al. |
| 2014/0297296 | A1 | 10/2014 | Koppens et al. |
| 2014/0297348 | A1 | 10/2014 | Ellis |
| 2014/0298200 | A1 | 10/2014 | Cierniak |
| 2014/0298395 | A1 | 10/2014 | Yang et al. |
| 2014/0304086 | A1 | 10/2014 | Dasdan et al. |
| 2014/0304605 | A1 | 10/2014 | Ohmura et al. |
| 2014/0309990 | A1 | 10/2014 | Gandrabur et al. |
| 2014/0309996 | A1 | 10/2014 | Zhang |
| 2014/0310001 | A1 | 10/2014 | Kalns et al. |
| 2014/0310002 | A1 | 10/2014 | Nitz et al. |
| 2014/0310348 | A1 | 10/2014 | Keskitalo et al. |
| 2014/0310365 | A1 | 10/2014 | Sample et al. |
| 2014/0310595 | A1 | 10/2014 | Acharya et al. |
| 2014/0313007 | A1 | 10/2014 | Harding |
| 2014/0315492 | A1 | 10/2014 | Woods |
| 2014/0316585 | A1 | 10/2014 | Boesveld et al. |
| 2014/0316764 | A1 | 10/2014 | Ayan et al. |
| 2014/0317030 | A1 | 10/2014 | Shen et al. |
| 2014/0317502 | A1 | 10/2014 | Brown et al. |
| 2014/0317578 | A1 | 10/2014 | Chaudhri |
| 2014/0320398 | A1 | 10/2014 | Papstein |
| 2014/0324429 | A1 | 10/2014 | Weilhammer et al. |
| 2014/0324884 | A1 | 10/2014 | Lindahl et al. |
| 2014/0330560 | A1 | 11/2014 | Venkatesha et al. |
| 2014/0330569 | A1 | 11/2014 | Kolavennu et al. |
| 2014/0330951 | A1 | 11/2014 | Sukoff et al. |
| 2014/0335823 | A1 | 11/2014 | Heredia et al. |
| 2014/0337037 | A1 | 11/2014 | Chi |
| 2014/0337048 | A1 | 11/2014 | Brown et al. |
| 2014/0337266 | A1 | 11/2014 | Wolverton et al. |
| 2014/0337370 | A1 | 11/2014 | Aravamudan et al. |
| 2014/0337371 | A1 | 11/2014 | Li |
| 2014/0337438 | A1 | 11/2014 | Govande et al. |
| 2014/0337621 | A1 | 11/2014 | Nakhimov |
| 2014/0337751 | A1 | 11/2014 | Lim et al. |
| 2014/0337814 | A1 | 11/2014 | Kalns et al. |
| 2014/0341217 | A1 | 11/2014 | Eisner et al. |
| 2014/0342762 | A1 | 11/2014 | Hajdu et al. |
| 2014/0343834 | A1 | 11/2014 | Demerchant et al. |
| 2014/0343943 | A1 | 11/2014 | Al-Telmissani |
| 2014/0343946 | A1 | 11/2014 | Torok et al. |
| 2014/0343950 | A1 | 11/2014 | Simpson et al. |
| 2014/0344205 | A1 | 11/2014 | Luna et al. |
| 2014/0344627 | A1 | 11/2014 | Schaub et al. |
| 2014/0344687 | A1 | 11/2014 | Durham et al. |
| 2014/0347181 | A1 | 11/2014 | Luna et al. |

(56) References Cited

U.S. PATENT DOCUMENTS

| | | | |
|---|---|---|---|
| 2014/0350847 | A1 | 11/2014 | Ichinokawa |
| 2014/0350924 | A1 | 11/2014 | Zurek et al. |
| 2014/0350933 | A1 | 11/2014 | Bak et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358521 | A1 | 12/2014 | Mikutel et al. |
| 2014/0358523 | A1 | 12/2014 | Sheth et al. |
| 2014/0358549 | A1 | 12/2014 | O'Connor et al. |
| 2014/0359456 | A1 | 12/2014 | Thiele et al. |
| 2014/0359637 | A1 | 12/2014 | Yan |
| 2014/0359709 | A1 | 12/2014 | Nassar et al. |
| 2014/0361973 | A1 | 12/2014 | Raux et al. |
| 2014/0363074 | A1 | 12/2014 | Dolfing et al. |
| 2014/0364149 | A1 | 12/2014 | Marti et al. |
| 2014/0364171 | A1 | 12/2014 | Heiman et al. |
| 2014/0365209 | A1 | 12/2014 | Evermann |
| 2014/0365214 | A1 | 12/2014 | Bayley |
| 2014/0365216 | A1 | 12/2014 | Gruber et al. |
| 2014/0365218 | A1 | 12/2014 | Chang et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365505 | A1 | 12/2014 | Clark et al. |
| 2014/0365878 | A1 | 12/2014 | Dai et al. |
| 2014/0365880 | A1 | 12/2014 | Bellegarda |
| 2014/0365885 | A1 | 12/2014 | Carson et al. |
| 2014/0365895 | A1 | 12/2014 | Magahern et al. |
| 2014/0365912 | A1 | 12/2014 | Karunamuni et al. |
| 2014/0365922 | A1 | 12/2014 | Yang |
| 2014/0365945 | A1 | 12/2014 | Karunamuni et al. |
| 2014/0370817 | A1 | 12/2014 | Luna |
| 2014/0370841 | A1 | 12/2014 | Roberts et al. |
| 2014/0372112 | A1 | 12/2014 | Xue et al. |
| 2014/0372356 | A1 | 12/2014 | Bilal et al. |
| 2014/0372468 | A1 | 12/2014 | Collins et al. |
| 2014/0372931 | A1 | 12/2014 | Zhai et al. |
| 2014/0379326 | A1 | 12/2014 | Sarikaya et al. |
| 2014/0379334 | A1 | 12/2014 | Fry |
| 2014/0379338 | A1 | 12/2014 | Fry |
| 2014/0379341 | A1 | 12/2014 | Seo et al. |
| 2014/0379798 | A1 | 12/2014 | Bunner et al. |
| 2014/0380214 | A1 | 12/2014 | Huang et al. |
| 2014/0380285 | A1* | 12/2014 | Gabel .................... G06N 5/022 717/139 |
| 2015/0001850 | A1 | 1/2015 | Jaw et al. |
| 2015/0003797 | A1 | 1/2015 | Schmidt |
| 2015/0004958 | A1 | 1/2015 | Wang et al. |
| 2015/0005009 | A1 | 1/2015 | Tomkins et al. |
| 2015/0006147 | A1 | 1/2015 | Schmidt |
| 2015/0006148 | A1 | 1/2015 | Goldszmit et al. |
| 2015/0006157 | A1 | 1/2015 | Silva et al. |
| 2015/0006167 | A1 | 1/2015 | Kato et al. |
| 2015/0006176 | A1 | 1/2015 | Pogue et al. |
| 2015/0006178 | A1 | 1/2015 | Peng et al. |
| 2015/0006182 | A1 | 1/2015 | Schmidt |
| 2015/0006184 | A1 | 1/2015 | Marti et al. |
| 2015/0006199 | A1 | 1/2015 | Snider et al. |
| 2015/0006564 | A1 | 1/2015 | Tomkins et al. |
| 2015/0012260 | A1 | 1/2015 | Chakladar |
| 2015/0012271 | A1 | 1/2015 | Peng et al. |
| 2015/0012862 | A1 | 1/2015 | Ikeda et al. |
| 2015/0019219 | A1 | 1/2015 | Tzirkel-Hancock et al. |
| 2015/0019220 | A1 | 1/2015 | Talhami et al. |
| 2015/0019221 | A1 | 1/2015 | Lee et al. |
| 2015/0019445 | A1 | 1/2015 | Glass et al. |
| 2015/0019944 | A1 | 1/2015 | Kalgi |
| 2015/0019954 | A1 | 1/2015 | Dalal et al. |
| 2015/0019974 | A1 | 1/2015 | Doi et al. |
| 2015/0025405 | A1 | 1/2015 | Vairavan et al. |
| 2015/0025890 | A1 | 1/2015 | Jagatheesan et al. |
| 2015/0026620 | A1 | 1/2015 | Kwon et al. |
| 2015/0027178 | A1 | 1/2015 | Scalisi |
| 2015/0031416 | A1 | 1/2015 | Labowicz et al. |
| 2015/0032443 | A1 | 1/2015 | Karov et al. |
| 2015/0032457 | A1 | 1/2015 | Koo et al. |
| 2015/0033130 | A1 | 1/2015 | Scheessele |
| 2015/0033219 | A1 | 1/2015 | Breiner et al. |
| 2015/0033275 | A1 | 1/2015 | Natani et al. |
| 2015/0034855 | A1 | 2/2015 | Shen |
| 2015/0038161 | A1 | 2/2015 | Jakobson et al. |
| 2015/0039292 | A1 | 2/2015 | Suleman et al. |
| 2015/0039295 | A1 | 2/2015 | Soschen |
| 2015/0039299 | A1 | 2/2015 | Weinstein et al. |
| 2015/0039305 | A1 | 2/2015 | Huang |
| 2015/0039606 | A1 | 2/2015 | Salaka et al. |
| 2015/0040012 | A1 | 2/2015 | Faaborg et al. |
| 2015/0042640 | A1 | 2/2015 | Algreatly |
| 2015/0045003 | A1 | 2/2015 | Vora et al. |
| 2015/0045007 | A1 | 2/2015 | Cash |
| 2015/0045068 | A1 | 2/2015 | Soffer et al. |
| 2015/0046375 | A1 | 2/2015 | Mandel et al. |
| 2015/0046434 | A1 | 2/2015 | Lim et al. |
| 2015/0046537 | A1 | 2/2015 | Rakib |
| 2015/0046828 | A1 | 2/2015 | Desai et al. |
| 2015/0049884 | A1 | 2/2015 | Ye |
| 2015/0050633 | A1 | 2/2015 | Christmas et al. |
| 2015/0050923 | A1 | 2/2015 | Tu et al. |
| 2015/0051754 | A1 | 2/2015 | Kwon et al. |
| 2015/0051901 | A1 | 2/2015 | Stonehouse et al. |
| 2015/0052128 | A1 | 2/2015 | Sharifi |
| 2015/0053779 | A1 | 2/2015 | Adamek et al. |
| 2015/0053781 | A1 | 2/2015 | Nelson et al. |
| 2015/0055879 | A1 | 2/2015 | Yang |
| 2015/0058013 | A1 | 2/2015 | Pakhomov et al. |
| 2015/0058018 | A1 | 2/2015 | Georges et al. |
| 2015/0058720 | A1 | 2/2015 | Smadja et al. |
| 2015/0058785 | A1 | 2/2015 | Ookawara |
| 2015/0062043 | A1 | 3/2015 | Kim et al. |
| 2015/0065149 | A1 | 3/2015 | Russell et al. |
| 2015/0065200 | A1 | 3/2015 | Namgung et al. |
| 2015/0066473 | A1 | 3/2015 | Jeong et al. |
| 2015/0066479 | A1 | 3/2015 | Pasupalak et al. |
| 2015/0066494 | A1 | 3/2015 | Salvador et al. |
| 2015/0066496 | A1 | 3/2015 | Deoras et al. |
| 2015/0066506 | A1 | 3/2015 | Romano et al. |
| 2015/0066516 | A1 | 3/2015 | Nishikawa et al. |
| 2015/0066817 | A1 | 3/2015 | Slayton et al. |
| 2015/0067485 | A1 | 3/2015 | Kim et al. |
| 2015/0067521 | A1 | 3/2015 | Heo et al. |
| 2015/0067819 | A1 | 3/2015 | Shribman et al. |
| 2015/0067822 | A1 | 3/2015 | Randall |
| 2015/0068069 | A1 | 3/2015 | Tran et al. |
| 2015/0070148 | A1 | 3/2015 | Cruz-Hernandez et al. |
| 2015/0070163 | A1 | 3/2015 | Bennett et al. |
| 2015/0071121 | A1 | 3/2015 | Patil et al. |
| 2015/0073788 | A1 | 3/2015 | Sak et al. |
| 2015/0073804 | A1 | 3/2015 | Senior et al. |
| 2015/0074524 | A1 | 3/2015 | Nicholson et al. |
| 2015/0074615 | A1 | 3/2015 | Han et al. |
| 2015/0081295 | A1 | 3/2015 | Yun et al. |
| 2015/0082180 | A1 | 3/2015 | Ames et al. |
| 2015/0082229 | A1 | 3/2015 | Ouyang et al. |
| 2015/0086174 | A1 | 3/2015 | Abecassis et al. |
| 2015/0088511 | A1 | 3/2015 | Bharadwaj et al. |
| 2015/0088514 | A1 | 3/2015 | Typrin |
| 2015/0088518 | A1 | 3/2015 | Kim et al. |
| 2015/0088522 | A1 | 3/2015 | Hendrickson et al. |
| 2015/0088523 | A1 | 3/2015 | Schuster |
| 2015/0088998 | A1 | 3/2015 | Isensee et al. |
| 2015/0092520 | A1 | 4/2015 | Robison et al. |
| 2015/0094834 | A1 | 4/2015 | Vega et al. |
| 2015/0095026 | A1 | 4/2015 | Bisani et al. |
| 2015/0095031 | A1 | 4/2015 | Conkie et al. |
| 2015/0095159 | A1 | 4/2015 | Kennewick et al. |
| 2015/0095268 | A1 | 4/2015 | Greenzeiger et al. |
| 2015/0095278 | A1 | 4/2015 | Flinn et al. |
| 2015/0095310 | A1 | 4/2015 | Beaurepaire |
| 2015/0100144 | A1 | 4/2015 | Lee et al. |
| 2015/0100313 | A1 | 4/2015 | Sharma |
| 2015/0100316 | A1 | 4/2015 | Williams et al. |
| 2015/0100537 | A1 | 4/2015 | Grieves et al. |
| 2015/0100983 | A1 | 4/2015 | Pan |
| 2015/0106061 | A1 | 4/2015 | Yang et al. |

(56) References Cited

U.S. PATENT DOCUMENTS

| | | | |
|---|---|---|---|
| 2015/0106085 | A1 | 4/2015 | Lindahl |
| 2015/0106093 | A1 | 4/2015 | Weeks et al. |
| 2015/0106096 | A1 | 4/2015 | Toopran et al. |
| 2015/0106737 | A1 | 4/2015 | Montoy-Wilson et al. |
| 2015/0109191 | A1 | 4/2015 | Johnson et al. |
| 2015/0112684 | A1 | 4/2015 | Scheffer et al. |
| 2015/0113407 | A1 | 4/2015 | Hoffert et al. |
| 2015/0113435 | A1 | 4/2015 | Phillips |
| 2015/0113454 | A1 | 4/2015 | Mclaughlin |
| 2015/0120296 | A1 | 4/2015 | Stern et al. |
| 2015/0120641 | A1 | 4/2015 | Soon-Shiong et al. |
| 2015/0120723 | A1 | 4/2015 | Deshmukh et al. |
| 2015/0121216 | A1 | 4/2015 | Brown et al. |
| 2015/0121227 | A1 | 4/2015 | Peng |
| 2015/0121305 | A1 | 4/2015 | Saund et al. |
| 2015/0123898 | A1 | 5/2015 | Kim et al. |
| 2015/0127336 | A1 | 5/2015 | Lei et al. |
| 2015/0127337 | A1 | 5/2015 | Heigold et al. |
| 2015/0127348 | A1 | 5/2015 | Follis |
| 2015/0127350 | A1 | 5/2015 | Agiomyrgiannakis |
| 2015/0128058 | A1 | 5/2015 | Anajwala |
| 2015/0130716 | A1 | 5/2015 | Sridharan et al. |
| 2015/0133049 | A1 | 5/2015 | Lee et al. |
| 2015/0133109 | A1 | 5/2015 | Freeman et al. |
| 2015/0134318 | A1 | 5/2015 | Cuthbert et al. |
| 2015/0134322 | A1 | 5/2015 | Cuthbert et al. |
| 2015/0134323 | A1 | 5/2015 | Cuthbert et al. |
| 2015/0134334 | A1 | 5/2015 | Sachidanandam et al. |
| 2015/0135085 | A1 | 5/2015 | Shoham et al. |
| 2015/0135123 | A1 | 5/2015 | Carr et al. |
| 2015/0140934 | A1 | 5/2015 | Abdurrahman et al. |
| 2015/0140990 | A1 | 5/2015 | Kim et al. |
| 2015/0141150 | A1 | 5/2015 | Zha |
| 2015/0142420 | A1 | 5/2015 | Sarikaya et al. |
| 2015/0142438 | A1 | 5/2015 | Dai et al. |
| 2015/0142440 | A1 | 5/2015 | Parkinson et al. |
| 2015/0142447 | A1 | 5/2015 | Kennewick et al. |
| 2015/0142851 | A1 | 5/2015 | Gupta et al. |
| 2015/0143419 | A1 | 5/2015 | Bhagwat et al. |
| 2015/0148013 | A1 | 5/2015 | Baldwin et al. |
| 2015/0149146 | A1 | 5/2015 | Abramovitz et al. |
| 2015/0149177 | A1 | 5/2015 | Kalns et al. |
| 2015/0149182 | A1 | 5/2015 | Kalns et al. |
| 2015/0149354 | A1 | 5/2015 | McCoy |
| 2015/0149469 | A1 | 5/2015 | Xu et al. |
| 2015/0149899 | A1 | 5/2015 | Bernstein et al. |
| 2015/0149964 | A1 | 5/2015 | Bernstein et al. |
| 2015/0154001 | A1 | 6/2015 | Knox et al. |
| 2015/0154134 | A1 | 6/2015 | Beaumont et al. |
| 2015/0154185 | A1 | 6/2015 | Waibel |
| 2015/0154976 | A1 | 6/2015 | Mutagi |
| 2015/0160635 | A1 | 6/2015 | Schofield et al. |
| 2015/0160855 | A1 | 6/2015 | Bi |
| 2015/0161108 | A1 | 6/2015 | Back |
| 2015/0161291 | A1 | 6/2015 | Nadav et al. |
| 2015/0161370 | A1 | 6/2015 | North et al. |
| 2015/0161521 | A1 | 6/2015 | Shah et al. |
| 2015/0161989 | A1 | 6/2015 | Hsu et al. |
| 2015/0161997 | A1 | 6/2015 | Wetsel et al. |
| 2015/0162000 | A1 | 6/2015 | Di Censo et al. |
| 2015/0162001 | A1 | 6/2015 | Kar et al. |
| 2015/0162006 | A1 | 6/2015 | Kummer |
| 2015/0163558 | A1 | 6/2015 | Wheatley |
| 2015/0169053 | A1 | 6/2015 | Bozarth et al. |
| 2015/0169081 | A1 | 6/2015 | Neels et al. |
| 2015/0169195 | A1 | 6/2015 | Choi |
| 2015/0169284 | A1 | 6/2015 | Quast et al. |
| 2015/0169336 | A1 | 6/2015 | Harper et al. |
| 2015/0169696 | A1 | 6/2015 | Krishnappa et al. |
| 2015/0170073 | A1 | 6/2015 | Baker |
| 2015/0170657 | A1 | 6/2015 | Thompson et al. |
| 2015/0170664 | A1 | 6/2015 | Doherty et al. |
| 2015/0172262 | A1 | 6/2015 | Ortiz, Jr. et al. |
| 2015/0172463 | A1 | 6/2015 | Quast et al. |
| 2015/0177945 | A1 | 6/2015 | Sengupta et al. |
| 2015/0178388 | A1 | 6/2015 | Winnemoeller et al. |
| 2015/0178785 | A1 | 6/2015 | Salonen |
| 2015/0179168 | A1 | 6/2015 | Hakkani-Tur et al. |
| 2015/0179176 | A1 | 6/2015 | Ryu et al. |
| 2015/0181285 | A1 | 6/2015 | Zhang et al. |
| 2015/0185718 | A1 | 7/2015 | Tappan et al. |
| 2015/0185964 | A1 | 7/2015 | Stout |
| 2015/0185993 | A1 | 7/2015 | Wheatley et al. |
| 2015/0185996 | A1 | 7/2015 | Brown et al. |
| 2015/0186012 | A1 | 7/2015 | Coleman et al. |
| 2015/0186110 | A1 | 7/2015 | Kannan |
| 2015/0186154 | A1 | 7/2015 | Brown et al. |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0186538 | A1 | 7/2015 | Yan et al. |
| 2015/0186783 | A1 | 7/2015 | Byrne et al. |
| 2015/0186892 | A1 | 7/2015 | Zhang et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0189425 | A1 | 7/2015 | Pang |
| 2015/0193005 | A1 | 7/2015 | Di et al. |
| 2015/0193018 | A1 | 7/2015 | Venable et al. |
| 2015/0193379 | A1 | 7/2015 | Mehta |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0194165 | A1 | 7/2015 | Faaborg et al. |
| 2015/0194187 | A1 | 7/2015 | Cleven et al. |
| 2015/0195379 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0200879 | A1 | 7/2015 | Wu et al. |
| 2015/0201064 | A1 | 7/2015 | Bells et al. |
| 2015/0201077 | A1 | 7/2015 | Konig et al. |
| 2015/0205425 | A1 | 7/2015 | Kuscher et al. |
| 2015/0205568 | A1 | 7/2015 | Matsuoka |
| 2015/0205632 | A1 | 7/2015 | Gaster |
| 2015/0205858 | A1 | 7/2015 | Xie et al. |
| 2015/0206529 | A1 | 7/2015 | Kwon et al. |
| 2015/0208226 | A1 | 7/2015 | Kuusilinna et al. |
| 2015/0212791 | A1 | 7/2015 | Kumar et al. |
| 2015/0213140 | A1 | 7/2015 | Volkert |
| 2015/0213796 | A1 | 7/2015 | Waltermann et al. |
| 2015/0215258 | A1 | 7/2015 | Nowakowski et al. |
| 2015/0215350 | A1 | 7/2015 | Slayton et al. |
| 2015/0217870 | A1 | 8/2015 | Mccullough et al. |
| 2015/0220264 | A1 | 8/2015 | Lewis et al. |
| 2015/0220507 | A1 | 8/2015 | Mohajer et al. |
| 2015/0220715 | A1 | 8/2015 | Kim et al. |
| 2015/0220972 | A1 | 8/2015 | Subramanya et al. |
| 2015/0221302 | A1 | 8/2015 | Han et al. |
| 2015/0221304 | A1 | 8/2015 | Stewart |
| 2015/0221307 | A1 | 8/2015 | Shah et al. |
| 2015/0222586 | A1 | 8/2015 | Ebersman et al. |
| 2015/0224848 | A1 | 8/2015 | Eisenhour |
| 2015/0227505 | A1 | 8/2015 | Morimoto |
| 2015/0227633 | A1 | 8/2015 | Shapira |
| 2015/0228274 | A1 | 8/2015 | Leppanen et al. |
| 2015/0228275 | A1 | 8/2015 | Watanabe et al. |
| 2015/0228279 | A1 | 8/2015 | Biadsy et al. |
| 2015/0228281 | A1 | 8/2015 | Raniere |
| 2015/0228282 | A1 | 8/2015 | Evrard |
| 2015/0228283 | A1 | 8/2015 | Ehsani et al. |
| 2015/0228292 | A1 | 8/2015 | Goldstein et al. |
| 2015/0230022 | A1 | 8/2015 | Sakai et al. |
| 2015/0230095 | A1 | 8/2015 | Smith et al. |
| 2015/0234556 | A1 | 8/2015 | Shaofeng et al. |
| 2015/0234636 | A1 | 8/2015 | Barnes, Jr. |
| 2015/0234800 | A1 | 8/2015 | Patrick et al. |
| 2015/0235434 | A1 | 8/2015 | Miller et al. |
| 2015/0235540 | A1 | 8/2015 | Verna et al. |
| 2015/0237301 | A1 | 8/2015 | Shi et al. |
| 2015/0242088 | A1 | 8/2015 | Hasumi |
| 2015/0242091 | A1 | 8/2015 | Lu et al. |

(56) References Cited

U.S. PATENT DOCUMENTS

| | | | |
|---|---|---|---|
| 2015/0242385 | A1 | 8/2015 | Bao et al. |
| 2015/0243278 | A1 | 8/2015 | Kibre et al. |
| 2015/0243279 | A1 | 8/2015 | Morse et al. |
| 2015/0243283 | A1 | 8/2015 | Halash et al. |
| 2015/0244665 | A1 | 8/2015 | Choi et al. |
| 2015/0245154 | A1 | 8/2015 | Dadu et al. |
| 2015/0248494 | A1 | 9/2015 | Mital |
| 2015/0248651 | A1 | 9/2015 | Akutagawa et al. |
| 2015/0248886 | A1 | 9/2015 | Sarikaya et al. |
| 2015/0249664 | A1 | 9/2015 | Talhami et al. |
| 2015/0249715 | A1 | 9/2015 | Helvik et al. |
| 2015/0253146 | A1 | 9/2015 | Annapureddy et al. |
| 2015/0253885 | A1 | 9/2015 | Kagan et al. |
| 2015/0254057 | A1 | 9/2015 | Klein et al. |
| 2015/0254058 | A1 | 9/2015 | Klein et al. |
| 2015/0254333 | A1 | 9/2015 | Fife et al. |
| 2015/0255068 | A1 | 9/2015 | Kim et al. |
| 2015/0255071 | A1 | 9/2015 | Chiba |
| 2015/0256873 | A1 | 9/2015 | Klein et al. |
| 2015/0261298 | A1 | 9/2015 | Li |
| 2015/0261496 | A1 | 9/2015 | Faaborg et al. |
| 2015/0261758 | A1 | 9/2015 | Sharp et al. |
| 2015/0261850 | A1 | 9/2015 | Mittal |
| 2015/0261944 | A1 | 9/2015 | Hosom et al. |
| 2015/0262443 | A1 | 9/2015 | Chong |
| 2015/0262573 | A1 | 9/2015 | Brooks et al. |
| 2015/0262583 | A1 | 9/2015 | Kanda et al. |
| 2015/0268719 | A1 | 9/2015 | Li |
| 2015/0269139 | A1 | 9/2015 | McAteer et al. |
| 2015/0269420 | A1 | 9/2015 | Kim et al. |
| 2015/0269617 | A1 | 9/2015 | Mikurak |
| 2015/0269677 | A1 | 9/2015 | Milne |
| 2015/0269943 | A1 | 9/2015 | VanBlon et al. |
| 2015/0277574 | A1 | 10/2015 | Jain et al. |
| 2015/0278192 | A1 | 10/2015 | Bretter et al. |
| 2015/0278199 | A1 | 10/2015 | Hazen et al. |
| 2015/0278348 | A1 | 10/2015 | Paruchuri et al. |
| 2015/0278370 | A1 | 10/2015 | Stratvert et al. |
| 2015/0278737 | A1 | 10/2015 | Huebscher et al. |
| 2015/0279354 | A1 | 10/2015 | Gruenstein et al. |
| 2015/0279358 | A1 | 10/2015 | Kingsbury et al. |
| 2015/0279360 | A1 | 10/2015 | Mengibar et al. |
| 2015/0279366 | A1 | 10/2015 | Krestnikov et al. |
| 2015/0281380 | A1 | 10/2015 | Wang et al. |
| 2015/0281401 | A1 | 10/2015 | Le et al. |
| 2015/0286627 | A1 | 10/2015 | Chang et al. |
| 2015/0286710 | A1 | 10/2015 | Chang et al. |
| 2015/0286716 | A1 | 10/2015 | Snibbe et al. |
| 2015/0286937 | A1 | 10/2015 | Hildebrand |
| 2015/0287401 | A1 | 10/2015 | Lee et al. |
| 2015/0287408 | A1 | 10/2015 | Svendsen et al. |
| 2015/0287409 | A1 | 10/2015 | Jang |
| 2015/0287411 | A1 | 10/2015 | Kojima et al. |
| 2015/0288629 | A1 | 10/2015 | Choi et al. |
| 2015/0293602 | A1 | 10/2015 | Kay et al. |
| 2015/0294086 | A1 | 10/2015 | Kare et al. |
| 2015/0294377 | A1 | 10/2015 | Chow |
| 2015/0294516 | A1 | 10/2015 | Chiang |
| 2015/0294670 | A1 | 10/2015 | Roblek et al. |
| 2015/0295915 | A1 | 10/2015 | Xiu |
| 2015/0296065 | A1 | 10/2015 | Narita et al. |
| 2015/0300832 | A1 | 10/2015 | Moore et al. |
| 2015/0301796 | A1 | 10/2015 | Visser et al. |
| 2015/0302316 | A1 | 10/2015 | Buryak et al. |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0302870 | A1 | 10/2015 | Burke et al. |
| 2015/0308470 | A1 | 10/2015 | Graham et al. |
| 2015/0309691 | A1 | 10/2015 | Seo et al. |
| 2015/0309997 | A1 | 10/2015 | Lee et al. |
| 2015/0310114 | A1 | 10/2015 | Ryger et al. |
| 2015/0310852 | A1 | 10/2015 | Spizzo et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0310888 | A1 | 10/2015 | Chen |
| 2015/0312182 | A1 | 10/2015 | Langholz |
| 2015/0312409 | A1 | 10/2015 | Czarnecki et al. |
| 2015/0312523 | A1 | 10/2015 | Li et al. |
| 2015/0314454 | A1 | 11/2015 | Breazeal et al. |
| 2015/0317069 | A1 | 11/2015 | Clements et al. |
| 2015/0317310 | A1 | 11/2015 | Eiche et al. |
| 2015/0319264 | A1 | 11/2015 | Allen et al. |
| 2015/0319411 | A1 | 11/2015 | Kasmir et al. |
| 2015/0324041 | A1 | 11/2015 | Varley et al. |
| 2015/0324334 | A1 | 11/2015 | Lee et al. |
| 2015/0324362 | A1 | 11/2015 | Glass et al. |
| 2015/0325235 | A1 | 11/2015 | Levit et al. |
| 2015/0331664 | A1 | 11/2015 | Osawa et al. |
| 2015/0331711 | A1 | 11/2015 | Huang et al. |
| 2015/0331728 | A1 | 11/2015 | Kim et al. |
| 2015/0332667 | A1 | 11/2015 | Mason |
| 2015/0334346 | A1 | 11/2015 | Cheatham, III et al. |
| 2015/0339049 | A1 | 11/2015 | Kasemset et al. |
| 2015/0339391 | A1 | 11/2015 | Kang et al. |
| 2015/0340033 | A1 | 11/2015 | Di Fabbrizio et al. |
| 2015/0340034 | A1 | 11/2015 | Schalkwyk et al. |
| 2015/0340040 | A1 | 11/2015 | Mun et al. |
| 2015/0340042 | A1 | 11/2015 | Sejnoha et al. |
| 2015/0341717 | A1 | 11/2015 | Song et al. |
| 2015/0346845 | A1 | 12/2015 | Di Censo et al. |
| 2015/0347086 | A1 | 12/2015 | Liedholm et al. |
| 2015/0347381 | A1 | 12/2015 | Bellegarda |
| 2015/0347382 | A1 | 12/2015 | Dolfing et al. |
| 2015/0347383 | A1 | 12/2015 | Willmore et al. |
| 2015/0347385 | A1 | 12/2015 | Flor et al. |
| 2015/0347393 | A1 | 12/2015 | Futrell et al. |
| 2015/0347552 | A1 | 12/2015 | Habouzit et al. |
| 2015/0347733 | A1 | 12/2015 | Tsou et al. |
| 2015/0347985 | A1 | 12/2015 | Gross et al. |
| 2015/0348533 | A1 | 12/2015 | Saddler et al. |
| 2015/0348547 | A1 | 12/2015 | Paulik et al. |
| 2015/0348548 | A1 | 12/2015 | Piernot et al. |
| 2015/0348549 | A1 | 12/2015 | Giuli et al. |
| 2015/0348551 | A1 | 12/2015 | Gruber et al. |
| 2015/0348554 | A1 | 12/2015 | Orr et al. |
| 2015/0348555 | A1 | 12/2015 | Sugita |
| 2015/0348565 | A1 | 12/2015 | Rhoten et al. |
| 2015/0349934 | A1 | 12/2015 | Pollack et al. |
| 2015/0350031 | A1 | 12/2015 | Burks et al. |
| 2015/0350147 | A1 | 12/2015 | Shepherd et al. |
| 2015/0350342 | A1 | 12/2015 | Thorpe et al. |
| 2015/0350594 | A1 | 12/2015 | Mate et al. |
| 2015/0350771 | A1 | 12/2015 | Konchitsky |
| 2015/0352999 | A1 | 12/2015 | Bando et al. |
| 2015/0355879 | A1 | 12/2015 | Beckhardt et al. |
| 2015/0356410 | A1 | 12/2015 | Faith et al. |
| 2015/0363587 | A1 | 12/2015 | Ahn et al. |
| 2015/0364128 | A1 | 12/2015 | Zhao et al. |
| 2015/0364140 | A1 | 12/2015 | Thorn |
| 2015/0365251 | A1 | 12/2015 | Kinoshita et al. |
| 2015/0365448 | A1 | 12/2015 | Stifelman et al. |
| 2015/0370455 | A1 | 12/2015 | Van Os et al. |
| 2015/0370531 | A1 | 12/2015 | Faaborg |
| 2015/0370780 | A1 | 12/2015 | Wang et al. |
| 2015/0370787 | A1 | 12/2015 | Akbacak et al. |
| 2015/0370884 | A1 | 12/2015 | Hurley et al. |
| 2015/0371215 | A1 | 12/2015 | Zhou et al. |
| 2015/0371529 | A1 | 12/2015 | Dolecki |
| 2015/0371639 | A1 | 12/2015 | Foerster et al. |
| 2015/0371663 | A1 | 12/2015 | Gustafson et al. |
| 2015/0371664 | A1 | 12/2015 | Bar-Or et al. |
| 2015/0371665 | A1 | 12/2015 | Naik et al. |
| 2015/0373183 | A1 | 12/2015 | Woolsey et al. |
| 2015/0373428 | A1 | 12/2015 | Trollope et al. |
| 2015/0379118 | A1 | 12/2015 | Wickenkamp et al. |
| 2015/0379414 | A1 | 12/2015 | Yeh et al. |
| 2015/0379423 | A1 | 12/2015 | Dirac et al. |
| 2015/0379993 | A1 | 12/2015 | Subhojit et al. |
| 2015/0381923 | A1 | 12/2015 | Wickenkamp et al. |
| 2015/0382047 | A1 | 12/2015 | Van Os et al. |
| 2015/0382079 | A1* | 12/2015 | Lister .................... H04N 5/783 725/38 |

(56) References Cited

U.S. PATENT DOCUMENTS

| | | | |
|---|---|---|---|
| 2015/0382147 | A1 | 12/2015 | Clark et al. |
| 2015/0382164 | A1 | 12/2015 | Chung et al. |
| 2015/0382322 | A1 | 12/2015 | Migicovsky et al. |
| 2016/0004499 | A1 | 1/2016 | Kim et al. |
| 2016/0004690 | A1 | 1/2016 | Bangalore et al. |
| 2016/0005320 | A1 | 1/2016 | DeCharms et al. |
| 2016/0006795 | A1 | 1/2016 | Yunten |
| 2016/0012038 | A1 | 1/2016 | Edwards et al. |
| 2016/0014476 | A1 | 1/2016 | Caliendo, Jr. et al. |
| 2016/0018872 | A1 | 1/2016 | Tu et al. |
| 2016/0018899 | A1 | 1/2016 | Tu et al. |
| 2016/0018900 | A1 | 1/2016 | Tu et al. |
| 2016/0018959 | A1 | 1/2016 | Yamashita et al. |
| 2016/0019886 | A1 | 1/2016 | Hong |
| 2016/0019896 | A1 | 1/2016 | Guevara et al. |
| 2016/0021168 | A1 | 1/2016 | Chaudhri et al. |
| 2016/0021414 | A1 | 1/2016 | Padi et al. |
| 2016/0026242 | A1 | 1/2016 | Burns et al. |
| 2016/0026258 | A1 | 1/2016 | Ou et al. |
| 2016/0027431 | A1 | 1/2016 | Kurzweil et al. |
| 2016/0027439 | A1 | 1/2016 | Sharifi |
| 2016/0028666 | A1 | 1/2016 | Li |
| 2016/0028802 | A1 | 1/2016 | Balasingh et al. |
| 2016/0029316 | A1 | 1/2016 | Mohan et al. |
| 2016/0034042 | A1 | 2/2016 | Joo |
| 2016/0034253 | A1 | 2/2016 | Bang et al. |
| 2016/0034447 | A1 | 2/2016 | Shin et al. |
| 2016/0034811 | A1 | 2/2016 | Paulik et al. |
| 2016/0036750 | A1 | 2/2016 | Yuan et al. |
| 2016/0036953 | A1 | 2/2016 | Lee et al. |
| 2016/0041733 | A1 | 2/2016 | Qian et al. |
| 2016/0041809 | A1 | 2/2016 | Clayton et al. |
| 2016/0042735 | A1 | 2/2016 | Vibbert et al. |
| 2016/0042748 | A1 | 2/2016 | Jain et al. |
| 2016/0043905 | A1 | 2/2016 | Fiedler |
| 2016/0048666 | A1 | 2/2016 | Dey et al. |
| 2016/0050254 | A1 | 2/2016 | Rao et al. |
| 2016/0055422 | A1 | 2/2016 | Li |
| 2016/0057203 | A1 | 2/2016 | Gardenfors et al. |
| 2016/0057475 | A1 | 2/2016 | Liu |
| 2016/0061623 | A1 | 3/2016 | Pahwa et al. |
| 2016/0062459 | A1 | 3/2016 | Publicover et al. |
| 2016/0062605 | A1 | 3/2016 | Agarwal et al. |
| 2016/0063094 | A1 | 3/2016 | Udupa et al. |
| 2016/0063095 | A1 | 3/2016 | Nassar et al. |
| 2016/0063998 | A1* | 3/2016 | Krishnamoorthy ..... G10L 15/22 704/254 |
| 2016/0065155 | A1 | 3/2016 | Bharj et al. |
| 2016/0065626 | A1 | 3/2016 | Jain et al. |
| 2016/0066020 | A1 | 3/2016 | Mountain |
| 2016/0066360 | A1 | 3/2016 | Vinegrad et al. |
| 2016/0070581 | A1 | 3/2016 | Soon-Shiong |
| 2016/0071510 | A1 | 3/2016 | Li et al. |
| 2016/0071516 | A1 | 3/2016 | Lee et al. |
| 2016/0071517 | A1 | 3/2016 | Beaver et al. |
| 2016/0071520 | A1 | 3/2016 | Hayakawa |
| 2016/0071521 | A1 | 3/2016 | Haughay |
| 2016/0072940 | A1 | 3/2016 | Cronin |
| 2016/0077794 | A1 | 3/2016 | Kim et al. |
| 2016/0078359 | A1 | 3/2016 | Csurka et al. |
| 2016/0078860 | A1 | 3/2016 | Paulik et al. |
| 2016/0080165 | A1 | 3/2016 | Ehsani et al. |
| 2016/0080475 | A1 | 3/2016 | Singh et al. |
| 2016/0085295 | A1 | 3/2016 | Shimy et al. |
| 2016/0085827 | A1 | 3/2016 | Chadha et al. |
| 2016/0086116 | A1 | 3/2016 | Rao et al. |
| 2016/0086599 | A1 | 3/2016 | Kurata et al. |
| 2016/0088335 | A1 | 3/2016 | Zucchetta |
| 2016/0091871 | A1 | 3/2016 | Marti et al. |
| 2016/0091967 | A1 | 3/2016 | Prokofieva et al. |
| 2016/0092046 | A1 | 3/2016 | Hong et al. |
| 2016/0092074 | A1 | 3/2016 | Raux et al. |
| 2016/0092434 | A1 | 3/2016 | Bellegarda |
| 2016/0092447 | A1 | 3/2016 | Pathurudeen et al. |
| 2016/0092766 | A1 | 3/2016 | Sainath et al. |
| 2016/0093291 | A1 | 3/2016 | Kim |
| 2016/0093298 | A1 | 3/2016 | Naik et al. |
| 2016/0093301 | A1 | 3/2016 | Bellegarda et al. |
| 2016/0093304 | A1 | 3/2016 | Kim et al. |
| 2016/0094700 | A1 | 3/2016 | Lee et al. |
| 2016/0094889 | A1 | 3/2016 | Venkataraman et al. |
| 2016/0094979 | A1 | 3/2016 | Naik et al. |
| 2016/0098991 | A1 | 4/2016 | Luo et al. |
| 2016/0098992 | A1 | 4/2016 | Renard et al. |
| 2016/0099892 | A1 | 4/2016 | Palakovich et al. |
| 2016/0099984 | A1 | 4/2016 | Karagiannis et al. |
| 2016/0104480 | A1 | 4/2016 | Sharifi |
| 2016/0104486 | A1 | 4/2016 | Penilla et al. |
| 2016/0105308 | A1 | 4/2016 | Dutt |
| 2016/0111091 | A1 | 4/2016 | Bakish |
| 2016/0112746 | A1 | 4/2016 | Zhang et al. |
| 2016/0112792 | A1 | 4/2016 | Lee et al. |
| 2016/0116980 | A1 | 4/2016 | George-Svahn et al. |
| 2016/0117386 | A1 | 4/2016 | Ajmera et al. |
| 2016/0118048 | A1 | 4/2016 | Heide |
| 2016/0119338 | A1 | 4/2016 | Cheyer |
| 2016/0125048 | A1 | 5/2016 | Hamada |
| 2016/0125071 | A1 | 5/2016 | Gabbai |
| 2016/0132046 | A1 | 5/2016 | Beoughter et al. |
| 2016/0132290 | A1 | 5/2016 | Raux |
| 2016/0132484 | A1 | 5/2016 | Nauze et al. |
| 2016/0132488 | A1 | 5/2016 | Clark et al. |
| 2016/0133254 | A1 | 5/2016 | Vogel et al. |
| 2016/0139662 | A1 | 5/2016 | Dabhade |
| 2016/0139720 | A1 | 5/2016 | Kritt et al. |
| 2016/0140113 | A1 | 5/2016 | Shen |
| 2016/0140951 | A1 | 5/2016 | Agiomyrgiannakis et al. |
| 2016/0140962 | A1 | 5/2016 | Sharifi |
| 2016/0147725 | A1 | 5/2016 | Patten et al. |
| 2016/0147739 | A1 | 5/2016 | Lim et al. |
| 2016/0148610 | A1 | 5/2016 | Kennewick, Jr. et al. |
| 2016/0148612 | A1 | 5/2016 | Guo et al. |
| 2016/0148613 | A1 | 5/2016 | Kwon et al. |
| 2016/0149966 | A1 | 5/2016 | Remash et al. |
| 2016/0150020 | A1 | 5/2016 | Farmer et al. |
| 2016/0151668 | A1 | 6/2016 | Barnes et al. |
| 2016/0154624 | A1 | 6/2016 | Son et al. |
| 2016/0154792 | A1 | 6/2016 | Sarikaya et al. |
| 2016/0154880 | A1 | 6/2016 | Hoarty |
| 2016/0155442 | A1 | 6/2016 | Kannan et al. |
| 2016/0155443 | A1 | 6/2016 | Khan et al. |
| 2016/0156574 | A1 | 6/2016 | Hum et al. |
| 2016/0156990 | A1 | 6/2016 | Miccoy et al. |
| 2016/0162456 | A1 | 6/2016 | Munro et al. |
| 2016/0163311 | A1 | 6/2016 | Crook et al. |
| 2016/0163312 | A1 | 6/2016 | Naik et al. |
| 2016/0165296 | A1 | 6/2016 | Hamon |
| 2016/0169267 | A1 | 6/2016 | Pool |
| 2016/0170710 | A1 | 6/2016 | Kim et al. |
| 2016/0170966 | A1 | 6/2016 | Kolo |
| 2016/0171980 | A1 | 6/2016 | Liddell et al. |
| 2016/0173578 | A1 | 6/2016 | Sharma et al. |
| 2016/0173617 | A1 | 6/2016 | Allinson |
| 2016/0173929 | A1 | 6/2016 | Klappert |
| 2016/0173960 | A1 | 6/2016 | Snibbe et al. |
| 2016/0179462 | A1 | 6/2016 | Bjorkengren |
| 2016/0179464 | A1 | 6/2016 | Reddy et al. |
| 2016/0179787 | A1 | 6/2016 | Deleeuw |
| 2016/0180840 | A1 | 6/2016 | Siddiq et al. |
| 2016/0180844 | A1 | 6/2016 | Vanblon et al. |
| 2016/0182410 | A1 | 6/2016 | Janakiraman et al. |
| 2016/0182709 | A1 | 6/2016 | Kim et al. |
| 2016/0188181 | A1 | 6/2016 | Smith |
| 2016/0188738 | A1 | 6/2016 | Gruber et al. |
| 2016/0189198 | A1 | 6/2016 | Daniel et al. |
| 2016/0189706 | A1 | 6/2016 | Zopf et al. |
| 2016/0189715 | A1 | 6/2016 | Nishikawa |
| 2016/0189717 | A1 | 6/2016 | Kannan et al. |
| 2016/0195924 | A1 | 7/2016 | Weber et al. |
| 2016/0196110 | A1 | 7/2016 | Yehoshua et al. |
| 2016/0198319 | A1 | 7/2016 | Huang et al. |
| 2016/0202957 | A1 | 7/2016 | Siddall et al. |
| 2016/0203002 | A1 | 7/2016 | Kannan et al. |
| 2016/0203193 | A1 | 7/2016 | Kevin et al. |

(56) References Cited

U.S. PATENT DOCUMENTS

| | | | | |
|---|---|---|---|---|
| 2016/0210115 | A1 | 7/2016 | Lee | |
| 2016/0210551 | A1 | 7/2016 | Lee et al. | |
| 2016/0210981 | A1 | 7/2016 | Lee | |
| 2016/0212206 | A1 | 7/2016 | Wu et al. | |
| 2016/0212208 | A1 | 7/2016 | Kulkarni et al. | |
| 2016/0212488 | A1 | 7/2016 | Os et al. | |
| 2016/0217784 | A1 | 7/2016 | Gelfenbeyn et al. | |
| 2016/0217794 | A1 | 7/2016 | Imoto et al. | |
| 2016/0224540 | A1 | 8/2016 | Stewart et al. | |
| 2016/0224559 | A1 | 8/2016 | Hicks et al. | |
| 2016/0224774 | A1 | 8/2016 | Pender | |
| 2016/0225372 | A1 | 8/2016 | Cheung et al. | |
| 2016/0226713 | A1 | 8/2016 | Pitschel et al. | |
| 2016/0226956 | A1 | 8/2016 | Hong et al. | |
| 2016/0227107 | A1 | 8/2016 | Beaumont | |
| 2016/0227633 | A1 | 8/2016 | Sun et al. | |
| 2016/0232500 | A1 | 8/2016 | Wang et al. | |
| 2016/0234206 | A1 | 8/2016 | Tunnell et al. | |
| 2016/0239480 | A1 | 8/2016 | Larcheveque et al. | |
| 2016/0239568 | A1 | 8/2016 | Packer et al. | |
| 2016/0239645 | A1 | 8/2016 | Heo et al. | |
| 2016/0239848 | A1 | 8/2016 | Chang et al. | |
| 2016/0240187 | A1 | 8/2016 | Fleizach et al. | |
| 2016/0240189 | A1 | 8/2016 | Lee et al. | |
| 2016/0240192 | A1 | 8/2016 | Raghuvir | |
| 2016/0242148 | A1 | 8/2016 | Reed | |
| 2016/0246776 | A1 | 8/2016 | Zhao et al. | |
| 2016/0247061 | A1 | 8/2016 | Trask et al. | |
| 2016/0247110 | A1 | 8/2016 | Sinha | |
| 2016/0249319 | A1 | 8/2016 | Dotan-Cohen et al. | |
| 2016/0252972 | A1 | 9/2016 | Kim et al. | |
| 2016/0253312 | A1 | 9/2016 | Rhodes | |
| 2016/0253528 | A1 | 9/2016 | Gao et al. | |
| 2016/0255549 | A1 | 9/2016 | Lakhdhar et al. | |
| 2016/0259623 | A1 | 9/2016 | Sumner et al. | |
| 2016/0259656 | A1 | 9/2016 | Sumner et al. | |
| 2016/0259779 | A1 | 9/2016 | Labsky et al. | |
| 2016/0260130 | A1 | 9/2016 | Chand et al. | |
| 2016/0260431 | A1 | 9/2016 | Newendorp et al. | |
| 2016/0260433 | A1 | 9/2016 | Sumner et al. | |
| 2016/0260434 | A1 | 9/2016 | Gelfenbeyn et al. | |
| 2016/0260436 | A1 | 9/2016 | Lemay et al. | |
| 2016/0262442 | A1 | 9/2016 | Davila et al. | |
| 2016/0266653 | A1 | 9/2016 | Liu et al. | |
| 2016/0266871 | A1 | 9/2016 | Schmid et al. | |
| 2016/0267904 | A1 | 9/2016 | Biadsy et al. | |
| 2016/0269540 | A1 | 9/2016 | Butcher et al. | |
| 2016/0274938 | A1 | 9/2016 | Strinati et al. | |
| 2016/0275941 | A1 | 9/2016 | Bellegarda et al. | |
| 2016/0275947 | A1 | 9/2016 | Li et al. | |
| 2016/0282824 | A1 | 9/2016 | Smallwood et al. | |
| 2016/0282956 | A1 | 9/2016 | Ouyang et al. | |
| 2016/0283055 | A1 | 9/2016 | Haghighat et al. | |
| 2016/0283185 | A1 | 9/2016 | McLaren et al. | |
| 2016/0283455 | A1 | 9/2016 | Mardanbegi et al. | |
| 2016/0283463 | A1 | 9/2016 | Sumesh et al. | |
| 2016/0284005 | A1 | 9/2016 | Daniel et al. | |
| 2016/0284199 | A1 | 9/2016 | Dotan-Cohen et al. | |
| 2016/0284340 | A1 | 9/2016 | Li et al. | |
| 2016/0284350 | A1 | 9/2016 | Yun et al. | |
| 2016/0285808 | A1 | 9/2016 | Franklin et al. | |
| 2016/0286045 | A1 | 9/2016 | Shaltiel et al. | |
| 2016/0291831 | A1 | 10/2016 | Baek | |
| 2016/0292603 | A1 | 10/2016 | Prajapati et al. | |
| 2016/0293157 | A1 | 10/2016 | Chen et al. | |
| 2016/0293167 | A1 | 10/2016 | Chen et al. | |
| 2016/0293168 | A1 | 10/2016 | Chen | |
| 2016/0294755 | A1 | 10/2016 | Prabhu | |
| 2016/0294813 | A1 | 10/2016 | Zou | |
| 2016/0299685 | A1 | 10/2016 | Zhai et al. | |
| 2016/0299882 | A1 | 10/2016 | Hegerty et al. | |
| 2016/0299883 | A1 | 10/2016 | Zhu et al. | |
| 2016/0299977 | A1 | 10/2016 | Hreha | |
| 2016/0300571 | A1 | 10/2016 | Foerster et al. | |
| 2016/0301639 | A1 | 10/2016 | Liu et al. | |
| 2016/0306683 | A1 | 10/2016 | Standley et al. | |
| 2016/0307566 | A1 | 10/2016 | Bellegarda | |
| 2016/0308799 | A1 | 10/2016 | Schubert et al. | |
| 2016/0309035 | A1 | 10/2016 | Li | |
| 2016/0313906 | A1 | 10/2016 | Kilchenko et al. | |
| 2016/0313958 | A1 | 10/2016 | Guadarrama et al. | |
| 2016/0314788 | A1 | 10/2016 | Jitkoff et al. | |
| 2016/0314789 | A1 | 10/2016 | Marcheret et al. | |
| 2016/0314792 | A1 | 10/2016 | Alvarez et al. | |
| 2016/0315996 | A1 | 10/2016 | Ha et al. | |
| 2016/0316349 | A1 | 10/2016 | Lee et al. | |
| 2016/0317924 | A1 | 11/2016 | Tanaka et al. | |
| 2016/0320838 | A1 | 11/2016 | Teller et al. | |
| 2016/0321239 | A1 | 11/2016 | Iso-Sipila et al. | |
| 2016/0321243 | A1 | 11/2016 | Walia et al. | |
| 2016/0321261 | A1 | 11/2016 | Spasojevic et al. | |
| 2016/0321358 | A1 | 11/2016 | Kanani et al. | |
| 2016/0322043 | A1 | 11/2016 | Bellegarda | |
| 2016/0322044 | A1 | 11/2016 | Jung et al. | |
| 2016/0322045 | A1 | 11/2016 | Hatfield et al. | |
| 2016/0322048 | A1 | 11/2016 | Amano et al. | |
| 2016/0322050 | A1 | 11/2016 | Wang et al. | |
| 2016/0322055 | A1 | 11/2016 | Sainath et al. | |
| 2016/0328134 | A1 | 11/2016 | Xu | |
| 2016/0328147 | A1 | 11/2016 | Zhang et al. | |
| 2016/0328205 | A1 | 11/2016 | Agrawal et al. | |
| 2016/0328893 | A1 | 11/2016 | Cordova et al. | |
| 2016/0329060 | A1 | 11/2016 | Ito et al. | |
| 2016/0334973 | A1 | 11/2016 | Reckhow et al. | |
| 2016/0335138 | A1 | 11/2016 | Surti et al. | |
| 2016/0335139 | A1 | 11/2016 | Hurley et al. | |
| 2016/0335532 | A1 | 11/2016 | Sanghavi et al. | |
| 2016/0336006 | A1 | 11/2016 | Levit et al. | |
| 2016/0336007 | A1 | 11/2016 | Hanazawa et al. | |
| 2016/0336010 | A1 | 11/2016 | Lindahl | |
| 2016/0336011 | A1 | 11/2016 | Koll et al. | |
| 2016/0336024 | A1 | 11/2016 | Choi et al. | |
| 2016/0337299 | A1 | 11/2016 | Lane et al. | |
| 2016/0337301 | A1 | 11/2016 | Rollins et al. | |
| 2016/0342317 | A1 | 11/2016 | Lim et al. | |
| 2016/0342685 | A1 | 11/2016 | Basu et al. | |
| 2016/0342781 | A1 | 11/2016 | Jeon | |
| 2016/0342803 | A1 | 11/2016 | Goodridge et al. | |
| 2016/0350070 | A1 | 12/2016 | Sung et al. | |
| 2016/0350650 | A1 | 12/2016 | Leeman-Munk et al. | |
| 2016/0350812 | A1 | 12/2016 | Priness et al. | |
| 2016/0351190 | A1 | 12/2016 | Piernot et al. | |
| 2016/0352567 | A1 | 12/2016 | Robbins et al. | |
| 2016/0352924 | A1 | 12/2016 | Senarath et al. | |
| 2016/0357304 | A1 | 12/2016 | Hatori et al. | |
| 2016/0357507 | A1 | 12/2016 | Decker et al. | |
| 2016/0357728 | A1 | 12/2016 | Bellegarda et al. | |
| 2016/0357790 | A1 | 12/2016 | Elkington et al. | |
| 2016/0357861 | A1 | 12/2016 | Carlhian et al. | |
| 2016/0357870 | A1 | 12/2016 | Hentschel et al. | |
| 2016/0358180 | A1 | 12/2016 | Van et al. | |
| 2016/0358598 | A1 | 12/2016 | Williams et al. | |
| 2016/0358600 | A1 | 12/2016 | Nallasamy et al. | |
| 2016/0358603 | A1 | 12/2016 | Azam et al. | |
| 2016/0358605 | A1 | 12/2016 | Ganong et al. | |
| 2016/0358609 | A1 | 12/2016 | Connell et al. | |
| 2016/0358619 | A1 | 12/2016 | Ramprashad et al. | |
| 2016/0359771 | A1 | 12/2016 | Sridhar | |
| 2016/0360039 | A1 | 12/2016 | Sanghavi et al. | |
| 2016/0360336 | A1 | 12/2016 | Gross et al. | |
| 2016/0360382 | A1 | 12/2016 | Gross et al. | |
| 2016/0364378 | A1 | 12/2016 | Futrell et al. | |
| 2016/0364382 | A1 | 12/2016 | Sarikaya | |
| 2016/0365101 | A1 | 12/2016 | Foy et al. | |
| 2016/0371054 | A1 | 12/2016 | Beaumont et al. | |
| 2016/0371250 | A1 | 12/2016 | Rhodes | |
| 2016/0372112 | A1 | 12/2016 | Miller et al. | |
| 2016/0372119 | A1 | 12/2016 | Sak et al. | |
| 2016/0373571 | A1 | 12/2016 | Woolsey et al. | |
| 2016/0378080 | A1 | 12/2016 | Uppala et al. | |
| 2016/0378210 | A1 | 12/2016 | Shi | |
| 2016/0378747 | A1 * | 12/2016 | Orr | G06F 40/30 704/9 |
| 2016/0379091 | A1 | 12/2016 | Lin et al. | |

(56) References Cited

U.S. PATENT DOCUMENTS

| | | | |
|---|---|---|---|
| 2016/0379105 A1 | 12/2016 | Moore, Jr. | |
| 2016/0379626 A1 | 12/2016 | Deisher et al. | |
| 2016/0379632 A1 | 12/2016 | Hoffmeister et al. | |
| 2016/0379633 A1 | 12/2016 | Lehman et al. | |
| 2016/0379639 A1 | 12/2016 | Weinstein et al. | |
| 2016/0379641 A1 | 12/2016 | Liu et al. | |
| 2017/0000348 A1 | 1/2017 | Karsten et al. | |
| 2017/0003931 A1 | 1/2017 | Dvortsov et al. | |
| 2017/0004209 A1 | 1/2017 | Johl et al. | |
| 2017/0004409 A1 | 1/2017 | Chu et al. | |
| 2017/0004824 A1 | 1/2017 | Yoo et al. | |
| 2017/0005818 A1 | 1/2017 | Gould | |
| 2017/0006329 A1 | 1/2017 | Jang et al. | |
| 2017/0011091 A1 | 1/2017 | Chehreghani | |
| 2017/0011279 A1 | 1/2017 | Soldevila et al. | |
| 2017/0011303 A1 | 1/2017 | Annapureddy et al. | |
| 2017/0011742 A1 | 1/2017 | Jing et al. | |
| 2017/0013124 A1 | 1/2017 | Havelka et al. | |
| 2017/0013331 A1 | 1/2017 | Watanabe et al. | |
| 2017/0018271 A1 | 1/2017 | Khan et al. | |
| 2017/0019987 A1 | 1/2017 | Dragone et al. | |
| 2017/0023963 A1 | 1/2017 | Davis et al. | |
| 2017/0024398 A1 | 1/2017 | Tomkins et al. | |
| 2017/0025124 A1 | 1/2017 | Mixter et al. | |
| 2017/0026318 A1 | 1/2017 | Daniel et al. | |
| 2017/0026509 A1 | 1/2017 | Rand | |
| 2017/0026705 A1 | 1/2017 | Yeh et al. | |
| 2017/0027522 A1 | 2/2017 | Van Hasselt et al. | |
| 2017/0031576 A1 | 2/2017 | Saoji et al. | |
| 2017/0031711 A1 | 2/2017 | Wu et al. | |
| 2017/0032022 A1 | 2/2017 | Srinivasan et al. | |
| 2017/0032440 A1 | 2/2017 | Paton | |
| 2017/0032783 A1 | 2/2017 | Lord et al. | |
| 2017/0032787 A1 | 2/2017 | Dayal | |
| 2017/0032791 A1 | 2/2017 | Elson et al. | |
| 2017/0034087 A1 | 2/2017 | Borenstein et al. | |
| 2017/0039283 A1 | 2/2017 | Bennett et al. | |
| 2017/0039475 A1 | 2/2017 | Cheyer et al. | |
| 2017/0040002 A1 | 2/2017 | Basson et al. | |
| 2017/0041388 A1 | 2/2017 | Tal et al. | |
| 2017/0041858 A1 | 2/2017 | Tong et al. | |
| 2017/0046025 A1 | 2/2017 | Dascola et al. | |
| 2017/0046330 A1 | 2/2017 | Si et al. | |
| 2017/0047063 A1 | 2/2017 | Ohmura et al. | |
| 2017/0052760 A1 | 2/2017 | Johnson et al. | |
| 2017/0053652 A1 | 2/2017 | Choi et al. | |
| 2017/0055895 A1 | 3/2017 | Jardins et al. | |
| 2017/0060853 A1 | 3/2017 | Lee et al. | |
| 2017/0061423 A1 | 3/2017 | Bryant et al. | |
| 2017/0068423 A1 | 3/2017 | Napolitano et al. | |
| 2017/0068513 A1 | 3/2017 | Stasior et al. | |
| 2017/0068550 A1 | 3/2017 | Zeitlin | |
| 2017/0068670 A1 | 3/2017 | Orr et al. | |
| 2017/0069308 A1 | 3/2017 | Aleksic et al. | |
| 2017/0069321 A1 | 3/2017 | Toiyama | |
| 2017/0069327 A1 | 3/2017 | Heigold et al. | |
| 2017/0075653 A1 | 3/2017 | Dawidowsky et al. | |
| 2017/0075879 A1 | 3/2017 | Sakamoto et al. | |
| 2017/0076518 A1 | 3/2017 | Patterson et al. | |
| 2017/0076720 A1 | 3/2017 | Gopalan et al. | |
| 2017/0076721 A1 | 3/2017 | Bargetzi et al. | |
| 2017/0078490 A1 | 3/2017 | Kaminsky et al. | |
| 2017/0083179 A1 | 3/2017 | Gruber et al. | |
| 2017/0083285 A1 | 3/2017 | Meyers et al. | |
| 2017/0083504 A1 | 3/2017 | Huang | |
| 2017/0083506 A1 | 3/2017 | Liu et al. | |
| 2017/0084277 A1 | 3/2017 | Sharifi | |
| 2017/0085547 A1 | 3/2017 | De Aguiar et al. | |
| 2017/0085696 A1 | 3/2017 | Abkairov | |
| 2017/0090428 A1 | 3/2017 | Oohara | |
| 2017/0090569 A1 | 3/2017 | Levesque | |
| 2017/0090864 A1 | 3/2017 | Jorgovanovic | |
| 2017/0091168 A1 | 3/2017 | Bellegarda et al. | |
| 2017/0091169 A1 | 3/2017 | Bellegarda et al. | |
| 2017/0091612 A1 | 3/2017 | Gruber et al. | |
| 2017/0092259 A1 | 3/2017 | Jeon | |
| 2017/0092270 A1 | 3/2017 | Newendorp et al. | |
| 2017/0092278 A1 | 3/2017 | Evermann et al. | |
| 2017/0093356 A1 | 3/2017 | Cudak et al. | |
| 2017/0097743 A1 | 4/2017 | Hameed et al. | |
| 2017/0102837 A1 | 4/2017 | Toumpelis | |
| 2017/0102915 A1 | 4/2017 | Kuscher et al. | |
| 2017/0103749 A1 | 4/2017 | Zhao et al. | |
| 2017/0103752 A1 | 4/2017 | Senior et al. | |
| 2017/0105190 A1 | 4/2017 | Logan et al. | |
| 2017/0108236 A1 | 4/2017 | Guan et al. | |
| 2017/0110117 A1 | 4/2017 | Chakladar et al. | |
| 2017/0110125 A1 | 4/2017 | Xu et al. | |
| 2017/0116177 A1 | 4/2017 | Walia | |
| 2017/0116982 A1 | 4/2017 | Gelfenbeyn et al. | |
| 2017/0116985 A1 | 4/2017 | Mathias et al. | |
| 2017/0116987 A1 | 4/2017 | Kang et al. | |
| 2017/0116989 A1 | 4/2017 | Yadgar et al. | |
| 2017/0124190 A1 | 5/2017 | Wang et al. | |
| 2017/0124311 A1 | 5/2017 | Li et al. | |
| 2017/0124531 A1 | 5/2017 | McCormack | |
| 2017/0125016 A1 | 5/2017 | Wang | |
| 2017/0127124 A9 | 5/2017 | Wilson et al. | |
| 2017/0131778 A1 | 5/2017 | Iyer | |
| 2017/0132019 A1 | 5/2017 | Karashchuk et al. | |
| 2017/0132199 A1 | 5/2017 | Vescovi et al. | |
| 2017/0133007 A1 | 5/2017 | Drewes | |
| 2017/0133009 A1 | 5/2017 | Cho et al. | |
| 2017/0134807 A1 | 5/2017 | Shaw et al. | |
| 2017/0140041 A1 | 5/2017 | Dotan-Cohen et al. | |
| 2017/0140052 A1 | 5/2017 | Bufe, III et al. | |
| 2017/0140644 A1 | 5/2017 | Hwang et al. | |
| 2017/0140760 A1 | 5/2017 | Sachdev | |
| 2017/0147722 A1 | 5/2017 | Greenwood | |
| 2017/0147841 A1 | 5/2017 | Stagg et al. | |
| 2017/0148044 A1 | 5/2017 | Fukuda et al. | |
| 2017/0148307 A1 | 5/2017 | Yeom et al. | |
| 2017/0154033 A1 | 6/2017 | Lee | |
| 2017/0154055 A1 | 6/2017 | Dimson et al. | |
| 2017/0154176 A1 | 6/2017 | Yun et al. | |
| 2017/0154628 A1 | 6/2017 | Mohajer et al. | |
| 2017/0155940 A1 | 6/2017 | Jin et al. | |
| 2017/0155965 A1 | 6/2017 | Ward | |
| 2017/0161018 A1 | 6/2017 | Lemay et al. | |
| 2017/0161268 A1* | 6/2017 | Badaskar | G06F 16/489 |
| 2017/0161293 A1 | 6/2017 | Ionescu et al. | |
| 2017/0161393 A1 | 6/2017 | Oh et al. | |
| 2017/0161439 A1 | 6/2017 | Raduchel et al. | |
| 2017/0161500 A1 | 6/2017 | Yang | |
| 2017/0162191 A1 | 6/2017 | Grost et al. | |
| 2017/0162202 A1 | 6/2017 | Anthony et al. | |
| 2017/0162203 A1 | 6/2017 | Huang et al. | |
| 2017/0169506 A1 | 6/2017 | Wishne et al. | |
| 2017/0169818 A1 | 6/2017 | Vanblon et al. | |
| 2017/0169819 A1 | 6/2017 | Mese et al. | |
| 2017/0171139 A1 | 6/2017 | Marra et al. | |
| 2017/0171261 A1 | 6/2017 | Smus | |
| 2017/0171387 A1 | 6/2017 | Vendrow | |
| 2017/0177080 A1 | 6/2017 | Deleeuw | |
| 2017/0177547 A1 | 6/2017 | Ciereszko et al. | |
| 2017/0178619 A1 | 6/2017 | Naik et al. | |
| 2017/0178620 A1 | 6/2017 | Fleizach et al. | |
| 2017/0178626 A1 | 6/2017 | Gruber et al. | |
| 2017/0178666 A1 | 6/2017 | Yu | |
| 2017/0180499 A1 | 6/2017 | Gelfenbeyn et al. | |
| 2017/0185375 A1 | 6/2017 | Martel et al. | |
| 2017/0185581 A1 | 6/2017 | Bojja et al. | |
| 2017/0186429 A1 | 6/2017 | Giuli et al. | |
| 2017/0186432 A1 | 6/2017 | Aleksic et al. | |
| 2017/0186446 A1 | 6/2017 | Wosk et al. | |
| 2017/0187711 A1 | 6/2017 | Joo et al. | |
| 2017/0193083 A1 | 7/2017 | Bhatt et al. | |
| 2017/0195493 A1 | 7/2017 | Sudarsan et al. | |
| 2017/0195495 A1 | 7/2017 | Deora et al. | |
| 2017/0195636 A1 | 7/2017 | Child et al. | |
| 2017/0195856 A1 | 7/2017 | Snyder et al. | |
| 2017/0199870 A1 | 7/2017 | Zheng et al. | |
| 2017/0199874 A1 | 7/2017 | Patel et al. | |
| 2017/0200066 A1 | 7/2017 | Wang et al. | |

(56) References Cited

U.S. PATENT DOCUMENTS

2017/0201609 A1 7/2017 Salmenkaita et al.
2017/0201613 A1 7/2017 Engelke et al.
2017/0201846 A1 7/2017 Katayama et al.
2017/0206002 A1 7/2017 Badger et al.
2017/0206899 A1 7/2017 Bryant et al.
2017/0215052 A1 7/2017 Koum et al.
2017/0220212 A1 8/2017 Yang et al.
2017/0221486 A1 8/2017 Kurata et al.
2017/0222961 A1 8/2017 Beach et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0229121 A1 8/2017 Taki et al.
2017/0230429 A1 8/2017 Garmark et al.
2017/0230497 A1 8/2017 Kim et al.
2017/0230709 A1* 8/2017 Van Os .................. G06F 3/167
2017/0235360 A1 8/2017 George-Svahn
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0236517 A1 8/2017 Yu et al.
2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0242920 A1 8/2017 Neland
2017/0243468 A1 8/2017 Dotan-Cohen et al.
2017/0243576 A1 8/2017 Millington et al.
2017/0243583 A1 8/2017 Raichelgauz et al.
2017/0243586 A1 8/2017 Civelli et al.
2017/0249291 A1 8/2017 Patel
2017/0249309 A1 8/2017 Sarikaya
2017/0256256 A1 9/2017 Wang et al.
2017/0257723 A1 9/2017 Morishita et al.
2017/0262051 A1 9/2017 Tall et al.
2017/0262432 A1 9/2017 Sarikaya et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270092 A1 9/2017 He et al.
2017/0270715 A1 9/2017 Lindsay et al.
2017/0270822 A1 9/2017 Cohen
2017/0270912 A1 9/2017 Levit et al.
2017/0270919 A1 9/2017 Parthasarathi et al.
2017/0273044 A1 9/2017 Alsina
2017/0277691 A1 9/2017 Agarwal
2017/0278513 A1 9/2017 Li et al.
2017/0278514 A1 9/2017 Mathias et al.
2017/0279795 A1 9/2017 Redberg
2017/0285915 A1 10/2017 Napolitano et al.
2017/0286397 A1 10/2017 Gonzalez
2017/0286407 A1 10/2017 Chochowski et al.
2017/0287218 A1 10/2017 Nuernberger et al.
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0301353 A1 10/2017 Mozer et al.
2017/0308552 A1 10/2017 Soni et al.
2017/0308589 A1 10/2017 Liu et al.
2017/0308609 A1 10/2017 Berkhin et al.
2017/0311005 A1 10/2017 Lin
2017/0316775 A1 11/2017 Le et al.
2017/0316779 A1 11/2017 Mohapatra et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337478 A1 11/2017 Sarikaya et al.
2017/0337540 A1 11/2017 Buckman et al.
2017/0344931 A1 11/2017 Shenk et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0347180 A1 11/2017 Petrank
2017/0347222 A1 11/2017 Kanter
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1* 12/2017 Orr ...................... G06F 16/435
2017/0358303 A1 12/2017 Walker, II et al.
2017/0358304 A1 12/2017 Castillo et al.
2017/0358305 A1* 12/2017 Kudurshian ............ G10L 13/02
2017/0358317 A1 12/2017 James
2017/0359680 A1 12/2017 Ledvina et al.
2017/0359707 A1 12/2017 Diaconu et al.
2017/0365251 A1 12/2017 Park et al.
2017/0366909 A1 12/2017 Mickelsen et al.
2017/0371509 A1 12/2017 Jung et al.
2017/0371865 A1 12/2017 Eck et al.
2017/0371866 A1 12/2017 Eck
2017/0371885 A1 12/2017 Aggarwal et al.
2017/0372592 A1 12/2017 Neravati et al.
2017/0372703 A1 12/2017 Sung et al.
2017/0372719 A1 12/2017 Li et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Mng
2018/0005112 A1 1/2018 Iso-Sipila et al.
2018/0007060 A1 1/2018 Leblang et al.
2018/0007096 A1 1/2018 Levin et al.
2018/0007210 A1 1/2018 Todasco
2018/0007538 A1 1/2018 Naik et al.
2018/0012596 A1 1/2018 Piernot et al.
2018/0018248 A1 1/2018 Bhargava et al.
2018/0018331 A1 1/2018 Kesamreddy
2018/0018590 A1 1/2018 Szeto et al.
2018/0018814 A1 1/2018 Patrik et al.
2018/0018959 A1 1/2018 Jardins et al.
2018/0018973 A1 1/2018 Moreno et al.
2018/0020093 A1 1/2018 Bentitou et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0032884 A1 2/2018 Murugeshan et al.
2018/0033431 A1 2/2018 Newendorp et al.
2018/0033435 A1 2/2018 Jacobs, II
2018/0033436 A1 2/2018 Zhou
2018/0034867 A1 2/2018 Zahn et al.
2018/0034961 A1 2/2018 Engelke et al.
2018/0039239 A1 2/2018 Burchard
2018/0039990 A1 2/2018 Lindemann
2018/0040020 A1 2/2018 Kurian et al.
2018/0041571 A1 2/2018 Rogers et al.
2018/0045963 A1 2/2018 Hoover et al.
2018/0046340 A1 2/2018 Mall
2018/0046851 A1 2/2018 Kienzle et al.
2018/0047201 A1 2/2018 Filev et al.
2018/0047288 A1 2/2018 Cordell et al.

(56) References Cited

U.S. PATENT DOCUMENTS

2018/0047391 A1 2/2018 Baik et al.
2018/0047393 A1 2/2018 Tian et al.
2018/0047406 A1 2/2018 Park
2018/0052885 A1 2/2018 Gaskill et al.
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0061402 A1 3/2018 Devaraj et al.
2018/0061403 A1 3/2018 Devaraj et al.
2018/0062691 A1 3/2018 Barnett, Jr.
2018/0063276 A1 3/2018 Foged
2018/0063308 A1 3/2018 Crystal et al.
2018/0063324 A1 3/2018 Van, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0067929 A1 3/2018 Ahn
2018/0068074 A1 3/2018 Shen
2018/0068194 A1 3/2018 Matsuda
2018/0068660 A1 3/2018 Kawahara et al.
2018/0069743 A1 3/2018 Bakken et al.
2018/0069815 A1 3/2018 Fontana et al.
2018/0075659 A1 3/2018 Browy et al.
2018/0075847 A1 3/2018 Lee et al.
2018/0075849 A1 3/2018 Khoury et al.
2018/0077095 A1 3/2018 Deyle et al.
2018/0077648 A1 3/2018 Nguyen
2018/0081739 A1 3/2018 Gravenites et al.
2018/0081884 A1 3/2018 Tan
2018/0081886 A1 3/2018 Tomkins et al.
2018/0082692 A1 3/2018 Khoury et al.
2018/0083898 A1 3/2018 Pham
2018/0088788 A1 3/2018 Cheung et al.
2018/0088902 A1 3/2018 Mese et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091732 A1 3/2018 Wilson et al.
2018/0091847 A1 3/2018 Wu et al.
2018/0096683 A1 4/2018 James et al.
2018/0096690 A1 4/2018 Mixter et al.
2018/0097812 A1 4/2018 Gillett et al.
2018/0101599 A1 4/2018 Kenneth et al.
2018/0101925 A1 4/2018 Brinig et al.
2018/0102914 A1 4/2018 Kawachi et al.
2018/0103209 A1 4/2018 Fischler et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108356 A1 4/2018 Mizumoto et al.
2018/0108357 A1 4/2018 Liu
2018/0109920 A1 4/2018 Aggarwal et al.
2018/0113673 A1 4/2018 Sheynblat
2018/0114198 A1 4/2018 Ghotbi et al.
2018/0114591 A1 4/2018 Pribanic et al.
2018/0121430 A1 5/2018 Kagoshima et al.
2018/0121432 A1 5/2018 Parson et al.
2018/0122376 A1 5/2018 Kojima
2018/0122378 A1 5/2018 Mixter et al.
2018/0124458 A1 5/2018 Knox
2018/0126260 A1 5/2018 Chansoriya et al.
2018/0129492 A1 5/2018 Singh et al.
2018/0129967 A1 5/2018 Herreshoff
2018/0130470 A1 5/2018 Lemay et al.
2018/0130471 A1 5/2018 Trufinescu et al.
2018/0137097 A1 5/2018 Lim et al.
2018/0137404 A1 5/2018 Fauceglia et al.
2018/0137856 A1 5/2018 Gilbert
2018/0137857 A1 5/2018 Zhou et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0152557 A1 5/2018 White et al.
2018/0152558 A1 5/2018 Chan et al.
2018/0152803 A1 5/2018 Seefeldt et al.
2018/0157372 A1 6/2018 Kurabayashi
2018/0157398 A1 6/2018 Kaehler et al.
2018/0157408 A1 6/2018 Yu et al.
2018/0157992 A1 6/2018 Susskind et al.
2018/0158548 A1 6/2018 Taheri et al.
2018/0158552 A1 6/2018 Liu et al.
2018/0165278 A1 6/2018 He et al.
2018/0165801 A1 6/2018 Kim et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0181370 A1 6/2018 Parkinson
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190264 A1 7/2018 Mixter et al.
2018/0190273 A1 7/2018 Karimli et al.
2018/0190274 A1 7/2018 Kirazci et al.
2018/0190279 A1 7/2018 Anderson et al.
2018/0191670 A1 7/2018 Suyama
2018/0196683 A1 7/2018 Radebaugh et al.
2018/0205983 A1 7/2018 Lee et al.
2018/0210874 A1 7/2018 Fuxman et al.
2018/0211005 A1 7/2018 Allen
2018/0213448 A1* 7/2018 Segal ........................ H04N 7/15
2018/0214061 A1 8/2018 Knoth et al.
2018/0217810 A1 8/2018 Agrawal
2018/0218735 A1 8/2018 Hunt et al.
2018/0221783 A1 8/2018 Gamero
2018/0224231 A1 8/2018 Weinberg
2018/0225131 A1 8/2018 Tommy et al.
2018/0225274 A1 8/2018 Tommy et al.
2018/0232110 A1 8/2018 Cheung et al.
2018/0232203 A1 8/2018 Gelfenbeyn et al.
2018/0232608 A1 8/2018 Pradeep et al.
2018/0232688 A1 8/2018 Pike et al.
2018/0233132 A1 8/2018 Herold et al.
2018/0233140 A1 8/2018 Koishida et al.
2018/0233142 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0267952 A1 9/2018 Osborne et al.
2018/0268023 A1 9/2018 Korpusik et al.
2018/0268106 A1 9/2018 Velaga
2018/0268337 A1 9/2018 Miller et al.
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0288104 A1 10/2018 Padilla et al.
2018/0293086 A1 10/2018 Laird-Mcconnell et al.
2018/0293984 A1 10/2018 Lindahl
2018/0293988 A1 10/2018 Huang et al.

(56) References Cited

U.S. PATENT DOCUMENTS

| | | | |
|---|---|---|---|
| 2018/0293989 | A1 | 10/2018 | De et al. |
| 2018/0299878 | A1 | 10/2018 | Cella et al. |
| 2018/0300317 | A1 | 10/2018 | Bradbury |
| 2018/0300400 | A1 | 10/2018 | Paulus |
| 2018/0300608 | A1 | 10/2018 | Sevrens et al. |
| 2018/0300952 | A1 | 10/2018 | Evans et al. |
| 2018/0307216 | A1 | 10/2018 | Ypma et al. |
| 2018/0307603 | A1 | 10/2018 | Che |
| 2018/0308470 | A1 | 10/2018 | Park et al. |
| 2018/0308477 | A1 | 10/2018 | Nagasaka |
| 2018/0308480 | A1 | 10/2018 | Jang et al. |
| 2018/0308485 | A1* | 10/2018 | Kudurshian .......... G06F 16/685 |
| 2018/0308486 | A1 | 10/2018 | Saddler et al. |
| 2018/0308491 | A1 | 10/2018 | Oktem et al. |
| 2018/0314362 | A1 | 11/2018 | Kim et al. |
| 2018/0314552 | A1 | 11/2018 | Kim et al. |
| 2018/0314689 | A1 | 11/2018 | Wang et al. |
| 2018/0314981 | A1 | 11/2018 | Chen |
| 2018/0315415 | A1 | 11/2018 | Mosley et al. |
| 2018/0315416 | A1 | 11/2018 | Berthelsen et al. |
| 2018/0322112 | A1 | 11/2018 | Bellegarda et al. |
| 2018/0322881 | A1 | 11/2018 | Min et al. |
| 2018/0324518 | A1 | 11/2018 | Dusan et al. |
| 2018/0329508 | A1 | 11/2018 | Klein et al. |
| 2018/0329512 | A1 | 11/2018 | Liao et al. |
| 2018/0329677 | A1 | 11/2018 | Gruber et al. |
| 2018/0329957 | A1 | 11/2018 | Frazzingaro et al. |
| 2018/0329982 | A1 | 11/2018 | Patel et al. |
| 2018/0329998 | A1 | 11/2018 | Thomson et al. |
| 2018/0330714 | A1 | 11/2018 | Paulik et al. |
| 2018/0330721 | A1 | 11/2018 | Thomson et al. |
| 2018/0330722 | A1 | 11/2018 | Newendorp et al. |
| 2018/0330723 | A1 | 11/2018 | Acero et al. |
| 2018/0330729 | A1 | 11/2018 | Golipour et al. |
| 2018/0330730 | A1 | 11/2018 | Garg et al. |
| 2018/0330731 | A1 | 11/2018 | Zeitlin et al. |
| 2018/0330733 | A1 | 11/2018 | Orr et al. |
| 2018/0330737 | A1 | 11/2018 | Paulik et al. |
| 2018/0332118 | A1 | 11/2018 | Phipps et al. |
| 2018/0332389 | A1 | 11/2018 | Ekkizogloy et al. |
| 2018/0335903 | A1 | 11/2018 | Coffman et al. |
| 2018/0336006 | A1 | 11/2018 | Chakraborty et al. |
| 2018/0336049 | A1 | 11/2018 | Mukherjee et al. |
| 2018/0336184 | A1 | 11/2018 | Bellegarda et al. |
| 2018/0336197 | A1 | 11/2018 | Skilling et al. |
| 2018/0336275 | A1* | 11/2018 | Graham ................ G06F 16/634 |
| 2018/0336439 | A1 | 11/2018 | Kliger et al. |
| 2018/0336449 | A1 | 11/2018 | Adan et al. |
| 2018/0336880 | A1 | 11/2018 | Arik et al. |
| 2018/0336885 | A1 | 11/2018 | Mukherjee et al. |
| 2018/0336892 | A1 | 11/2018 | Kim et al. |
| 2018/0336893 | A1 | 11/2018 | Robinson et al. |
| 2018/0336894 | A1* | 11/2018 | Graham .............. G06F 16/3329 |
| 2018/0336904 | A1 | 11/2018 | Piercy et al. |
| 2018/0336905 | A1 | 11/2018 | Kim et al. |
| 2018/0336911 | A1 | 11/2018 | Dahl et al. |
| 2018/0336920 | A1 | 11/2018 | Bastian et al. |
| 2018/0338191 | A1 | 11/2018 | Van Scheltinga et al. |
| 2018/0341643 | A1 | 11/2018 | Alders et al. |
| 2018/0342243 | A1 | 11/2018 | Vanblon et al. |
| 2018/0343557 | A1 | 11/2018 | Naik et al. |
| 2018/0349084 | A1 | 12/2018 | Nagasaka et al. |
| 2018/0349346 | A1 | 12/2018 | Hatori et al. |
| 2018/0349349 | A1 | 12/2018 | Bellegarda et al. |
| 2018/0349447 | A1 | 12/2018 | Maccartney et al. |
| 2018/0349472 | A1 | 12/2018 | Kohlschuetter et al. |
| 2018/0349728 | A1 | 12/2018 | Wang et al. |
| 2018/0350345 | A1 | 12/2018 | Naik |
| 2018/0350353 | A1 | 12/2018 | Gruber et al. |
| 2018/0357073 | A1 | 12/2018 | Johnson et al. |
| 2018/0357308 | A1 | 12/2018 | Cheyer |
| 2018/0358015 | A1 | 12/2018 | Cash et al. |
| 2018/0358019 | A1 | 12/2018 | Mont-Reynaud |
| 2018/0365091 | A1 | 12/2018 | Donaldson et al. |
| 2018/0365653 | A1 | 12/2018 | Cleaver et al. |
| 2018/0366105 | A1 | 12/2018 | Kim |
| 2018/0366110 | A1 | 12/2018 | Hashem et al. |
| 2018/0366116 | A1 | 12/2018 | Nicholson et al. |
| 2018/0366118 | A1 | 12/2018 | Lovitt et al. |
| 2018/0373398 | A1 | 12/2018 | Seixeiro et al. |
| 2018/0373487 | A1 | 12/2018 | Gruber et al. |
| 2018/0373493 | A1 | 12/2018 | Watson et al. |
| 2018/0373796 | A1 | 12/2018 | Rathod |
| 2018/0374484 | A1 | 12/2018 | Huang et al. |
| 2019/0005024 | A1 | 1/2019 | Somech et al. |
| 2019/0007228 | A1 | 1/2019 | Vuskovic et al. |
| 2019/0012141 | A1 | 1/2019 | Piersol et al. |
| 2019/0012198 | A1 | 1/2019 | Ni et al. |
| 2019/0012445 | A1 | 1/2019 | Lesso et al. |
| 2019/0012449 | A1 | 1/2019 | Cheyer |
| 2019/0012599 | A1 | 1/2019 | El Kaliouby et al. |
| 2019/0013018 | A1 | 1/2019 | Rekstad |
| 2019/0013025 | A1 | 1/2019 | Alcorn et al. |
| 2019/0014450 | A1 | 1/2019 | Gruber et al. |
| 2019/0019077 | A1 | 1/2019 | Griffin et al. |
| 2019/0019508 | A1 | 1/2019 | Rochford et al. |
| 2019/0020482 | A1 | 1/2019 | Gupta et al. |
| 2019/0027135 | A1 | 1/2019 | Kim et al. |
| 2019/0027152 | A1 | 1/2019 | Huang et al. |
| 2019/0034040 | A1 | 1/2019 | Shah et al. |
| 2019/0034826 | A1 | 1/2019 | Ahmad et al. |
| 2019/0035385 | A1 | 1/2019 | Lawson et al. |
| 2019/0035405 | A1 | 1/2019 | Haughay |
| 2019/0037258 | A1 | 1/2019 | Justin et al. |
| 2019/0042059 | A1 | 2/2019 | Baer |
| 2019/0042560 | A1 | 2/2019 | Kakirwar et al. |
| 2019/0042561 | A1 | 2/2019 | Kakirwar et al. |
| 2019/0042627 | A1 | 2/2019 | Osotio et al. |
| 2019/0043507 | A1 | 2/2019 | Huang et al. |
| 2019/0044854 | A1 | 2/2019 | Yang et al. |
| 2019/0045040 | A1 | 2/2019 | Lee et al. |
| 2019/0050450 | A1 | 2/2019 | Uszkoreit |
| 2019/0051306 | A1 | 2/2019 | Torama et al. |
| 2019/0051309 | A1 | 2/2019 | Kim et al. |
| 2019/0057533 | A1 | 2/2019 | Habra |
| 2019/0057697 | A1 | 2/2019 | Giuli et al. |
| 2019/0065027 | A1 | 2/2019 | Hauenstein et al. |
| 2019/0065144 | A1 | 2/2019 | Sumner et al. |
| 2019/0065993 | A1 | 2/2019 | Srinivasan et al. |
| 2019/0066674 | A1 | 2/2019 | Jaygarl et al. |
| 2019/0068810 | A1 | 2/2019 | Okamoto et al. |
| 2019/0073607 | A1 | 3/2019 | Jia et al. |
| 2019/0073998 | A1 | 3/2019 | Leblang et al. |
| 2019/0074009 | A1 | 3/2019 | Kim et al. |
| 2019/0074015 | A1 | 3/2019 | Orr et al. |
| 2019/0074016 | A1 | 3/2019 | Orr et al. |
| 2019/0079476 | A1 | 3/2019 | Funes |
| 2019/0079662 | A1 | 3/2019 | Wan et al. |
| 2019/0079724 | A1 | 3/2019 | Feuz et al. |
| 2019/0080685 | A1 | 3/2019 | Johnson, Jr. |
| 2019/0080698 | A1 | 3/2019 | Miller |
| 2019/0082044 | A1 | 3/2019 | Olivia et al. |
| 2019/0087205 | A1 | 3/2019 | Guday |
| 2019/0087412 | A1 | 3/2019 | Ibrahim et al. |
| 2019/0087455 | A1 | 3/2019 | He et al. |
| 2019/0090812 | A1 | 3/2019 | Martin et al. |
| 2019/0095050 | A1 | 3/2019 | Gruber et al. |
| 2019/0095069 | A1 | 3/2019 | Proctor et al. |
| 2019/0095171 | A1 | 3/2019 | Carson et al. |
| 2019/0095522 | A1 | 3/2019 | Galitsky |
| 2019/0095535 | A1 | 3/2019 | Miller et al. |
| 2019/0096134 | A1 | 3/2019 | Amacker et al. |
| 2019/0102145 | A1 | 4/2019 | Wilberding et al. |
| 2019/0102378 | A1 | 4/2019 | Piernot et al. |
| 2019/0102381 | A1 | 4/2019 | Futrell et al. |
| 2019/0103103 | A1 | 4/2019 | Ni et al. |
| 2019/0103112 | A1 | 4/2019 | Walker et al. |
| 2019/0108834 | A1 | 4/2019 | Nelson et al. |
| 2019/0114320 | A1 | 4/2019 | Patwardhan et al. |
| 2019/0116264 | A1 | 4/2019 | Sanghavi et al. |
| 2019/0122666 | A1 | 4/2019 | Raitio et al. |
| 2019/0122692 | A1 | 4/2019 | Binder et al. |
| 2019/0124019 | A1 | 4/2019 | Leon et al. |
| 2019/0129499 | A1 | 5/2019 | Li |

(56) References Cited

U.S. PATENT DOCUMENTS

2019/0129615 A1 5/2019 Sundar et al.
2019/0129749 A1 5/2019 White et al.
2019/0130901 A1 5/2019 Kato et al.
2019/0132694 A1 5/2019 Hanes et al.
2019/0134501 A1 5/2019 Feder et al.
2019/0138268 A1 5/2019 Andersen et al.
2019/0138661 A1 5/2019 Paltanavicius et al.
2019/0138704 A1 5/2019 Shrivastava et al.
2019/0139058 A1 5/2019 Clark et al.
2019/0139541 A1 5/2019 Andersen et al.
2019/0139563 A1 5/2019 Chen et al.
2019/0141494 A1 5/2019 Gross et al.
2019/0146219 A1 5/2019 Rodriguez, II
2019/0147052 A1 5/2019 Lu et al.
2019/0147369 A1 5/2019 Gupta et al.
2019/0147869 A1 5/2019 Wang
2019/0147880 A1 5/2019 Booker et al.
2019/0147883 A1 5/2019 Mellenthin et al.
2019/0149972 A1 5/2019 Parks et al.
2019/0156830 A1 5/2019 Devaraj et al.
2019/0158994 A1 5/2019 Gross et al.
2019/0163667 A1 5/2019 Feuz et al.
2019/0164546 A1 5/2019 Piernot et al.
2019/0172243 A1 6/2019 Mishra et al.
2019/0172458 A1 6/2019 Mishra et al.
2019/0172465 A1 6/2019 Lee et al.
2019/0172467 A1 6/2019 Kim et al.
2019/0173996 A1 6/2019 Butcher et al.
2019/0179607 A1 6/2019 Thangarathnam et al.
2019/0179890 A1 6/2019 Evermann
2019/0180749 A1 6/2019 Carey et al.
2019/0180750 A1 6/2019 Renard et al.
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0190898 A1 6/2019 Cui
2019/0197053 A1* 6/2019 Graham ................ G06F 16/435
2019/0197119 A1 6/2019 Zhang et al.
2019/0199657 A1 6/2019 Fawcett et al.
2019/0206397 A1 7/2019 Zhou
2019/0212815 A1 7/2019 Zhang et al.
2019/0213498 A1 7/2019 Adjaoute
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0222684 A1 7/2019 Li et al.
2019/0224049 A1 7/2019 Creasy et al.
2019/0228179 A1 7/2019 Rakshit et al.
2019/0228581 A1 7/2019 Dascola et al.
2019/0230215 A1 7/2019 Zhu et al.
2019/0230426 A1 7/2019 Chun
2019/0235887 A1 8/2019 Hemaraj et al.
2019/0236130 A1 8/2019 Li et al.
2019/0236459 A1 8/2019 Cheyer et al.
2019/0237061 A1 8/2019 Rusak et al.
2019/0243902 A1 8/2019 Saeki et al.
2019/0244604 A1 8/2019 Masataki et al.
2019/0244618 A1 8/2019 Newendorp et al.
2019/0244619 A1 8/2019 Kwon et al.
2019/0251167 A1 8/2019 Subbaraya et al.
2019/0251339 A1 8/2019 Hawker
2019/0251960 A1 8/2019 Maker et al.
2019/0251972 A1 8/2019 Li
2019/0258852 A1 8/2019 Shimauchi et al.
2019/0259386 A1* 8/2019 Kudurshian ............ G10L 15/22
2019/0260836 A1 8/2019 Zahl et al.
2019/0265886 A1 8/2019 Moon et al.
2019/0266246 A1 8/2019 Wang et al.
2019/0272318 A1 9/2019 Suzuki et al.
2019/0272818 A1 9/2019 Fernandez et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0279618 A1 9/2019 Yadav et al.
2019/0279622 A1 9/2019 Liu et al.
2019/0281387 A1 9/2019 Woo et al.
2019/0287012 A1 9/2019 Asli et al.
2019/0287522 A1 9/2019 Lambourne et al.
2019/0290965 A1 9/2019 Oren
2019/0294769 A1 9/2019 Lesso
2019/0294962 A1 9/2019 Vezer et al.
2019/0295529 A1 9/2019 Tomita
2019/0295540 A1 9/2019 Grima
2019/0295542 A1 9/2019 Huang et al.
2019/0295544 A1 9/2019 Garcia et al.
2019/0303442 A1 10/2019 Peitz et al.
2019/0303504 A1 10/2019 Pasumarthy
2019/0304438 A1 10/2019 Qian et al.
2019/0310765 A1 10/2019 Napolitano et al.
2019/0311031 A1 10/2019 Powell et al.
2019/0311708 A1 10/2019 Bengio et al.
2019/0311720 A1 10/2019 Pasko
2019/0318219 A1 10/2019 Arora et al.
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0324780 A1 10/2019 Zhu et al.
2019/0324925 A1 10/2019 Toyoda et al.
2019/0325081 A1 10/2019 Liu et al.
2019/0325866 A1 10/2019 Bromand et al.
2019/0333523 A1 10/2019 Kim et al.
2019/0335567 A1 10/2019 Boudreau et al.
2019/0339784 A1 11/2019 Lemay et al.
2019/0340252 A1 11/2019 Huyghe
2019/0340419 A1 11/2019 Milman et al.
2019/0341027 A1 11/2019 Vescovi et al.
2019/0341056 A1 11/2019 Paulik et al.
2019/0347063 A1 11/2019 Liu et al.
2019/0347525 A1 11/2019 Liem et al.
2019/0348022 A1 11/2019 Park et al.
2019/0349333 A1 11/2019 Pickover et al.
2019/0349622 A1 11/2019 Kim et al.
2019/0354252 A1 11/2019 Badr
2019/0354256 A1 11/2019 Karunamuni et al.
2019/0354548 A1 11/2019 Orr et al.
2019/0354675 A1 11/2019 Gan et al.
2019/0355346 A1 11/2019 Bellegarda
2019/0355384 A1 11/2019 Sereshki et al.
2019/0361729 A1 11/2019 Gruber et al.
2019/0361978 A1 11/2019 Ray et al.
2019/0362252 A1 11/2019 Miller et al.
2019/0362557 A1 11/2019 Lacey et al.
2019/0369748 A1 12/2019 Hindi et al.
2019/0369842 A1 12/2019 Dolbakian et al.
2019/0369868 A1 12/2019 Jin et al.
2019/0370292 A1 12/2019 Irani et al.
2019/0370323 A1 12/2019 Davidson et al.
2019/0370443 A1 12/2019 Lesso
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0377425 A1 12/2019 Ryu et al.
2019/0377955 A1 12/2019 Swaminathan et al.
2019/0378493 A1 12/2019 Kim et al.
2019/0385043 A1 12/2019 Choudhary et al.
2019/0385418 A1 12/2019 Mixter et al.
2019/0387352 A1 12/2019 Jot et al.

(56) References Cited

U.S. PATENT DOCUMENTS

2019/0391726 A1 12/2019 Iskandar et al.
2019/0394547 A1 12/2019 Lemons et al.
2020/0005779 A1 1/2020 Liao et al.
2020/0012718 A1 1/2020 Kung et al.
2020/0019609 A1 1/2020 Yu et al.
2020/0020326 A1 1/2020 Srinivasan et al.
2020/0027455 A1 1/2020 Sugiyama et al.
2020/0034421 A1 1/2020 Ferrucci et al.
2020/0035224 A1 1/2020 Ward et al.
2020/0042334 A1 2/2020 Radebaugh et al.
2020/0043467 A1 2/2020 Qian et al.
2020/0043471 A1 2/2020 Ma et al.
2020/0043482 A1 2/2020 Gruber et al.
2020/0043485 A1 2/2020 Tonetti et al.
2020/0043489 A1 2/2020 Bradley et al.
2020/0044485 A1 2/2020 Smith et al.
2020/0045164 A1 2/2020 Kwatra et al.
2020/0051554 A1 2/2020 Kim et al.
2020/0051565 A1 2/2020 Singh
2020/0051583 A1 2/2020 Wu et al.
2020/0053218 A1 2/2020 Gray
2020/0058299 A1 2/2020 Lee et al.
2020/0065601 A1 2/2020 Andreassen
2020/0066236 A1 2/2020 Giusti et al.
2020/0073629 A1 3/2020 Lee et al.
2020/0074993 A1 3/2020 Lee et al.
2020/0075018 A1 3/2020 Chen
2020/0075040 A1 3/2020 Provost et al.
2020/0076538 A1 3/2020 Soultan et al.
2020/0081615 A1 3/2020 Lu et al.
2020/0082807 A1 3/2020 Kim et al.
2020/0084572 A1 3/2020 Jadav et al.
2020/0090393 A1 3/2020 Shin et al.
2020/0090653 A1 3/2020 Luo
2020/0090658 A1 3/2020 Shin et al.
2020/0091958 A1 3/2020 Curtis et al.
2020/0092625 A1 3/2020 Raffle
2020/0098346 A1 3/2020 Kemmerer et al.
2020/0098352 A1 3/2020 Feinstein et al.
2020/0098362 A1 3/2020 Piernot et al.
2020/0098368 A1 3/2020 Lemay et al.
2020/0103963 A1 4/2020 Kelly et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0112454 A1 4/2020 Brown et al.
2020/0117717 A1 4/2020 Ramamurti et al.
2020/0118566 A1 4/2020 Zhou
2020/0118568 A1* 4/2020 Kudurshian ............ G10L 15/22
2020/0125820 A1 4/2020 Kim et al.
2020/0126547 A1 4/2020 Truong et al.
2020/0127988 A1 4/2020 Bradley et al.
2020/0134316 A1 4/2020 Krishnamurthy et al.
2020/0135180 A1 4/2020 Mukherjee et al.
2020/0135209 A1 4/2020 Delfarah et al.
2020/0135212 A1 4/2020 Cho et al.
2020/0135213 A1 4/2020 Kim et al.
2020/0135226 A1 4/2020 Mittal et al.
2020/0137230 A1 4/2020 Spohrer
2020/0142505 A1 5/2020 Choi et al.
2020/0142554 A1 5/2020 Lin et al.
2020/0143330 A1 5/2020 Perumalla et al.
2020/0143812 A1 5/2020 Walker, II et al.
2020/0143819 A1 5/2020 Delcroix et al.
2020/0152186 A1 5/2020 Koh et al.
2020/0152187 A1 5/2020 Kline et al.
2020/0159579 A1 5/2020 Shear et al.
2020/0159609 A1 5/2020 Korotaev et al.
2020/0159651 A1 5/2020 Myers
2020/0159801 A1 5/2020 Sekine
2020/0159838 A1 5/2020 Kikin-Gil et al.
2020/0160179 A1 5/2020 Chien et al.
2020/0160838 A1 5/2020 Lee
2020/0168120 A1 5/2020 Bravo
2020/0168220 A1 5/2020 Magielse et al.
2020/0169637 A1 5/2020 Sanghavi et al.
2020/0175566 A1 6/2020 Bender et al.
2020/0175961 A1 6/2020 Thomson et al.
2020/0175975 A1 6/2020 Kong et al.
2020/0176004 A1 6/2020 Kleijn et al.
2020/0176018 A1 6/2020 Feinauer et al.
2020/0184057 A1 6/2020 Mukund
2020/0184964 A1 6/2020 Myers et al.
2020/0184966 A1 6/2020 Yavagal
2020/0193997 A1 6/2020 Piernot et al.
2020/0194000 A1 6/2020 Xian et al.
2020/0210142 A1 7/2020 Mu et al.
2020/0211546 A1 7/2020 Schairer et al.
2020/0211566 A1 7/2020 Kang et al.
2020/0218074 A1 7/2020 Hoover et al.
2020/0218780 A1 7/2020 Jun et al.
2020/0218805 A1 7/2020 Liu et al.
2020/0219501 A1 7/2020 Cartwright et al.
2020/0219517 A1 7/2020 Wang et al.
2020/0220914 A1 7/2020 Carrigan et al.
2020/0221155 A1 7/2020 Hansen et al.
2020/0226481 A1 7/2020 Sim et al.
2020/0226554 A1 7/2020 Luna
2020/0226823 A1 7/2020 Stachniak et al.
2020/0227034 A1 7/2020 Summa et al.
2020/0227044 A1 7/2020 Lindahl
2020/0228774 A1 7/2020 Kar et al.
2020/0243069 A1 7/2020 Amores et al.
2020/0243094 A1 7/2020 Thomson et al.
2020/0249985 A1 8/2020 Zeitlin
2020/0251111 A1 8/2020 Temkin et al.
2020/0252508 A1 8/2020 Gray
2020/0258508 A1 8/2020 Aggarwal et al.
2020/0258512 A1 8/2020 Smith et al.
2020/0258513 A1 8/2020 Smith et al.
2020/0259951 A1 8/2020 Arshad
2020/0264741 A1 8/2020 Kreiner et al.
2020/0267222 A1 8/2020 Phipps et al.
2020/0267427 A1 8/2020 Rogers et al.
2020/0267503 A1 8/2020 Watkins et al.
2020/0272485 A1 8/2020 Karashchuk et al.
2020/0273448 A1 8/2020 Min et al.
2020/0275216 A1 8/2020 Mckinney et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0294487 A1 9/2020 Donohoe et al.
2020/0294494 A1 9/2020 Suyama et al.
2020/0294508 A1 9/2020 Kwasiborski et al.
2020/0298394 A1 9/2020 Han et al.
2020/0301950 A1 9/2020 Theo et al.
2020/0302112 A1 9/2020 Helmbro et al.
2020/0302356 A1 9/2020 Gruber et al.
2020/0302919 A1 9/2020 Greborio et al.
2020/0302925 A1 9/2020 Shah et al.
2020/0302930 A1 9/2020 Chen et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0310513 A1 10/2020 Nicholson et al.
2020/0312315 A1 10/2020 Li et al.
2020/0312317 A1 10/2020 Kothari et al.
2020/0314191 A1 10/2020 Madhavan et al.
2020/0314565 A1 10/2020 Sigwanz et al.
2020/0319850 A1 10/2020 Stasior et al.
2020/0320592 A1 10/2020 Soule et al.
2020/0320988 A1 10/2020 Rastogi et al.
2020/0322571 A1 10/2020 Awai
2020/0327895 A1 10/2020 Gruber et al.
2020/0333875 A1 10/2020 Bansal et al.
2020/0334068 A1 10/2020 Krishnamurthy et al.
2020/0334492 A1 10/2020 Zheng et al.
2020/0334524 A1 10/2020 Sprague et al.

(56) References Cited

U.S. PATENT DOCUMENTS

2020/0335121 A1 10/2020 Mosseri et al.
2020/0335128 A1 10/2020 Sheeder et al.
2020/0341546 A1 10/2020 Yuan et al.
2020/0342082 A1 10/2020 Sapozhnykov et al.
2020/0342182 A1 10/2020 Premkumar et al.
2020/0342849 A1 10/2020 Yu et al.
2020/0342858 A1 10/2020 Gupta et al.
2020/0342862 A1 10/2020 Gao et al.
2020/0342863 A1 10/2020 Aggarwal et al.
2020/0348813 A1 11/2020 Sharifi et al.
2020/0349415 A1 11/2020 Raju
2020/0349966 A1 11/2020 Konzelmann et al.
2020/0356243 A1 11/2020 Meyer et al.
2020/0356585 A1 11/2020 Tomkins et al.
2020/0356589 A1 11/2020 Rekik et al.
2020/0356610 A1 11/2020 Coimbra et al.
2020/0356634 A1 11/2020 Srinivasan et al.
2020/0357387 A1 11/2020 Prabhavalkar et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0364858 A1 11/2020 Kaethner et al.
2020/0365134 A1 11/2020 Tu et al.
2020/0365155 A1 11/2020 Milden
2020/0367006 A1 11/2020 Beckhardt
2020/0372633 A1 11/2020 Lee et al.
2020/0372719 A1 11/2020 Andjelic et al.
2020/0372904 A1 11/2020 Vescovi et al.
2020/0372905 A1 11/2020 Wang et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380974 A1 12/2020 Gallagher et al.
2020/0380980 A1 12/2020 Shum et al.
2020/0380984 A1 12/2020 Venkatraman et al.
2020/0380985 A1 12/2020 Gada et al.
2020/0382568 A1 12/2020 Krochmal et al.
2020/0382616 A1 12/2020 Vaishampayan et al.
2020/0382635 A1 12/2020 Vora et al.
2020/0394436 A1 12/2020 Rakshit et al.
2020/0411002 A1 12/2020 Lee et al.
2021/0006943 A1 1/2021 Gross et al.
2021/0011557 A1 1/2021 Lemay et al.
2021/0012113 A1 1/2021 Petill et al.
2021/0012775 A1 1/2021 Kang et al.
2021/0012776 A1 1/2021 Peterson et al.
2021/0026896 A1 1/2021 Easton et al.
2021/0027785 A1 1/2021 Kahan et al.
2021/0035429 A1 2/2021 Daoura et al.
2021/0035556 A1 2/2021 Shen et al.
2021/0035567 A1 2/2021 Newendorp et al.
2021/0043190 A1 2/2021 Wang et al.
2021/0044870 A1 2/2021 Li et al.
2021/0049237 A1 2/2021 Demme et al.
2021/0065698 A1 3/2021 Topcu et al.
2021/0067470 A1 3/2021 Freed et al.
2021/0067631 A1 3/2021 Van Os et al.
2021/0072953 A1 3/2021 Amarilio et al.
2021/0073254 A1 3/2021 Ghafourifar et al.
2021/0073293 A1 3/2021 Fenton et al.
2021/0073713 A1 3/2021 Balasubramanian et al.
2021/0074264 A1 3/2021 Liang et al.
2021/0074295 A1 3/2021 Moreno et al.
2021/0081749 A1 3/2021 Claire
2021/0082400 A1 3/2021 Vishnoi et al.
2021/0082420 A1 3/2021 Kraljic et al.
2021/0089124 A1 3/2021 Manjunath et al.
2021/0089724 A1 3/2021 Luong et al.
2021/0090314 A1 3/2021 Hussen et al.
2021/0090575 A1 3/2021 Mahmood et al.
2021/0092128 A1 3/2021 Leblang
2021/0097134 A1 4/2021 Livshits et al.
2021/0097776 A1 4/2021 Faulkner et al.
2021/0097998 A1 4/2021 Kim et al.
2021/0099317 A1 4/2021 Hilleli et al.
2021/0104232 A1 4/2021 Lee et al.
2021/0104236 A1 4/2021 Doggett et al.
2021/0105528 A1 4/2021 Van Os et al.
2021/0110106 A1 4/2021 Vescovi et al.
2021/0110115 A1 4/2021 Moritz et al.
2021/0110254 A1 4/2021 Duy et al.
2021/0117214 A1 4/2021 Presant et al.
2021/0117479 A1 4/2021 Liu et al.
2021/0124417 A1 4/2021 Ma
2021/0124597 A1 4/2021 Ramakrishnan et al.
2021/0127031 A1 4/2021 Kanemoto
2021/0127220 A1 4/2021 Mathieu et al.
2021/0134318 A1 5/2021 Harvey et al.
2021/0141839 A1 5/2021 Tang et al.
2021/0142782 A1 5/2021 Wolf et al.
2021/0143987 A1 5/2021 Xu et al.
2021/0144251 A1 5/2021 Chen
2021/0149629 A1 5/2021 Martel et al.
2021/0149996 A1 5/2021 Bellegarda
2021/0150151 A1 5/2021 Jiaming et al.
2021/0151041 A1 5/2021 Gruber et al.
2021/0151053 A1 5/2021 Takahashi et al.
2021/0151070 A1 5/2021 Binder et al.
2021/0152684 A1 5/2021 Weinstein et al.
2021/0158814 A1 5/2021 Hussain et al.
2021/0165826 A1* 6/2021 Graham .................. G10L 15/22
2021/0173555 A1 6/2021 Raja et al.
2021/0174020 A1 6/2021 Sohn et al.
2021/0174022 A1 6/2021 Ishikawa et al.
2021/0174403 A1 6/2021 Bellini et al.
2021/0176521 A1* 6/2021 Matthews ............. G06F 16/433
2021/0182324 A1 6/2021 Raju
2021/0182716 A1 6/2021 Muramoto et al.
2021/0191603 A1 6/2021 Napolitano et al.
2021/0191968 A1 6/2021 Orr et al.
2021/0208752 A1 7/2021 Hwang
2021/0208841 A1 7/2021 Wilberding
2021/0209304 A1 7/2021 Yang et al.
2021/0210089 A1 7/2021 Ma et al.
2021/0210100 A1 7/2021 Wang et al.
2021/0216134 A1 7/2021 Fukunaga et al.
2021/0216760 A1 7/2021 Dominic et al.
2021/0224032 A1 7/2021 Ryan et al.
2021/0224474 A1 7/2021 Jerome et al.
2021/0233532 A1* 7/2021 Kudurshian ............ G10L 15/22
2021/0241099 A1 8/2021 Li et al.
2021/0247959 A1 8/2021 Agarwal et al.
2021/0248804 A1 8/2021 Abdelaziz et al.
2021/0249009 A1 8/2021 Manjunath et al.
2021/0256031 A1 8/2021 Krogh et al.
2021/0256980 A1 8/2021 George-Svahn et al.
2021/0258554 A1 8/2021 Bruls et al.
2021/0258881 A1 8/2021 Freeman et al.
2021/0264913 A1 8/2021 Schramm et al.
2021/0264916 A1 8/2021 Kim et al.
2021/0266725 A1 8/2021 Gray
2021/0271333 A1 9/2021 Hindi et al.
2021/0273894 A1 9/2021 Tian et al.
2021/0278956 A1 9/2021 Dolbakian et al.
2021/0279548 A1 9/2021 Adan et al.
2021/0280180 A1 9/2021 Skobeltsyn et al.
2021/0281965 A1 9/2021 Malik et al.
2021/0287080 A1 9/2021 Moloney
2021/0294569 A1 9/2021 Piersol et al.
2021/0294571 A1 9/2021 Carson et al.
2021/0295602 A1 9/2021 Scapel et al.
2021/0303116 A1 9/2021 Barlow
2021/0303342 A1 9/2021 Dunn et al.
2021/0303798 A1 9/2021 Duong et al.
2021/0304075 A1 9/2021 Duong et al.

(56) References Cited

U.S. PATENT DOCUMENTS

| | | | |
|---|---|---|---|
| 2021/0306812 | A1 | 9/2021 | Gross et al. |
| 2021/0312138 | A1 | 10/2021 | Kaplan |
| 2021/0312917 | A1 | 10/2021 | Weksler et al. |
| 2021/0312930 | A1 | 10/2021 | Sugaya |
| 2021/0312931 | A1 | 10/2021 | Paulik et al. |
| 2021/0313019 | A1 | 10/2021 | Pribanic et al. |
| 2021/0314440 | A1 | 10/2021 | Matias et al. |
| 2021/0318901 | A1 | 10/2021 | Gruber et al. |
| 2021/0319178 | A1 | 10/2021 | Zhang |
| 2021/0327409 | A1 | 10/2021 | Naik |
| 2021/0327410 | A1 | 10/2021 | Beaufays et al. |
| 2021/0334306 | A1 | 10/2021 | Bo et al. |
| 2021/0334528 | A1 | 10/2021 | Bray et al. |
| 2021/0335342 | A1 | 10/2021 | Yuan et al. |
| 2021/0342050 | A1 | 11/2021 | Wang |
| 2021/0342212 | A1 | 11/2021 | Neumann |
| 2021/0349605 | A1 | 11/2021 | Nonaka et al. |
| 2021/0349608 | A1 | 11/2021 | Blatz et al. |
| 2021/0350799 | A1 | 11/2021 | Hansen et al. |
| 2021/0350803 | A1 | 11/2021 | Hansen et al. |
| 2021/0350810 | A1 | 11/2021 | Phipps et al. |
| 2021/0352115 | A1 | 11/2021 | Hansen et al. |
| 2021/0357172 | A1 | 11/2021 | Sinesio et al. |
| 2021/0357179 | A1 | 11/2021 | Takeshita |
| 2021/0358294 | A1 | 11/2021 | Parashar et al. |
| 2021/0365161 | A1 | 11/2021 | Ellis et al. |
| 2021/0365174 | A1 | 11/2021 | Ellis et al. |
| 2021/0365641 | A1 | 11/2021 | Zhang et al. |
| 2021/0365863 | A1 | 11/2021 | Friske et al. |
| 2021/0366473 | A1 | 11/2021 | Maeng |
| 2021/0366475 | A1 | 11/2021 | Wilkosz et al. |
| 2021/0366480 | A1 | 11/2021 | Lemay et al. |
| 2021/0373851 | A1 | 12/2021 | Stasior et al. |
| 2021/0375275 | A1 | 12/2021 | Yoon et al. |
| 2021/0375290 | A1 | 12/2021 | Hu et al. |
| 2021/0377381 | A1 | 12/2021 | Aggarwal et al. |
| 2021/0390259 | A1 | 12/2021 | Hildick-Smith et al. |
| 2021/0390955 | A1 | 12/2021 | Piernot et al. |
| 2021/0393168 | A1 | 12/2021 | Santarelli et al. |
| 2021/0398187 | A1 | 12/2021 | Narayanan et al. |
| 2021/0402306 | A1 | 12/2021 | Huang |
| 2021/0406260 | A1 | 12/2021 | Sharifi et al. |
| 2021/0407318 | A1 | 12/2021 | Pitschel et al. |
| 2021/0407502 | A1 | 12/2021 | Vescovi et al. |
| 2022/0004825 | A1 | 1/2022 | Xie et al. |
| 2022/0013106 | A1 | 1/2022 | Deng et al. |
| 2022/0019292 | A1 | 1/2022 | Lemay et al. |
| 2022/0020367 | A1 | 1/2022 | Orkin et al. |
| 2022/0021631 | A1 | 1/2022 | Jina et al. |
| 2022/0021978 | A1 | 1/2022 | Gui et al. |
| 2022/0028379 | A1 | 1/2022 | Carbune et al. |
| 2022/0028387 | A1 | 1/2022 | Walker et al. |
| 2022/0030345 | A1 | 1/2022 | Gong et al. |
| 2022/0035999 | A1 | 2/2022 | Pawelec |
| 2022/0036270 | A1 | 2/2022 | Benyo et al. |
| 2022/0040304 | A1 | 2/2022 | Kim et al. |
| 2022/0043986 | A1 | 2/2022 | Nell et al. |
| 2022/0046310 | A1 | 2/2022 | Shin et al. |
| 2022/0050661 | A1 | 2/2022 | Lange et al. |
| 2022/0050876 | A1 | 2/2022 | Kang et al. |
| 2022/0067283 | A1 | 3/2022 | Bellegarda et al. |
| 2022/0068274 | A1 | 3/2022 | D'Alessandro |
| 2022/0068278 | A1 | 3/2022 | York et al. |
| 2022/0083188 | A1 | 3/2022 | Lin |
| 2022/0083986 | A1 | 3/2022 | Duffy et al. |
| 2022/0084511 | A1 | 3/2022 | Nickson et al. |
| 2022/0092262 | A1 | 3/2022 | Ni et al. |
| 2022/0093088 | A1 | 3/2022 | Sridhar et al. |
| 2022/0093093 | A1 | 3/2022 | Krishnan et al. |
| 2022/0093095 | A1 | 3/2022 | Dighe et al. |
| 2022/0093098 | A1 | 3/2022 | Samal et al. |
| 2022/0093101 | A1 | 3/2022 | Krishnan et al. |
| 2022/0093109 | A1 | 3/2022 | Orr et al. |
| 2022/0093110 | A1 | 3/2022 | Kim et al. |
| 2022/0094765 | A1 | 3/2022 | Niewczas |
| 2022/0100772 | A1 | 3/2022 | Raghura et al. |
| 2022/0100789 | A1 | 3/2022 | Kumar et al. |
| 2022/0103491 | A1 | 3/2022 | Yang et al. |
| 2022/0107780 | A1 | 4/2022 | Gruber et al. |
| 2022/0108081 | A1 | 4/2022 | Dymetman et al. |
| 2022/0114327 | A1 | 4/2022 | Faaborg et al. |
| 2022/0115016 | A1 | 4/2022 | Whalin |
| 2022/0115020 | A1 | 4/2022 | Bradley et al. |
| 2022/0122615 | A1 | 4/2022 | Chen et al. |
| 2022/0130126 | A1 | 4/2022 | Delgado et al. |
| 2022/0139396 | A1 | 5/2022 | Gada et al. |
| 2022/0148587 | A1 | 5/2022 | Drummie et al. |
| 2022/0155857 | A1 | 5/2022 | Lee et al. |
| 2022/0156041 | A1 | 5/2022 | Newendorp et al. |
| 2022/0157310 | A1 | 5/2022 | Newendorp et al. |
| 2022/0157315 | A1 | 5/2022 | Raux et al. |
| 2022/0157317 | A1 | 5/2022 | Burakov et al. |
| 2022/0180857 | A1 | 6/2022 | Aharoni et al. |
| 2022/0180866 | A1 | 6/2022 | Sharifi et al. |
| 2022/0180868 | A1 | 6/2022 | Sharifi et al. |
| 2022/0197491 | A1 | 6/2022 | Meyer et al. |
| 2022/0198025 | A1 | 6/2022 | Gupta et al. |
| 2022/0206298 | A1 | 6/2022 | Goodman |
| 2022/0214743 | A1 | 7/2022 | Dascola et al. |
| 2022/0214775 | A1 | 7/2022 | Shah et al. |
| 2022/0215159 | A1 | 7/2022 | Qian et al. |
| 2022/0222437 | A1 | 7/2022 | Lauber |
| 2022/0223154 | A1 | 7/2022 | Zhou et al. |
| 2022/0229985 | A1 | 7/2022 | Bellegarda et al. |
| 2022/0230000 | A1 | 7/2022 | Jalaluddin et al. |
| 2022/0230653 | A1 | 7/2022 | Binder et al. |
| 2022/0253969 | A1 | 8/2022 | Kamenetskaya et al. |
| 2022/0254338 | A1 | 8/2022 | Gruber et al. |
| 2022/0254339 | A1 | 8/2022 | Acero et al. |
| 2022/0254341 | A1 | 8/2022 | Naganna et al. |
| 2022/0254347 | A1 | 8/2022 | Lindahl |
| 2022/0255885 | A1 | 8/2022 | Aharoni et al. |
| 2022/0261468 | A1 | 8/2022 | Lin et al. |
| 2022/0261769 | A1 | 8/2022 | Vellanti |
| 2022/0262354 | A1 | 8/2022 | Greborio et al. |
| 2022/0264262 | A1 | 8/2022 | Gruber et al. |
| 2022/0277505 | A1 | 9/2022 | Baszucki et al. |
| 2022/0284901 | A1 | 9/2022 | Novitchenko et al. |
| 2022/0291792 | A1 | 9/2022 | Alston |
| 2022/0291816 | A1 | 9/2022 | Fan et al. |
| 2022/0292128 | A1 | 9/2022 | Sharifi et al. |
| 2022/0293124 | A1 | 9/2022 | Weinberg et al. |
| 2022/0293125 | A1 | 9/2022 | Maddika et al. |
| 2022/0295170 | A1 | 9/2022 | Ito et al. |
| 2022/0300094 | A1 | 9/2022 | Hindi et al. |
| 2022/0301549 | A1 | 9/2022 | Lee et al. |
| 2022/0301566 | A1 | 9/2022 | Van Os et al. |
| 2022/0308718 | A1 | 9/2022 | Klein et al. |
| 2022/0310056 | A1 | 9/2022 | Ramabhadran et al. |
| 2022/0318248 | A1 | 10/2022 | Liang et al. |
| 2022/0329691 | A1 | 10/2022 | Chinthakunta et al. |
| 2022/0343066 | A1 | 10/2022 | Kwong et al. |
| 2022/0366889 | A1 | 11/2022 | Yerroju et al. |
| 2022/0374109 | A1 | 11/2022 | Kramer et al. |
| 2022/0374110 | A1 | 11/2022 | Ramaswamy et al. |
| 2022/0374209 | A1 | 11/2022 | Shek et al. |
| 2022/0374597 | A1 | 11/2022 | Bellegarda et al. |
| 2022/0374727 | A1 | 11/2022 | Hansen et al. |
| 2022/0375466 | A1 | 11/2022 | Hergenrader et al. |
| 2022/0375553 | A1 | 11/2022 | Lasko et al. |
| 2022/0382843 | A1 | 12/2022 | Gong et al. |
| 2022/0382994 | A1 | 12/2022 | Cox et al. |
| 2022/0383044 | A1 | 12/2022 | Bellegarda |
| 2022/0383864 | A1 | 12/2022 | Gruber et al. |
| 2022/0383872 | A1 | 12/2022 | Li et al. |
| 2022/0391585 | A1 | 12/2022 | Bellegarda et al. |
| 2022/0391603 | A1 | 12/2022 | Pham et al. |
| 2022/0392446 | A1 | 12/2022 | Webber et al. |
| 2022/0405117 | A1 | 12/2022 | Gruber et al. |
| 2022/0406301 | A1 | 12/2022 | Barros et al. |
| 2022/0406309 | A1 | 12/2022 | Piernot et al. |
| 2022/0408173 | A1 | 12/2022 | Gong et al. |
| 2023/0013615 | A1 | 1/2023 | Sanghavi et al. |
| 2023/0017115 | A1 | 1/2023 | Sanghavi et al. |

(56) References Cited

U.S. PATENT DOCUMENTS

| | | | |
|---|---|---|---|
| 2023/0018457 | A1 | 1/2023 | Zeitlin |
| 2023/0026764 | A1 | 1/2023 | Karashchuk et al. |
| 2023/0029028 | A1 | 1/2023 | Aitken et al. |
| 2023/0035643 | A1 | 2/2023 | Binder et al. |
| 2023/0035941 | A1 | 2/2023 | Herman et al. |
| 2023/0036059 | A1 | 2/2023 | Blatz et al. |
| 2023/0036798 | A1 | 2/2023 | Newendorp et al. |
| 2023/0040703 | A1 | 2/2023 | Lemay et al. |
| 2023/0042224 | A1 | 2/2023 | Patel et al. |
| 2023/0048256 | A1 | 2/2023 | Gui et al. |
| 2023/0051062 | A1 | 2/2023 | Hu et al. |
| 2023/0057442 | A1 | 2/2023 | Stasior et al. |
| 2023/0058929 | A1 | 2/2023 | Lasko et al. |
| 2023/0066552 | A1 | 3/2023 | Van Os et al. |
| 2023/0072481 | A1 | 3/2023 | Acero et al. |
| 2023/0076716 | A1 | 3/2023 | Dogrusoz et al. |
| 2023/0081605 | A1 | 3/2023 | O'Mara et al. |
| 2023/0087244 | A1 | 3/2023 | Akmal et al. |
| 2023/0094522 | A1 | 3/2023 | Stauber et al. |
| 2023/0098174 | A1 | 3/2023 | Simes et al. |
| 2023/0104583 | A1 | 4/2023 | Bekker et al. |
| 2023/0111509 | A1 | 4/2023 | Kim et al. |
| 2023/0112859 | A1 | 4/2023 | Vilhauer et al. |
| 2023/0134970 | A1 | 5/2023 | Rasipuram et al. |
| 2023/0179704 | A1 | 6/2023 | Chinthakunta et al. |
| 2023/0185397 | A1 | 6/2023 | Anzures et al. |
| 2023/0186921 | A1 | 6/2023 | Paulik et al. |
| 2023/0197063 | A1 | 6/2023 | Greborio et al. |
| 2023/0199147 | A1 | 6/2023 | Desserrey et al. |
| 2023/0215435 | A1 | 7/2023 | Manjunath et al. |
| 2023/0216963 | A1 | 7/2023 | Van Os et al. |
| 2023/0236676 | A1 | 7/2023 | Hindi et al. |
| 2023/0236717 | A1 | 7/2023 | Meyer et al. |
| 2023/0245657 | A1 | 8/2023 | Liang et al. |
| 2023/0251881 | A1 | 8/2023 | Radebaugh et al. |
| 2023/0253005 | A1 | 8/2023 | Binder et al. |
| 2023/0254448 | A1 | 8/2023 | Binder et al. |
| 2023/0259550 | A1 * | 8/2023 | Graham .................. G10L 15/30 704/270 |
| 2023/0262605 | A1 | 8/2023 | Freeman et al. |
| 2023/0267422 | A1 | 8/2023 | Herman et al. |
| 2023/0290352 | A1 | 9/2023 | York et al. |
| 2023/0292027 | A1 | 9/2023 | Gong et al. |
| 2023/0298595 | A1 | 9/2023 | Orr et al. |
| 2023/0306968 | A1 | 9/2023 | Liang et al. |
| 2023/0325157 | A1 | 10/2023 | Hurley et al. |
| 2023/0335132 | A1 | 10/2023 | Garcia et al. |
| 2023/0344537 | A1 | 10/2023 | Ingebretsen et al. |
| 2023/0352007 | A1 | 11/2023 | Castellani et al. |
| 2023/0352014 | A1 | 11/2023 | Tennant et al. |
| 2023/0352016 | A1 | 11/2023 | Kudurshian et al. |
| 2023/0352022 | A1 | 11/2023 | Milden |
| 2023/0359334 | A1 | 11/2023 | Chapman et al. |
| 2023/0359475 | A1 | 11/2023 | Karashchuk et al. |
| 2023/0367458 | A1 | 11/2023 | Burgess et al. |
| 2023/0367777 | A1 | 11/2023 | Burgess et al. |
| 2023/0367795 | A1 | 11/2023 | Burgess et al. |
| 2023/0368783 | A1 | 11/2023 | Marchi et al. |
| 2023/0368787 | A1 | 11/2023 | Sumner et al. |
| 2023/0368788 | A1 | 11/2023 | Ma et al. |
| 2023/0368791 | A1 | 11/2023 | Walker et al. |
| 2023/0368812 | A1 | 11/2023 | Marchi et al. |
| 2023/0376690 | A1 | 11/2023 | Bellegarda et al. |
| 2023/0386460 | A1 | 11/2023 | Fish et al. |
| 2023/0386462 | A1 | 11/2023 | Piernot et al. |
| 2023/0386464 | A1 | 11/2023 | Manjunath et al. |
| 2023/0386469 | A1 | 11/2023 | Horton et al. |
| 2023/0386478 | A1 | 11/2023 | Liu et al. |
| 2023/0388409 | A1 | 11/2023 | Weinstein et al. |
| 2023/0393712 | A1 | 12/2023 | Fujita et al. |
| 2023/0393811 | A1 | 12/2023 | Piersol et al. |
| 2023/0393872 | A1 | 12/2023 | Ellis et al. |
| 2023/0394248 | A1 | 12/2023 | Bellegarda |
| 2023/0395067 | A1 | 12/2023 | Perkins et al. |
| 2023/0401795 | A1 | 12/2023 | Streja et al. |
| 2023/0401798 | A1 | 12/2023 | Bigham et al. |
| 2023/0409174 | A1 | 12/2023 | Liang et al. |
| 2023/0409179 | A1 | 12/2023 | Liang et al. |
| 2023/0409283 | A1 | 12/2023 | Gruber et al. |
| 2023/0410540 | A1 | 12/2023 | Dehghan et al. |
| 2023/0410798 | A1 | 12/2023 | Greborio et al. |
| 2023/0410805 | A1 | 12/2023 | Drummie et al. |
| 2023/0419967 | A1 | 12/2023 | Hornberger et al. |
| 2024/0029734 | A1 | 1/2024 | Lemay et al. |
| 2024/0054996 | A1 | 2/2024 | Vescovi et al. |
| 2024/0055017 | A1 | 2/2024 | Maddika et al. |
| 2024/0064370 | A1 | 2/2024 | Van Os et al. |
| 2024/0075944 | A1 | 3/2024 | Sahoo |
| 2024/0087566 | A1 | 3/2024 | Piernot et al. |
| 2024/0096321 | A1 | 3/2024 | Naik et al. |
| 2024/0111402 | A1 | 4/2024 | Blatz et al. |
| 2024/0118744 | A1 | 4/2024 | Vaughan et al. |
| 2024/0134506 | A1 | 4/2024 | Napolitano et al. |
| 2024/0146776 | A1 | 5/2024 | Hansen et al. |
| 2024/0185856 | A1 | 6/2024 | Paek et al. |
| 2024/0201946 | A1 | 6/2024 | Stasior et al. |
| 2024/0303268 | A1 * | 9/2024 | Graham .................. G10L 15/30 |

FOREIGN PATENT DOCUMENTS

| | | | |
|---|---|---|---|
| AU | 2015101171 | A4 | 10/2015 |
| AU | 2017203668 | A1 | 1/2018 |
| AU | 2018100187 | A4 | 3/2018 |
| AU | 2017222436 | A1 | 10/2018 |
| CH | 709795 | A1 | 12/2015 |
| CN | 103533143 | A | 1/2014 |
| CN | 103533154 | A | 1/2014 |
| CN | 103543902 | A | 1/2014 |
| CN | 103546453 | A | 1/2014 |
| CN | 103562863 | A | 2/2014 |
| CN | 103582896 | A | 2/2014 |
| CN | 103593054 | A | 2/2014 |
| CN | 103595869 | A | 2/2014 |
| CN | 103608859 | A | 2/2014 |
| CN | 103620605 | A | 3/2014 |
| CN | 103645876 | A | 3/2014 |
| CN | 103677261 | A | 3/2014 |
| CN | 103686723 | A | 3/2014 |
| CN | 103714816 | A | 4/2014 |
| CN | 103716454 | A | 4/2014 |
| CN | 103718568 | A | 4/2014 |
| CN | 103727948 | A | 4/2014 |
| CN | 103730120 | A | 4/2014 |
| CN | 103744761 | A | 4/2014 |
| CN | 103748531 | A | 4/2014 |
| CN | 103760984 | A | 4/2014 |
| CN | 103761104 | A | 4/2014 |
| CN | 103765385 | A | 4/2014 |
| CN | 103778527 | A | 5/2014 |
| CN | 103780758 | A | 5/2014 |
| CN | 103782253 | A | 5/2014 |
| CN | 103792985 | A | 5/2014 |
| CN | 103794212 | A | 5/2014 |
| CN | 103795850 | A | 5/2014 |
| CN | 103795866 | A | 5/2014 |
| CN | 103809548 | A | 5/2014 |
| CN | 103841268 | A | 6/2014 |
| CN | 103870168 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103943107 | A | 7/2014 |
| CN | 103956169 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104011731 | A | 8/2014 |
| CN | 102693729 | B | 9/2014 |
| CN | 104036774 | A | 9/2014 |
| CN | 104038621 | A | 9/2014 |
| CN | 104050153 | A | 9/2014 |
| CN | 104090652 | A | 10/2014 |

(56) References Cited

FOREIGN PATENT DOCUMENTS

| | | | |
|---|---|---|---|
| CN | 104092829 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104219785 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335205 | A | 2/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104376250 | A | 2/2015 |
| CN | 104378723 | A | 2/2015 |
| CN | 104423594 | A | 3/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104520849 | A | 4/2015 |
| CN | 104573472 | A | 4/2015 |
| CN | 104575493 | A | 4/2015 |
| CN | 104575501 | A | 4/2015 |
| CN | 104575504 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104662600 | A | 5/2015 |
| CN | 104679472 | A | 6/2015 |
| CN | 104685898 | A | 6/2015 |
| CN | 104699746 | A | 6/2015 |
| CN | 104731441 | A | 6/2015 |
| CN | 104769584 | A | 7/2015 |
| CN | 104769670 | A | 7/2015 |
| CN | 104798012 | A | 7/2015 |
| CN | 104820488 | A | 8/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104932826 | A | 9/2015 |
| CN | 104951077 | A | 9/2015 |
| CN | 104951458 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144037 | A | 12/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105264903 | A | 1/2016 |
| CN | 105265005 | A | 1/2016 |
| CN | 105278681 | A | 1/2016 |
| CN | 105320251 | A | 2/2016 |
| CN | 105320726 | A | 2/2016 |
| CN | 105338425 | A | 2/2016 |
| CN | 105379234 | A | 3/2016 |
| CN | 105427122 | A | 3/2016 |
| CN | 105430186 | A | 3/2016 |
| CN | 105468137 | A | 4/2016 |
| CN | 105471705 | A | 4/2016 |
| CN | 105472587 | A | 4/2016 |
| CN | 105516441 | A | 4/2016 |
| CN | 105554217 | A | 5/2016 |
| CN | 105556592 | A | 5/2016 |
| CN | 105677765 | A | 6/2016 |
| CN | 105791920 | A | 7/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106062790 | A | 10/2016 |
| CN | 106164909 | A | 11/2016 |
| CN | 106294558 | A | 1/2017 |
| CN | 106415412 | A | 2/2017 |
| CN | 106462383 | A | 2/2017 |
| CN | 106462617 | A | 2/2017 |
| CN | 106463114 | A | 2/2017 |
| CN | 106465074 | A | 2/2017 |
| CN | 106471570 | A | 3/2017 |
| CN | 106534469 | A | 3/2017 |
| CN | 106558310 | A | 4/2017 |
| CN | 106575195 | A | 4/2017 |
| CN | 106575501 | A | 4/2017 |
| CN | 106663224 | A | 5/2017 |
| CN | 106773742 | A | 5/2017 |
| CN | 106776581 | A | 5/2017 |
| CN | 107003738 | A | 8/2017 |
| CN | 107004412 | A | 8/2017 |
| CN | 107450800 | A | 12/2017 |
| CN | 107480161 | A | 12/2017 |
| CN | 107490971 | A | 12/2017 |
| CN | 107491285 | A | 12/2017 |
| CN | 107491295 | A | 12/2017 |
| CN | 107491468 | A | 12/2017 |
| CN | 107491469 | A | 12/2017 |
| CN | 107506037 | A | 12/2017 |
| CN | 107545262 | A | 1/2018 |
| CN | 107589841 | A | 1/2018 |
| CN | 107608998 | A | 1/2018 |
| CN | 107615378 | A | 1/2018 |
| CN | 107623616 | A | 1/2018 |
| CN | 107644053 | A | 1/2018 |
| CN | 107683470 | A | 2/2018 |
| CN | 107786730 | A | 3/2018 |
| CN | 107852436 | A | 3/2018 |
| CN | 107871500 | A | 4/2018 |
| CN | 107889533 | A | 4/2018 |
| CN | 107919123 | A | 4/2018 |
| CN | 107924313 | A | 4/2018 |
| CN | 107978313 | A | 5/2018 |
| CN | 108268187 | A | 7/2018 |
| CN | 108604449 | A | 9/2018 |
| CN | 108647681 | A | 10/2018 |
| CN | 109155132 | A | 1/2019 |
| CN | 109447234 | A | 3/2019 |
| CN | 109657629 | A | 4/2019 |
| CN | 109691074 | A | 4/2019 |
| CN | 110135411 | A | 8/2019 |
| CN | 110263144 | A | 9/2019 |
| CN | 105164719 | B | 11/2019 |
| CN | 110446000 | A | 11/2019 |
| CN | 110531860 | A | 12/2019 |
| CN | 110554761 | A | 12/2019 |
| CN | 110598671 | A | 12/2019 |
| CN | 110647274 | A | 1/2020 |
| CN | 110825469 | A | 2/2020 |
| CN | 110945840 | A | 3/2020 |

(56) References Cited

FOREIGN PATENT DOCUMENTS

| | | | |
|---|---|---|---|
| CN | 111124224 | A | 5/2020 |
| CN | 107123417 | B | 6/2020 |
| CN | 111316203 | A | 6/2020 |
| CN | 111722716 | A | 9/2020 |
| CN | 111934959 | A | 11/2020 |
| CN | 112204507 | A | 1/2021 |
| DE | 202016008226 | U1 | 5/2017 |
| DK | 179570 | B1 | 2/2019 |
| DK | 180129 | B1 | 6/2020 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2741190 | A2 | 6/2014 |
| EP | 2743846 | A2 | 6/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881898 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 2996359 | A1 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3076267 | A1 | 10/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3201770 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 3155500 | B1 | 7/2018 |
| EP | 2973380 | B1 | 8/2018 |
| EP | 2983065 | B1 | 8/2018 |
| EP | 3382530 | A1 | 10/2018 |
| EP | 3389045 | A1 | 10/2018 |
| EP | 3392876 | A1 | 10/2018 |
| EP | 3401773 | A1 | 11/2018 |
| EP | 3485392 | A1 | 5/2019 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588912 | A1 | 1/2020 |
| EP | 3323058 | B1 | 2/2020 |
| EP | 3321928 | B1 | 4/2020 |
| EP | 3646205 | A1 | 5/2020 |
| EP | 3674922 | A1 | 7/2020 |
| EP | 3913475 | A1 | 11/2021 |
| EP | 3971688 | A1 | 3/2022 |
| EP | 4131256 | A1 | 2/2023 |
| IN | 201917007360 | A | 5/2019 |
| JP | 2006-202127 | A | 8/2006 |
| JP | 2009-545833 | A | 12/2009 |
| JP | 2014-2586 | A | 1/2014 |
| JP | 2014-10688 | A | 1/2014 |
| JP | 2014-502445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-513835 | A | 6/2014 |
| JP | 2014-124332 | A | 7/2014 |
| JP | 2014-126600 | A | 7/2014 |
| JP | 2014-127754 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-157323 | A | 8/2014 |
| JP | 2014-519648 | A | 8/2014 |
| JP | 2014-182042 | A | 9/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2014-235582 | A | 12/2014 |
| JP | 2015-1931 | A | 1/2015 |
| JP | 2015-4928 | A | 1/2015 |
| JP | 2015-8001 | A | 1/2015 |
| JP | 2015-10979 | A | 1/2015 |
| JP | 2015-12301 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-87979 | A | 5/2015 |
| JP | 2015-94848 | A | 5/2015 |
| JP | 2015-514254 | A | 5/2015 |
| JP | 2015-519675 | A | 7/2015 |
| JP | 2015-520409 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-156845 | A | 9/2016 |
| JP | 2016-536648 | A | 11/2016 |
| JP | 2017-11608 | A | 1/2017 |
| JP | 2017-19331 | A | 1/2017 |
| JP | 2017-516153 | A | 6/2017 |
| JP | 2017-123187 | A | 7/2017 |

(56) References Cited

FOREIGN PATENT DOCUMENTS

| | | | |
|---|---|---|---|
| JP | 2017-211608 | A | 11/2017 |
| JP | 2017-537361 | A | 12/2017 |
| JP | 2018-14086 | A | 1/2018 |
| JP | 6291147 | B1 | 2/2018 |
| JP | 2018-60550 | A | 4/2018 |
| JP | 2018-64297 | A | 4/2018 |
| JP | 2018-511095 | A | 4/2018 |
| JP | 2018-101242 | A | 6/2018 |
| JP | 2018-113035 | A | 7/2018 |
| JP | 2018-525653 | A | 9/2018 |
| JP | 2018-525950 | A | 9/2018 |
| JP | 2018-536889 | A | 12/2018 |
| JP | 2019-204517 | A | 11/2019 |
| KR | 10-2006-0061403 | A | 6/2006 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0048779 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0071208 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-2015-0025059 | A | 3/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-1510013 | B1 | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0004482 | A | 1/2017 |
| KR | 10-2017-0006592 | A | 1/2017 |
| KR | 10-2017-0036805 | A | 4/2017 |
| KR | 10-2017-0096774 | A | 8/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0122837 | A | 11/2018 |
| KR | 10-2018-0133525 | A | 12/2018 |
| KR | 10-2018-0135877 | A | 12/2018 |
| KR | 10-1959328 | B1 | 3/2019 |
| KR | 10-2020-0007926 | A | 1/2020 |
| KR | 10-2020-0105519 | A | 9/2020 |
| RU | 2012141604 | A | 4/2014 |
| TW | 201407184 | A | 2/2014 |
| TW | 201610982 | A | 3/2016 |
| TW | 201629750 | A | 8/2016 |
| WO | 2011/088053 | A2 | 7/2011 |
| WO | 2012/056463 | A1 | 5/2012 |
| WO | 2012/092562 | A1 | 7/2012 |
| WO | 2012/145227 | A1 | 10/2012 |
| WO | 2012/167168 | A2 | 12/2012 |
| WO | 2012/173902 | A2 | 12/2012 |
| WO | 2013/048880 | A1 | 4/2013 |
| WO | 2013/057153 | A1 | 4/2013 |
| WO | 2013/122310 | A1 | 8/2013 |
| WO | 2013/173504 | A1 | 11/2013 |
| WO | 2014/003138 | A1 | 1/2014 |
| WO | 2014/004544 | A2 | 1/2014 |
| WO | 2014/004584 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2014/144949 | A3 | 11/2014 |
| WO | 2014/190297 | A1 | 11/2014 |
| WO | 2013/173504 | A8 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/001850 | A1 | 1/2015 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/085542 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |

(56) References Cited

FOREIGN PATENT DOCUMENTS

WO 2015/099939 A1 7/2015
WO 2015/112625 A1 7/2015
WO 2015/116151 A1 8/2015
WO 2015/121449 A1 8/2015
WO 2015/127404 A1 8/2015
WO 2015/151133 A1 10/2015
WO 2015/153310 A1 10/2015
WO 2015/157013 A1 10/2015
WO 2015/183368 A1 12/2015
WO 2015/183401 A1 12/2015
WO 2015/183547 A1 12/2015
WO 2015/183699 A1 12/2015
WO 2015/184186 A1 12/2015
WO 2015/184387 A1 12/2015
WO 2015/200207 A1 12/2015
WO 2016/004074 A1 1/2016
WO 2016/027933 A1 2/2016
WO 2016/028946 A1 2/2016
WO 2016/033257 A1 3/2016
WO 2016/039992 A1 3/2016
WO 2016/040721 A1 3/2016
WO 2016/045192 A1 3/2016
WO 2016/048789 A1 3/2016
WO 2016/049439 A1 3/2016
WO 2016/051519 A1 4/2016
WO 2016/052164 A1 4/2016
WO 2016/054230 A1 4/2016
WO 2016/057268 A1 4/2016
WO 2016/075081 A1 5/2016
WO 2016/085775 A2 6/2016
WO 2016/085776 A1 6/2016
WO 2016/089029 A1 6/2016
WO 2016/089638 A1 6/2016
WO 2016/100139 A1 6/2016
WO 2016/111881 A1 7/2016
WO 2016/118344 A1 7/2016
WO 2016/144840 A1 9/2016
WO 2016/144982 A1 9/2016
WO 2016/144983 A1 9/2016
WO 2016/175354 A1 11/2016
WO 2016/187149 A1 11/2016
WO 2016/190950 A1 12/2016
WO 2016/191737 A2 12/2016
WO 2016/209444 A1 12/2016
WO 2016/209924 A1 12/2016
WO 2017/044160 A1 3/2017
WO 2017/044257 A1 3/2017
WO 2017/044260 A1 3/2017
WO 2017/044629 A1 3/2017
WO 2017/053311 A1 3/2017
WO 2017/058293 A1 4/2017
WO 2017/059388 A1 4/2017
WO 2017/071420 A1 5/2017
WO 2017/078792 A1 5/2017
WO 2017/142116 A1 8/2017
WO 2017/160487 A1 9/2017
WO 2017/200777 A1 11/2017
WO 2017/203484 A1 11/2017
WO 2017/210035 A1 12/2017
WO 2017/213678 A1 12/2017
WO 2017/213681 A1 12/2017
WO 2017/213682 A1 12/2017
WO 2017/213684 A1 12/2017
WO 2017/218194 A1 12/2017
WO 2018/009397 A1 1/2018
WO 2018/014788 A1 1/2018
WO 2018/017383 A1 1/2018
WO 2018/034168 A1 2/2018
WO 2018/044633 A1 3/2018
WO 2018/055898 A1 3/2018
WO 2018/057269 A1 3/2018
WO 2018/067528 A1 4/2018
WO 2018/075170 A1 4/2018
WO 2018/081833 A1 5/2018
WO 2018/090060 A1 5/2018
WO 2018/093005 A1 5/2018
WO 2018/094254 A1 5/2018
WO 2018/176053 A1 9/2018
WO 2018/208506 A1 11/2018
WO 2018/209152 A1 11/2018
WO 2018/213401 A1 11/2018
WO 2018/213415 A1 11/2018
WO 2018/213481 A1 11/2018
WO 2018/217014 A1 11/2018
WO 2018/231307 A1 12/2018
WO 2019/067930 A1 4/2019
WO 2019/078576 A1 4/2019
WO 2019/079017 A1 4/2019
WO 2019/143397 A1 7/2019
WO 2019/147429 A1 8/2019
WO 2019/190646 A2 10/2019
WO 2019/212569 A1 11/2019
WO 2019/231537 A1 12/2019
WO 2019/231541 A1 12/2019
WO 2019/236217 A1 12/2019
WO 2020/010530 A1 1/2020
WO 2020/022572 A1 1/2020
WO 2020/040775 A1 2/2020
WO 2020/068040 A1 4/2020
WO 2020/096706 A1 5/2020
WO 2020/109074 A1 6/2020
WO 2020/134896 A1 7/2020
WO 2020/208302 A1 10/2020
WO 2020/214006 A1 10/2020
WO 2020/222871 A1 11/2020
WO 2021/054565 A1 3/2021
WO 2021/061349 A1 4/2021
WO 2021/062148 A1 4/2021
WO 2021/076164 A1 4/2021
WO 2021/188439 A1 9/2021
WO 2021/252230 A1 12/2021
WO 2022/047214 A2 3/2022

OTHER PUBLICATIONS

Alexa, Turn Up the Heat! Smartthings Samsung Online available at: <https://web.archive.org/web/20160329142041/https://blog.smartthings.com/news/smartthingsupdates/alexa-turn-up-the-heat/>, Mar. 3, 2016, 3 pages.

Anania, Peter, "Amazon Echo with Home Automation (Smartthings)", Online available at: <https://www.youtube.com/watch?v=LMW6aXmsWNE>, Dec. 20, 2015, 1 page.

Apple, "VoiceOver for Os X", Online available at: <http://www.apple.com/accessibility/voiceover/>, May 19, 2014, pp. 1-3.

Applicant-Initiated Interview Summary received for U.S. Appl. No. 16/290,737, mailed on Sep. 9, 2020, 3 pages.

"Ask Alexa—Things That Are Smart Wiki", Online available at: <http://thingsthataresmart.wiki/index.php?title=Ask_Alexa&oldid=4283>, Jun. 8, 2016, pp. 1-31.

Brief Communication Regarding Oral Proceedings received for European Patent Application No. 18722342.5, mailed on May 11, 2021, 15 pages.

Brief Communication Regarding Oral Proceedings received for European Patent Application No. 18722342.5, mailed on May 20, 2021, 2 pages.

Brief Communication Regarding Oral Proceedings received for European Patent Application No. 21190166.5, mailed on Jun. 27, 2023, 14 pages.

Colt, Sam, "Here's One Way Apple's Smartwatch Could Be Better Than Anything Else", Business Insider, Aug. 21, 2014, pp. 1-4.

Corrected Notice of Allowance received for U.S. Appl. No. 15/940,869, mailed on Apr. 16, 2019, 2 pages.

Corrected Notice of Allowance received for U.S. Appl. No. 15/940,869, mailed on May 2, 2019, 2 pages.

Corrected Notice of Allowance received for U.S. Appl. No. 17/162,448, mailed on Apr. 14, 2023, 2 pages.

Corrected Notice of Allowance received for U.S. Appl. No. 18/138,234, mailed on May 23, 2024, 2 pages.

Decision to Grant received for Danish Patent Application No. PA201770426, mailed on May 29, 2018, 2 pages.

(56) References Cited

OTHER PUBLICATIONS

Decision to Refuse received for European Patent Application No. 18722342.5, mailed on Jun. 2, 2021, 19 pages.
Decision to Refuse received for European Patent Application No. 21190166.5, mailed on Jul. 26, 2023, 23 pages.
Deedeevuu, "Amazon Echo Alarm Feature", Online available at: <https://www.youtube.com/watch?v=fdjU8eRLk7c>, Feb. 16, 2015, 1 page.
Extended European Search Report received for European Patent Application No. 21190166.5, mailed on Nov. 9, 2021, 9 pages.
Extended European Search Report received for European Patent Application No. 23201608.9, mailed on Jan. 12, 2024, 8 pages.
Filipowicz, Luke, "How to use the QuickType keyboard in iOS 8", Online available at: <https://www.imore.com/comment/568232>, Oct. 11, 2014, pp. 1-17.
Final Office Action received for U.S. Appl. No. 17/162,448, mailed on Jan. 18, 2023, 17 pages.
Guim, Mark, "How to Set a Person-Based Reminder with Cortana", Online available at: <http://www.wpcentral.com/how-to-person-based-reminder-cortana>, Apr. 26, 2014, 15 pages.
"Headset Button Controller v7.3 APK Full APP Download for Andriod, Blackberry, iPhone", Online available at: <http://fullappdownload.com/headset-button-controller-v7-3-apk/>, Jan. 27, 2014, 11 pages.
id3.org, "id3v2.4.0-Frames", Online available at: <http://id3.org/id3v2.4.0-frames?action=print>, retrieved on Jan. 22, 2015, pp. 1-41.
Intention to Grant received for Danish Patent Application No. PA201770425, mailed on May 25, 2018, 2 pages.
Intention to Grant received for Danish Patent Application No. PA201770426, mailed on Mar. 1, 2018., 2 pages.
"Interactive Voice", Online available at: <http://www.helloivee.com/company/>, retrieved on Feb. 10, 2014, 2 pages.
International Preliminary Report on Patentability received for PCT Patent Application No. PCT/US2018/027879, mailed on Nov. 28, 2019, 16 pages.
International Search Report and Written Opinion received for PCT Patent Application No. PCT/US2018/027879, mailed on Aug. 24, 2018, 20 pages.
Invitation to Pay Additional Fees and Partial Search Report received for PCT Patent Application No. PCT/US2018/027879, mailed on Jul. 13, 2018., 14 pages.
Invitation To Pay Additional Fees for European Patent Application No. 18722342.5, mailed on Jul. 8, 2019, 3 pages.
Jonsson et al., "Proximity-based Reminders Using Bluetooth", 2014 IEEE International Conference on Pervasive Computing and Communications Demonstrations, 2014, pp. 151-153.
Kickstarter, "Ivee Sleek: Wi-Fi Voice-Activated Assistant", Online available at: <https://www.kickstarter.com/projects/ivee/ivee-sleek-wi-fi-voice-activated-assistant>, retrieved on Feb. 10, 2014, pp. 1-13.
"Meet Ivee, Your Wi-Fi Voice Activated Assistant", Available Online at: <http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Miller, Chance, "Google Keyboard Updated with New Personalized Suggestions Feature", Online available at: <http://9to5google.com/2014/03/19/google-keyboard-updated-with-new-personalized-suggestions-feature/>, Mar. 19, 2014, 4 pages.
Minutes of the Oral Proceedings received for European Patent Application No. 21190166.5, mailed on Jul. 25, 2023, 7 pages.
Myers, Brad A., "Shortcutter for Palm", Available at: <http://www.cs.cmu.edu/~pebbles/v5/shortcutter/palm/index.html>, retrieved on Jun. 18, 2014, 10 pages.
Non-Final Office Action received for U.S. Appl. No. 15/940,203, mailed on Nov. 15, 2018, 18 pages.
Non-Final Office Action received for U.S. Appl. No. 15/940,869, mailed on Aug. 6, 2018, 20 pages.
Non-Final Office Action received for U.S. Appl. No. 16/290,737, mailed on Jun. 11, 2020, 10 pages.
Non-Final Office Action received for U.S. Appl. No. 17/162,448, mailed on Oct. 14, 2022, 26 pages.
Non-Final Office Action received for U.S. Appl. No. 18/138,234, mailed on Feb. 1, 2024, 22 pages.
Notice of Acceptance received for Australian Patent Application No. 2018220034, mailed on Apr. 4, 2019, 3 pages.
Notice of Allowance received for Danish Patent Application No. PA201770425, mailed on Aug. 30, 2018, 2 pages.
Notice of Allowance received for Japanese Patent Application No. 2018-544350, mailed on Feb. 10, 2020, 4 pages.
Notice of Allowance received for Korean Patent Application No. 10-2018-7023580, mailed on Dec. 20, 2018, 4 pages.
Notice of Allowance received for Korean Patent Application No. 10-2019-7005907, mailed on Mar. 12, 2019, 5 pages.
Notice of Allowance received for U.S. Appl. No. 15/940,869, mailed on Dec. 20, 2018, 11 pages.
Notice of Allowance received for U.S. Appl. No. 15/940,869, mailed on Feb. 15, 2019, 2 pages.
Notice of Allowance received for U.S. Appl. No. 16/290,737, mailed on Oct. 15, 2020, 8 pages.
Notice of Allowance received for U.S. Appl. No. 17/162,448, mailed on Feb. 16, 2023, 9 pages.
Notice of Allowance received for U.S. Appl. No. 18/138,234, mailed on Mar. 19, 2024, 8 pages.
Notice of Allowance received for U.S. Appl. No. 18/138,234, mailed on Mar. 26, 2024, 2 pages.
Office Action received for Australian Patent Application No. 2018220034, mailed on Sep. 28, 2018, 3 pages.
Office Action received for Chinese Patent Application No. 201811545598.7, mailed on Aug. 15, 2023, 22 pages.
Office Action received for Chinese Patent Application No. 201811545598.7, mailed on May 10, 2023, 34 pages.
Office Action received for Chinese Patent Application No. 201811545598.7, mailed on Nov. 3, 2022, 33 pages.
Office Action received for Chinese Patent Application No. 201880000763.2, mailed on Aug. 2, 2021, 15 pages.
Office Action received for Chinese Patent Application No. 201880000763.2, mailed on Feb. 3, 2021, 18 pages.
Office Action received for Chinese Patent Application No. 201880000763.2, mailed on Jun. 29, 2020, 18 pages.
Office Action received for Chinese Patent Application No. 201880000763.2, mailed on Nov. 26, 2019, 16 pages.
Office Action received for Danish Patent Application No. PA201770425, mailed on Apr. 19, 2018, 2 pages.
Office Action received for Danish Patent Application No. PA201770425, mailed on Mar. 2, 2018, 3 pages.
Office Action received for European Patent Application No. 18722342.5, mailed on Feb. 11, 2020, 9 pages.
Office Action received for European Patent Application No. 18722342.5, mailed on Jul. 30, 2019, 10 pages.
Office Action received for European Patent Application No. 21190166.5, mailed on Jul. 14, 2022, 10 pages.
Office Action received for Japanese Patent Application No. 2018-544350, mailed on Jul. 1, 2019, 11 pages.
Routines, "SmartThings Support", Online available at: <https://web.archive.org/web/20151207165701/https://support.smartthings.com/hc/en-us/articles/205380034-Routines>, 2015, 3 pages.
Search Report received for Danish Patent Application No. PA201770425, mailed on Oct. 4, 2017, 12 pages.
Search Report received for Danish Patent Application No. PA201770426, mailed on Oct. 4, 2017, 7 pages.
Selfridge et al., "Interact: Tightly-coupling Multimodal Dialog with an Interactive Virtual Assistant", International Conference on Multimodal Interaction, ACM, Nov. 9, 2015, pp. 381-382.
"SmartThings +Amazon Echo", Smartthings Samsung [online], online available at: <https://web.archive.org/web/20160509231428/https://blog.smartthings.com/featured/alexa-turn-on-my-smartthings/>, Aug. 21, 2015, 3 pages.
Summons to Attend Oral Proceedings received for European Patent Application No. 18722342.5, mailed on Sep. 8, 2020, 11 pages.

(56) References Cited

OTHER PUBLICATIONS

Summons to Attend Oral Proceedings received for European Patent Application No. 21190166.5, mailed on Feb. 10, 2023, 13 pages.
X.Ai, "How it Works", Online available at: <https://web.archive.org/web/20160531201426/https://x.ai/how-it-works/>, May 31, 2016, 6 pages.
Yu, et al., "TV program recommendation for multiple viewers based on user profile merging", User Model User-Adap Inter, vol. 16, Jun. 1, 2005, 20 pages.
Zhong et al., "JustSpeak: Enabling Universal Voice Control on Android", W4A'14, Proceedings of the 11th Web for All Conference, No. 36, Apr. 7-9, 2014, 8 pages.
Office Action received for European Patent Application No. 23201608.9, mailed on Jun. 5, 2025, 14 pages.
Abdelaziz et al., "Speaker-Independent Speech-Driven Visual Speech Synthesis using Domain-Adapted Acoustic Models", May 15, 2019, 9 pages.
"Accessibility on iOS", Apple Inc., online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech, and Signal Processing (ICASSP), Brisbane, Australia, Sep. 2015, 5 pages.
Amazon, Alexa, "Getting your news with Alexa flash briefing", Online available at: https://www.youtube.com/watch?v=xui8rumrNaE, Sep. 9, 2019, 2 pages.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "Apple previews innovative accessibility features combining the power of hardware, software, and machine learning", Available online at: https://www.apple.com/newsroom/2022/05/apple-previews-innovative-accessibility- features/, May 17, 2022, 10 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Badshah et al., "Deep Features-based Speech Emotion Recognition for Smart Affective Services", Multimedia Tools and Applications, Oct. 31, 2017, pp. 5571-5589.
Bao et al., "Detecting Target Objects by Natural Language Instructions Using an RGB-D Camera", Sensors (Basel, Switzerland) 2016, 16(12), 2117, Dec. 13, 2016, 23 pages.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
beointegration.com, "BeoLink Gateway—Programming Example", Online Available at: <https://www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-139.
Burgbacher et al, "Synthetic Word Gesture Generation for Stroke-Based Virtual Keyboards", IEEE Transactions on Human-Machine Systems, vol. 47, No. 2, Apr. 2017, 14 pages.
Burgess, Brian, "Amazon Echo Tip: Enable the Wake-Up Sound", Online available at: https://www.groovypost.com/howto/amazon-echo-tip-enable-wake-up-sound/>, Jun. 30, 2015, 4 pages.
Buttner et al., "The Design Space of Augmented and Virtual Reality Applications for Assistive Environments in Manufacturing: A Visual Approach", In Proceedings of the 10th International Conference on Pervasive Technologies Related to Assistive Environments (PETRA '17), Island of Rhodes, Greece, online abailable at: https://dl.acm.org/doi/pdf/10.1145/3056540.3076193, Jun. 21-23, 2017, pp. 433-440.
"Cake", Online Available at: <https://web.archive.org/web/20170808091948/https://emojipedia.org/search/?q=cake>, Aug. 8, 2017, 5 pages.
Cambria et al., "Jumping NLP curves: A Review of Natural Language Processing Research", IEEE Computational Intelligence magazine, 2014, vol. 9, May 2014, pp. 48-57.
Castellini, Rick, "How to enable and use dictation with an iPhone or iPad", Online Available at: <https://www.youtube.com/watch?v=8w133yN6rTU>, Sep. 7, 2017, 3 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan,
Choi et al.,
Chung et al.,
Conneau et al.,
Context-Sensitive
Creswell et al.,
Czech, Lucas,
Dai et al.,
Daxm,
Delcroix et al.,
Derrick, Amanda,
Dighe et al.,
Dihelson,
Dwork et al.,
Eder et al.,
Fernando et al.,
Ermolina et al.,
Fitzpatrick, Aidan,
Francis, Christopher.
Gadget Hacks,
Galaxy S7:
Ganin et al.,
Gattys et al.,
Geyer et al.,
Ghauth et al.,
Goodfellow et al.,
Google
Gu et al.,
Guo et al.,
Gupta et al.,
Hanqing et al.,
Huang et al.,
Hawkeye et al.,
Heller et al.,
Henderson et al.,
Hershey et al.,
Hey Google
Hinton et al.,
Hook et al.,
How to adjust
How to Enable
How to Use Ok Google
Idasallinen,
Ikeda, Masaru,
Inews and tech
Iphone 6 Smart Guide
Isik et al.,
Jeon et al., "Voice Trigger Detection from LVCSR Hypothesis Lattices Using Bidirectional Lattice Recurrent Neural Networks",

(56) References Cited

OTHER PUBLICATIONS

International Conference on Acoustics, Speech and Signal Processing (Icassp), IEEE, Feb. 29, 2020, 5 pages.
Jun, Yu, Research on 3D visual speech expression and emotional simulation, China Excellence Master's Theses Full-text Database Information Technology Edition, No. 3, Mar. 15, 2018, 78 pages (Official Copy only). {See communication under 37 CFR § 1.98(a) (3)}.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog. Aug. 11, 2016, 23 pages.
Kastrenakes, Jacob, "Siri's creators will unveil their new AI bot on Monday", The Verge, online available at: <https://web.archive.org/web/20160505090418/https://www.theverge.com/2016/5/4/1159 3564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC), vol. 6, No. 1, Jan. 2014, pp. 33-43.
Kumatani et al., "Direct Modeling of Raw Audio with DNNS For Wake Word Detection", in 2017 IEEE Automatic Speech Recognition and Understanding Workshop (ASRU), 2017. 6 pages.
Li et al., "Deep neural network for short-text sentiment classification", International Conference on Database Systems for Advanced Applications, Springer, Cham, 2016, 8 pages.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid &hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media Inc., Online Available at: <https://www.oreilly.com/library/view/what-is-the/9781491975633/>, 2015, 31 pages.
Luo et al., "Speaker-Independent Speech Separation with Deep Attractor Network", IEEE/ACM Transactions on Audio, Speech, And Language Processing, vol. 26, No. 4, Apr. 2018, pp. 787-796.
Maas et al., "Combining Acoustic Embeddings and Decoding Features for End-Of-Utterance Detection in Real-Time Far-Field Speech Recognition Systems", in 2018 IEEE International Conference on Acoustics, Speech and Signal Processing (ICASSP), IEEE, 2018, 5 pages.
Maharjan et al., "Alexa, What Should I Eat? A Personalized Virtual Nutrition Coach for Native American Diabetes Patients Using Amazon's Smart Speaker Technology", 2019 IEEE International Conference on E-health Networking, Application & Services (HealthCom), Online available at: https://ieeexplore.IEEE.org/document/9009613, 2019, 6 pages.
Mallidi et al., "Device-Directed Utterance Detection", Proc. Interspeech, Aug. 7, 2018, 4 pages.
Marketing Land, "Amazon Echo: Play music", Online Available at: <https://www.youtube.com/watch?v=A7V5NPbsXi4>, Apr. 27, 2015, 3 pages.
Matias, Yossi, "Easier access to web pages: Ask Google Assistant to read it aloud", Available online at: https://blog.google/products/assistant/easier-access-web-pages-let-assistant-read-it-aloud/, Mar. 4, 2020, 3 pages.
Mehri et al., "Multi-Granularity Representations of Dialog", Language Technologies Institute, Carnegie Mellon University, arXiv:1908.09890v1, Aug. 26, 2019, 10 pages.
"Method to Provide Remote Voice Navigation Capability on the Device", IP.COM, Jul. 21. 2016, 4 pages.
Michalevsky et al., "Gyrophone: Recognizing Speech from Gyroscope Signals". Proceedings of the 23rd USENIX Security Symposium, Aug. 20-22, 2014, pp. 1053-1067.
"Microsoft Soundscape—A map delivered in 3D sound", Microsoft Research, online available at: https://www.microsoft.com/en-US/research/product/soundscape/, Retrieved on Jul. 26, 2021, 5 pages.
Mnih et al., "Human-Level Control Through Deep Reinforcement Learning", Nature, vol. 518, Feb. 26, 2015, pp. 529-533.
Modern Techies, "Braina-Artificial Personal Assistant for PC (like Cortana,Siri)!!!", Online available at: <https://www.youtube.com/watch?v=_Coo2P8ilqQ>, Feb. 24, 2017, 3 pages.
Muller et al., "A Taxonomy for Information Linking in Augmented Reality", AVR 2016, Part I, Lncs 9768, 2016, pp. 368-387.
Muller et al., "Control Theotetic Models of Pointing", ACM Transactions on Computer-Human Interaction, Aug. 2017, 36 pages.
Myrick et al., "How to Insert Emojis Using Your Voice with Google Assistant", Onlinr available at: <https:///web.archive.org/wev/20211107160722/https://www.androidcentral.com/how-insert-emojis-using-your-voice-google-assistant>, Nov. 7, 2021, 11 pages.
Norouzian et al., "Exploring Attention Mechanism for Acoustic based Classifications of Speech Utterances into System-Directed and Non-System-Directed", International COnference on Acoustics, Speech, and Signal Processing (ICASSP), IEEE, Feb. 1, 2019, 5 pages.
"Nuance Dragon Naturally Speaking", Version 13 End-User Workbook, Nuance Communcations Inc., Sep. 2014, 125 pages.
Pak, Gamerz "Braina: Artificially Intelligent Assistant Software for Windows PC in (Urdu / Hindi)", Online available at: <https://www.youtube.com/watch?v=JH_rMjw8lqc>, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online available at: <https://blog.pandora.com/author.chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
"Pose, Cambridge Dictionary Definition of Pose", Available online at: <https://dictionary.cambridge.org/dictionary/english/pose>, 4 pages.
Price et al., "Speaker Adaptation of Deep Neural Networks Using a Hierarchy of Output Layers", SLT 2014. Online Available at: IEEE Explore, 2014, pp. 153-158.
Products for Pals—ALS Tech, "Skyle for iPad Pro eye gaze control real world review", Online Available at: <https://www.youtube.com/watch?v=_3TxZtDJpFo>, Aug. 13, 2020, 4 pages.
Qian et al., "Single-channel Multi-talker Speech Recognition with Permutation Invariant Training", Speech Communication, Issue 104, 2018, pp. 1-11.
"Quick Type Keyboard on iOS 8 Makes Typing Easier", Online available at: <https://www.youtube.com/watch?v=0CIdLR4fhVU>, Jun. 3, 2014, 3 pages.
Raux, Antoine, "High-Density Dialog Management the Topic Stack", Adventures in High Density, online available at: https://medium.

(56) References Cited

OTHER PUBLICATIONS com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: <https://imore.com/quicktype~ketboards~ios~8~explained>, Jun. 21, 2014, pp. 1-9.
Robbins, F.M., "Automatically place an Android Phone on Vibrate at Work", Available online at: https://mikefrobbins.com/2016/07/21/automatically-place-an-android-phone-on-vibrate-at-work/>, Jun. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, online available at: https://dl.acm.org/doi/pdf/10.1145/.027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'reilly, May 2015, 452 pages.
Samsung Support, "Create a Quick Command in Bixby to Launch Custom Settings by at Your Command", Online Available at: <https://www.facebook.com/samsungsupport/videos/10154746303151213>, Nov. 13, 2017, 1 page.
Santoas et al., "Fighting Offensive Language on Social Media with Unsupervised text Style Transfer", Proceedings of the 56th Annual Meeting of the Association for Computational Linguistics (vol. 2: Short Papers), May 20, 2018, 6 pages.
Schenck et al., "GazeEverywhere: Enabling Gaze-only User Interaction on an Unmodified Desktop PC in Everyday Scenarios", In Proceedings of the 2017 CHI Conference on Human Factors in Computing Systems (CHI'17), ACM, New York, NY, 30343044, Online Available at: https://doi.org/10.1145/3025453.3025455, May 6-11, 2017, 11 pages.
Seehafer, Brent, "Activate Google Assistant on Galaxy S7 with Screen off", Online available at: <https://productforums.google.com/forum/#topic/websearch/lp3qlGBHLVI>, Mar. 8, 2017, 4 pages.
Senior et al., "Improving DNN Speaker Independence With I-Vector Inputs", ICASSP, 2014, pp. 225-229.
Seroter et al., "Improving DNN Speaker Independence With I-Vector Inputs", ICASSP, 2014, pp. 225-229.
Settle et al., "End-to-End Multi-Speaker Speech Recognition", Proc. ICASSP, Apr. 2018, 6 pages.
Shen et al., "Style Transfer from Non~Parallel text By Cross-Alignment", 31st Conference on Neural Information Processing Systems (NIPS 2017), 2017, 12 pages.
Sigtia et al., "Effective Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonte, Tom, "Confronting Siri: Microsoft Launches Digital Assistant Cortana", 2014, 2 pages (Official Copy Only). }See communication under 37 CFR § 1.98(a) (3)}.
Siou, Serge, "How to Control Apple TV 3rd Generation Using Remote app", Online available at: <https://www.youtube.com/watch?v=PhyKftZ0S9M>, May 12, 2014, 3 pages.
Smith, Jake, "Amazon Alexa Calling: How to Set it up and Use it on Your Echo", iGeneration, May 30, 2017, 5 pages.
Speicher et al., "What is Mixed Reality?", In Proceedings of the 2019 CHI Conference on Human Factors in Computing Systems (CHI '19). ACM, Article 537, Glasgow, Scotland, UK, online available at: https://dl.acm.org/doi/pdf/10.1145/3290605.3300767, May 4-9, 2019, 15 pages.
Sperber et al., "Selg-Attentional Models for Latice Inputs", in Proceedings of the 57th Annaul Meetings of the Association for Computational Linguistics, Florence, Italy, Association for Computational Linguistics, Jun. 4, 2019, 13 pages.
Sundermayer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://serachenterpriseai.techtarget.com/definition/AI-accelerator, Apr. 2018, 3 pages.
Tech With Brett, "Everything the Google Next Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). }See communication under 37 CFR § 1.98(a) (3)}.
Vaswani et al., "Attention Is All You Need", 31st Conference on Neural Information Processing Systems (NIPS 2017), 2017, pp. 1-11.
Vazquez et al., "An Assisted Phtography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automative Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang et al., "Tacotron: Towards End-to-End Speech Synthesis", Available online at: https://arxiv.org/abs/1703.10135. Apr. 6, 2017, 10 pages.
Wang et al., "Training Deep Neural Networks with 8-bit Floating Point Numbers", 32nd Conference on Neural Information Processing Systems (Neurl PS 2018), 2018, 10 pages,.
Weng et al., "Deep Neural Networks for Single-Channel Multi-Talker Speech Recognition", IEEE/ACM Transactions on Audio, Speech, And Language Processing, vol. 23, No. 10, Oct. 2015, pp. 1670-1679.
"What's on Spotify?", Music for everyone, Online Available at: <https://web.archive.org/web/20160428115328/https://www.spotify.com/US/>, Apr. 28, 2016, 6 pages.
White et al., "Task completion detection: A Study in the Context of Intelligent Systems", Proceedings of the 42nd International ACM

(56) References Cited

OTHER PUBLICATIONS

SIGIR Conference on Research and Development in Information Retrieval, Jul. 21-25, 2019, pp. 405-414.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at: <https://en.wikipedia.org/w/index.php?title=Siri&oldid=689697795>, Nov. 8, 2015, 13 pages.
Wikipedia, "Virtual Assistant", Wikipedia, Online Available at: <https://en.wikipedia.org/w/index.php?title=Virtual assistant&oldid=679330666> Sep. 3, 2015, 4 pages.
Win et al., "Myanmar Text to Speech System based on Tacotron-2", International Conference on Information and Communication Tehchology Convergence (ICTC), Oct. 21-23, 2020, pp. 578-583.
"Working with the Dragon Bar", Nuance Communications Inc., Jun. 27, 2016, 2 pages.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yang, Astor, "Control Android TV via Mobile Phone APP RKRemoteControl", Online Available at: <https://www.youtube.com/watch?v=zpmUeOX_xro>, Mar. 31, 2015, 4 pages.
Yates, Michael C., "How can i Exit Google Assistant After I'm Finished with it", Online available at: <https://productforums.google.com/forum/#msg/phone-by-google/faECnR2RJwA/gKNtOkQgAQAJ>, Jan. 11, 2016, 2 pages.
Yah et al., "Dialog Modeling in Audiobook Synthesis", Retrieved on Sep. 27, 2023, 6 pages.
Yah, Jui-Feng, "Speech Act Identification Using Semantic Dependency Graphs with Probabilistic Context-free Grammers", ACM Transactions on Asian and Low-Resource Language Information Processing, vol. 15, No. 1, Dec. 2015, pp. 5.1-5.28.
Yousef, Aulfikar A., "Braina (A.I) Artificial Intelligence Virtual Personal Assisant", Online available at: <https://www.youtube.com/watch?v=2h6xpB8bPSA>, Feb. 7, 2017, 3 pages.
Yu et al., "Permutation Invariant Training of Deep Models for Speaker-Independent Multi-talker Speech Seperation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., "Interaction Proxies for Runtime Repair and Enhancement of Mobile Application Accessibility", In Proceedings of the 2017 CHI Conference on Human Factors in Comptuing Systems (CHI '17). ACM, Denver, CO, USA, online available at: https://dl.acm.org/doi/pdf/10-1145/3025453.3025846, May 6-11, 2017, pp. 6024-6037.
Zhang et al., "Very Deep Convolutional Networks for End-to-End Speech Recognition", IEEE International Conference on Acoustics, Speech, and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CuuSee: Exploring Visual Cues for People with Low Vision to Facilitate a Visual Search Task", In Proceedings of the 2016 ACM International Joint Conference on Pervasive and Ubiquitous Computing, ACM, UbiComp '16, Heidelberg, Germany, online available at: https://dl.acm.org/doi/pdf/10.1145/2971648.2971730, Sep. 12-16, 2016, pp.. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19), ACM, Article 111, Glasgow, Scotland, UK, online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zhang et al., "A Fiber-Optic Sensor for Acoustic Emission Detection in a High Voltage Cable System", Online Available at: https://www.mdpi.com/1424-8220/Dec. 16, 2026, Nov. 30, 2016, 11 pages.
Zhang et al., "IEHouse: A Non-Intrusive Household Appliance State Recognition System", IEEE Smart World, Ubiquitous Intelligence & Computing, Advanced & Trusted Computed, 2017, 8 pages.
Zhang et al., "Voicemoji: Emoji Entry Using Voice for Visually Impaired People", CHI '21, May 8-13, 2021, 18 pages.
Zheng et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.
Zhou et al., "Using Paralinguistic Information to Disambiguate User Intentions for Distinguishing Phrase Structure and Sarcasm in Spoken Dialog Systems", IEEE Spoken Language Technology Workshop (SLT), Jan. 19, 2021, pp. 1020-1027.
Zmolikova et al., "Speaker-Aware Neural Network Based Beamformer for Speaker Extraction in Speech Mixtures", Interspeech 2017, Aug. 20-24, 2017, pp. 2655-2659.
Chenghao, Yuan, "MacroDroid", Online available at: https://www.ifanr.com/weizhizao/612531, Jan. 25, 2016, 7 pages.
Choi et al., "Evaluation of Frequency Warping Based Features and Spectro-Temporal Features for Speaker Recognition", Speech Sounds and Phonetic Science, Online Available at: http://koreascience.or.kr/article/JAKO2015105343238 34.page, vol. 7, No. 1, Mar. 31, 2015, pp. 3-10.
Hanqing et al., "Deep Learning of Instruction Intention Understanding Using Stacked Denoising Autoencoder", Journal of Shanghai Jiaotong University, vol. 50, No. 7, Jul. 28, 2016, 6 pages.
"How to adjust the order of control center buttons on iPhone iOS12 version after buying a mobile phone", Available online at: https://jingyan.baidu.com/article/5bbb5albbe5a9 713eba1791b.html? Jun. 14, 2019, 4 pages.
"iPhone 6 Smart Guide Full Version for SoftBank", Gijutsu-Hyohron Co. Ltd., vol. 1, Dec. 1, 2014, 4 pages.
Jun, Yu, Research on 3D visual speech expression and emotional simulation, China Excellence Master's Theses Full-text Database Information Technology Edition, No. 3, Mar. 15, 2018, 78 pages.
Simonite, Tom, "Confronting Siri: Microsoft Launches Digital Assistant Cortana", 2014, 2 pages.
"Use Macrodroid skillfully to automatically clock in with Ding Talk", Online available at: https://blog.csdn.net/qq_26614295/article/details/8430 4541, Nov. 20, 2018, 11 pages.
Zhao et al., "Big Data Analysis and Application", Aviation Industry Press, Dec. 2015, pp. 236-241.
Office Action received for Chinese Patent Application No. 201880000763.2, mailed on Jul. 30, 2025, 13 pages (2 pages of English Translation and 11 pages of Official Copy).

* cited by examiner

INTELLIGENT AUTOMATED ASSISTANT FOR MEDIA EXPLORATION

This application is a continuation of U.S. patent application Ser. No. 18/138,234, entitled "INTELLIGENT AUTOMATED ASSISTANT FOR MEDIA EXPLORATION," filed on Apr. 24, 2023, which is a continuation of U.S. patent application Ser. No. 17/162,448, now U.S. Pat. No. 11,675,829, entitled "INTELLIGENT AUTOMATED ASSISTANT FOR MEDIA EXPLORATION," filed on Jan. 29, 2021, which is a continuation of U.S. patent application Ser. No. 16/290,737, now U.S. Pat. No. 10,909,171, entitled "INTELLIGENT AUTOMATED ASSISTANT FOR MEDIA EXPLORATION," filed on Mar. 1, 2019, which is a continuation of U.S. patent application Ser. No. 15/940,203, entitled "INTELLIGENT AUTOMATED ASSISTANT FOR MEDIA EXPLORATION," filed on Mar. 29, 2018, which claims priority to U.S. provisional patent application No. 62/506,981, entitled "INTELLIGENT AUTOMATED ASSISTANT FOR MEDIA EXPLORATION," filed on May 16, 2017, to Danish patent application PA201770425, entitled "INTELLIGENT AUTOMATED ASSISTANT FOR MEDIA EXPLORATION," filed on Jun. 1, 2017, and to Danish patent application PA201770426, entitled "INTELLIGENT AUTOMATED ASSISTANT FOR MEDIA EXPLORATION," filed on Jun. 1, 2017. The contents of each of these applications are hereby incorporated by reference in their entireties.

FIELD

This relates generally to intelligent automated assistants and, more specifically, to providing an auditory-based interface of a digital assistant for media exploration.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In most cases, users rely, at least in part, on conventional, graphical user interfaces to interact with an electronic device. In some instances, however, a digital assistant may be implemented on an electronic device with limited or no display capabilities.

SUMMARY

Example methods are disclosed herein. An example method includes, at an electronic device having one or more processors and memory, receiving a first natural-language speech input indicative of a request for media, where the first natural-language speech input comprises a first search parameter; providing, by the digital assistant, a first media item, where the first media item is identified based on the first search parameter; while providing the first media item, receiving a second natural-language speech input; determining whether the second natural-language speech input corresponds to a user intent of refining the request for media. The method further includes, in accordance with a determination that the second natural-language speech input corresponds to a user intent of refining the request for media: identifying, based on the first parameter and the second natural-language speech input, a second media item different from the first media item; and providing, by the digital assistant, the second media item.

An example method includes, at an electronic device having one or more processors and memory, receiving a natural-language speech input; identifying, by the digital assistant, a task based on the natural-language speech input; providing, by the digital assistant, a speech output indicative of a verbal response associated with the identified task; and while providing the speech output indicative of a verbal response: providing, by the digital assistant, playback of a media item corresponding to the verbal response.

An example method includes, at an electronic device having one or more processors and memory, receiving a speech input indicative of a request for media; in response to receiving the speech input, providing, by the digital assistant, an audio output indicative of a suggestion of a first media item; determining, by the digital assistant, whether a number of consecutive non-affirmative responses corresponding to the request for media satisfies a threshold. The method further includes, in accordance with a determination that the number of consecutive non-affirmative responses does not satisfy the threshold: providing, by the digital assistant, an audio output indicative of a suggestion of a second media item different from the first media item. The method further includes, in accordance with a determination that the number of consecutive non-affirmative responses satisfies the threshold: foregoing providing an audio output indicative of a suggestion of a second media item; and providing, by the digital assistant, an audio output indicative of a request for user input.

An example method includes, at an electronic device having one or more processors and memory, receiving a speech input indicative of a request for media; detecting, by the digital assistant, physical presence of a plurality of users to the electronic device; in response to detecting the physical presence of the plurality of users, obtaining a plurality of preference profiles corresponding to the plurality of users; providing, by the digital assistant, a merged preference profile based on the plurality of preference profiles; identifying, by the digital assistant, a media item based on the merged preference profile; and providing, by the digital assistant, an audio output including the identified media item.

Example non-transitory computer-readable media are disclosed herein. An example non-transitory computer-readable storage medium stores one or more programs. The one or more programs comprise instructions, which when executed by one or more processors of an electronic device, cause the electronic device to receive a first natural-language speech input indicative of a request for media, where the first natural-language speech input comprises a first search parameter; provide, by a digital assistant, a first media item, where the first media item is identified based on the first search parameter; while providing the first media item, receive a second natural-language speech input; determine whether the second natural-language speech input corresponds to a user intent of refining the request for media. The instructions can further cause the electronic device to, in accordance with a determination that the second natural-language speech input corresponds to a user intent of refining the request for media: identify, based on the first parameter and the second natural-language speech input, a second media item different from the first media item; and provide, by the digital assistant, the second media item.

An example non-transitory computer-readable storage medium stores one or more programs. The one or more programs comprise instructions, which when executed by one or more processors of an electronic device, cause the electronic device to receive a natural-language speech input; identify, by a digital assistant, a task based on the natural-language speech input; provide, by the digital assistant, a speech output indicative of a verbal response associated with the identified task; while providing the speech output indicative of a verbal response: provide, by the digital assistant, playback of a media item corresponding to the verbal response.

An example non-transitory computer-readable storage medium stores one or more programs. The one or more programs comprise instructions, which when executed by one or more processors of an electronic device, cause the electronic device to receive a speech input indicative of a request for media; in response to receiving the speech input, provide, by a digital assistant, an audio output indicative of a suggestion of a first media item; determine, by the digital assistant, whether a number of consecutive non-affirmative responses corresponding to the request for media satisfies a threshold. The instructions can further cause the electronic device to, in accordance with a determination that the number of consecutive non-affirmative responses does not satisfy the threshold: provide, by the digital assistant, an audio output indicative of a suggestion of a second media item different from the first media item. The instructions can further cause the electronic device to, in accordance with a determination that the number of consecutive non-affirmative responses satisfies the threshold: forego providing an audio output indicative of a suggestion of a second media item; and provide, by the digital assistant, an audio output indicative of a request for user input.

An example non-transitory computer-readable storage medium stores one or more programs. The one or more programs comprise instructions, which when executed by one or more processors of an electronic device, cause the electronic device to receive a speech input indicative of a request for media; detect, by a digital assistant, physical presence of a plurality of users to the electronic device; in response to detecting the physical presence of the plurality of users, obtain a plurality of preference profiles corresponding to the plurality of users; provide, by the digital assistant, a merged preference profile based on the plurality of preference profiles; identify, by the digital assistant, a media item based on the merged preference profile; and provide, by the digital assistant, an audio output including the identified media item.

Example electronic devices are disclosed herein. An example electronic device comprises one or more processors; a memory; and one or more programs, where the one or more programs are stored in the memory and configured to be executed by the one or more processors, the one or more programs including instructions for receiving a first natural-language speech input indicative of a request for media, where the first natural-language speech input comprises a first search parameter; providing, by a digital assistant, a first media item, where the first media item is identified based on the first search parameter; while providing the first media item, receiving a second natural-language speech input; determining whether the second natural-language speech input corresponds to a user intent of refining the request for media. The one or more programs further include instructions for, in accordance with a determination that the second natural-language speech input corresponds to a user intent of refining the request for media: identifying, based on the first parameter and the second natural-language speech input, a second media item different from the first media item; and providing, by the digital assistant, the second media item.

An example electronic device comprises one or more processors; a memory; and one or more programs, where the one or more programs are stored in the memory and configured to be executed by the one or more processors, the one or more programs including instructions for receiving a natural-language speech input; identifying, by a digital assistant, a task based on the natural-language speech input; providing, by the digital assistant, a speech output indicative of a verbal response associated with the identified task; while providing the speech output indicative of a verbal response: providing, by the digital assistant, playback of a media item corresponding to the verbal response.

An example electronic device comprises one or more processors; a memory; and one or more programs, where the one or more programs are stored in the memory and configured to be executed by the one or more processors, the one or more programs including instructions for receiving a speech input indicative of a request for media; in response to receiving the speech input, providing, by a digital assistant, an audio output indicative of a suggestion of a first media item; determining, by the digital assistant, whether a number of consecutive non-affirmative responses corresponding to the request for media satisfies a threshold. The one or more programs further include instructions for, in accordance with a determination that the number of consecutive non-affirmative responses does not satisfy the threshold: providing, by the digital assistant, an audio output indicative of a suggestion of a second media item different from the first media item. The one or more programs further include instructions for, in accordance with a determination that the number of consecutive non-affirmative responses satisfies the threshold: foregoing providing an audio output indicative of a suggestion of a second media item; and providing, by the digital assistant, an audio output indicative of a request for user input.

An example electronic device comprises one or more processors; a memory; and one or more programs, where the one or more programs are stored in the memory and configured to be executed by the one or more processors, the one or more programs including instructions for receiving a speech input indicative of a request for media; detecting, by a digital assistant, physical presence of a plurality of users to the electronic device; in response to detecting the physical presence of the plurality of users, obtaining a plurality of preference profiles corresponding to the plurality of users; providing, by the digital assistant, a merged preference profile based on the plurality of preference profiles; identifying, by the digital assistant, a media item based on the merged preference profile; and providing, by the digital assistant, an audio output including the identified media item An example electronic device comprises means for receiving a first natural-language speech input indicative of a request for media, where the first natural-language speech input comprises a first search parameter; means for providing, by a digital assistant, a first media item, where the first media item is identified based on the first search parameter; means for, while providing the first media item, receiving a second natural-language speech input; means for determining whether the second natural-language speech input corresponds to a user intent of refining the request for media;

means for, in accordance with a determination that the second natural-language speech input corresponds to a user intent of refining the request for media: identifying, based on the first parameter and the second natural-language speech input, a second media item different from the first media item; and providing, by the digital assistant, the second media item.

An example electronic device comprises means for receiving a natural-language speech input; means for identifying, by a digital assistant, a task based on the natural-language speech input; means for providing, by the digital assistant, a speech output indicative of a verbal response associated with the identified task; means for, while providing the speech output indicative of a verbal response: providing, by the digital assistant, playback of a media item corresponding to the verbal response.

An example electronic device comprises means for receiving a speech input indicative of a request for media; means for, in response to receiving the speech input, providing, by a digital assistant, an audio output indicative of a suggestion of a first media item; means for determining, by the digital assistant, whether a number of consecutive non-affirmative responses corresponding to the request for media satisfies a threshold; means for, in accordance with a determination that the number of consecutive non-affirmative responses does not satisfy the threshold: providing, by the digital assistant, an audio output indicative of a suggestion of a second media item different from the first media item; means for, in accordance with a determination that the number of consecutive non-affirmative responses satisfies the threshold: foregoing providing an audio output indicative of a suggestion of a second media item; and providing, by the digital assistant, an audio output indicative of a request for user input.

An example electronic device comprises means for receiving a speech input indicative of a request for media; means for detecting, by a digital assistant, physical presence of a plurality of users to the electronic device; means for, in response to detecting the physical presence of the plurality of users, obtaining a plurality of preference profiles corresponding to the plurality of users; means for providing, by the digital assistant, a merged preference profile based on the plurality of preference profiles; means for identifying, by the digital assistant, a media item based on the merged preference profile; and means for providing, by the digital assistant, an audio output including the identified media item.

Receiving a natural-language speech input while providing a media item allows the user to easily steer a media search to obtain desirable content. The digital assistant allows the user to refine a media request at any time, without having to stop a current playback or having to wait for a prompt by the digital assistant. As such, the digital assistant provides the user with full and flexible control over the media search process. Further, receiving a natural-language speech input while providing a media item provides natural, intuitive, and human-like interactions between the digital assistant and the user, as the digital assistant allows the user to barge into a conversation and steer the conversation at any given time. Providing flexible and intuitive control of the media search process enhances the operability of the device and makes the interactions with the digital assistant more efficient (e.g., by understanding the user intent and giving user full control) which, additionally, reduces power usage and improves battery life of the device by enabling the user to use the device more quickly and efficiently.

Determining whether the natural-language speech input corresponds to a user intent of refining a media request and identifying a media item accordingly allows the user to quickly obtain desirable content with a relatively small number of inputs. The technique reduces the number of user inputs because, for instance, the user does not need to repeatedly provide previously specified parameters when refining the media request. The technique also provides natural and intuitive interactions between the digital assistant and the user because, for example, the user is able to receive recommendations that are increasingly tailored and, via a series of decisions, narrowed down to desirable content. Reducing the number of user inputs and providing an intuitive user interface enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Providing a speech output indicative of a verbal response to a user request while also providing playback of a related media item provides a rich and intuitive auditory interface of the digital assistant. The playback of the media item (e.g., related sound effects, representative samples of content) helps the user quickly understand the content being presented and make more informed decisions without prolonging the duration of the audio output. Further, enabling the user to make more informed decisions reduces the number of user inputs. Providing a rich and intuitive auditory interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Determining whether a number of consecutive non-affirmative responses to recommendations satisfies a threshold and, if not, providing another recommendation allow the digital assistant to quickly and intuitively present options to a user. The technique reduces the number of user inputs, as the user does not need to repeatedly request new recommendations. Reducing the number of user inputs to obtain recommendations enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Determining whether a number of consecutive non-affirmative responses satisfies a threshold and, if so, requesting user inputs allow the digital assistant to quickly identify desirable content for a user. The technique reduces the number of user inputs, as the user does not need to repeatedly reject undesirable recommendations, stop the digital assistant from providing undesirable recommendations, and/or start a new search. This technique also provides natural and intuitive interactions between the digital assistant and the user, as the digital assistant automatically prompts for information when appropriate without a user command. Reducing the number of user inputs and providing a natural user interface enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Detecting the physical presence of multiple users and providing a merged preference profile based on the preference profiles of these users allow for quick identification of desirable content for the multiple users. This technique reduces cognitive burden on the multiple users to identify common preferences among them, and reduces the number of inputs needed to specify the common preferences to the digital assistant and/or reject undesirable recommendations. Reducing the number of user inputs and cognitive burden enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

DETAILED DESCRIPTION

Figure 1:
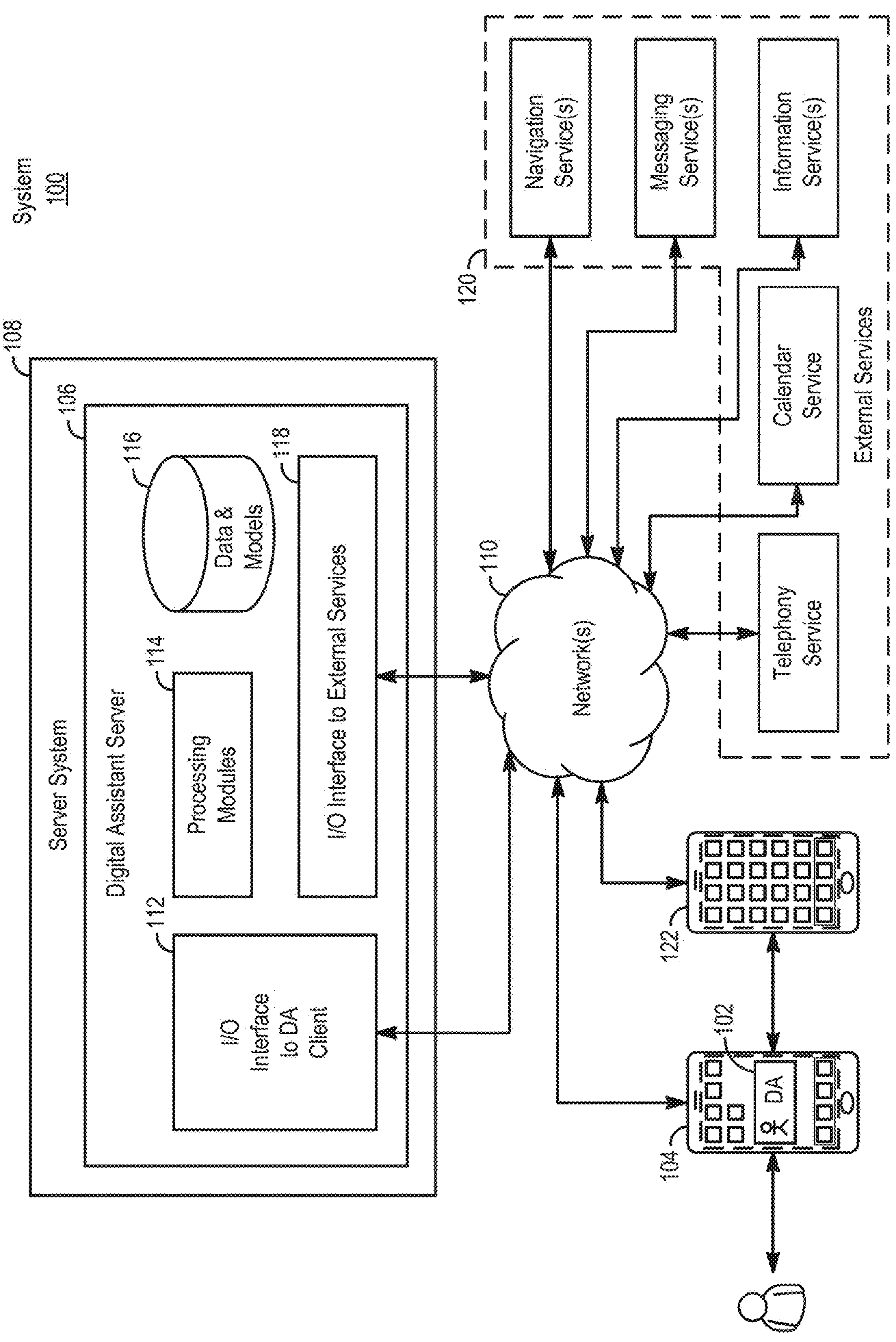
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

As discussed above, a digital assistant may be implemented on an electronic device with limited or no display capabilities. Thus, there is a need for an electronic device (or digital assistant on the electronic device) that provides primarily auditory-based interfaces. Further, there is a need for such primarily auditory-based interfaces to provide natural, intuitive, and rich interactions between the digital assistant and the user. Such techniques can enhance the operability of the device and make the interactions with the digital assistant more efficient (e.g., by helping the user to quickly obtain and understand the content being presented) which, additionally, reduces power usage and improves battery life of the device by enabling the user to use the device more quickly and efficiently.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant,"

"virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B.) A portable multifunctional device is, for example, a mobile telephone that also contains other functions, such as PDA and/or music player functions. Specific examples of portable multifunction devices include the iPhone®, iPod Touch®, and iPad® devices from Apple Inc. of Cupertino, California. Other examples of portable multifunction devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
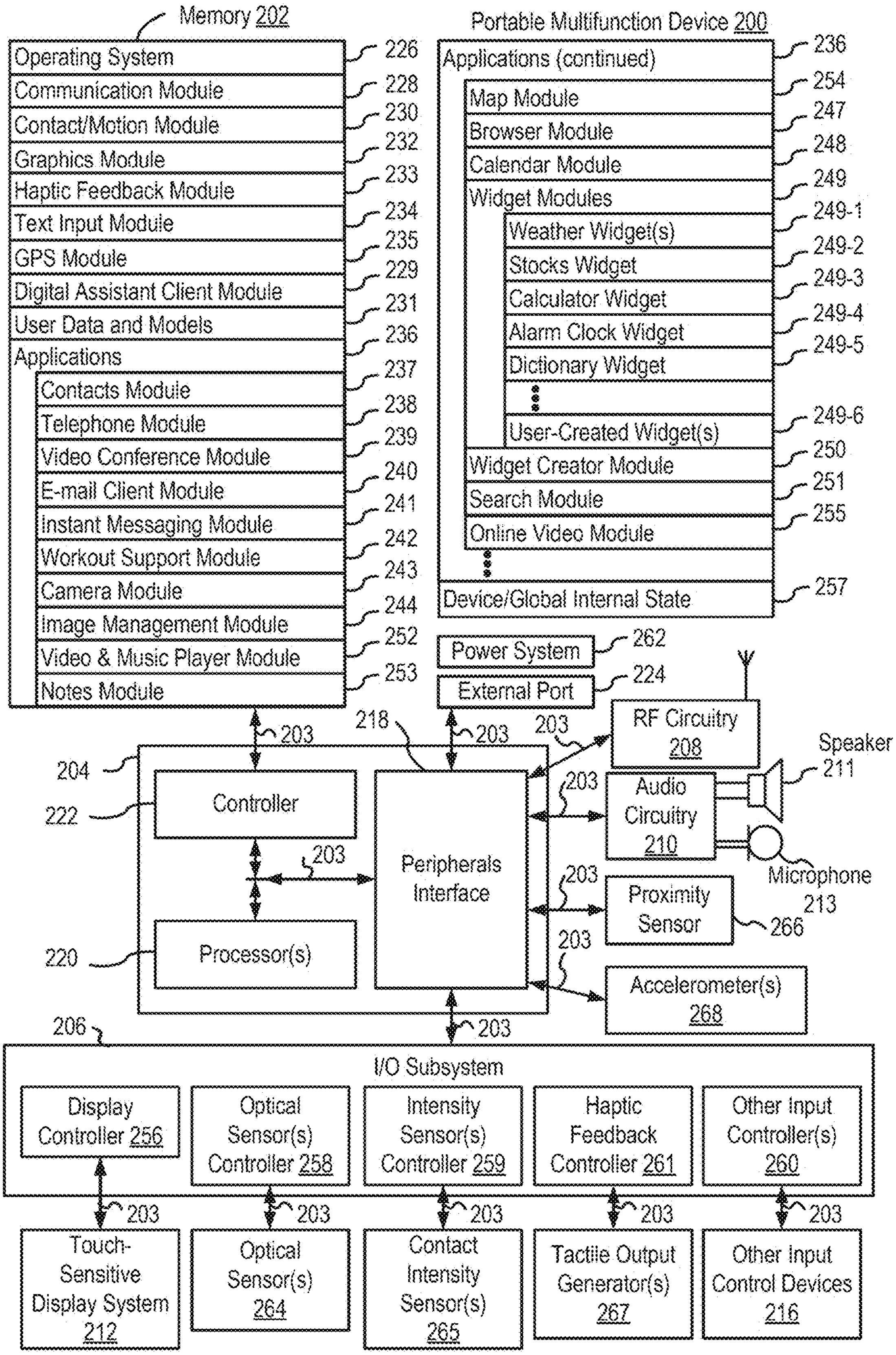
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both cars) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
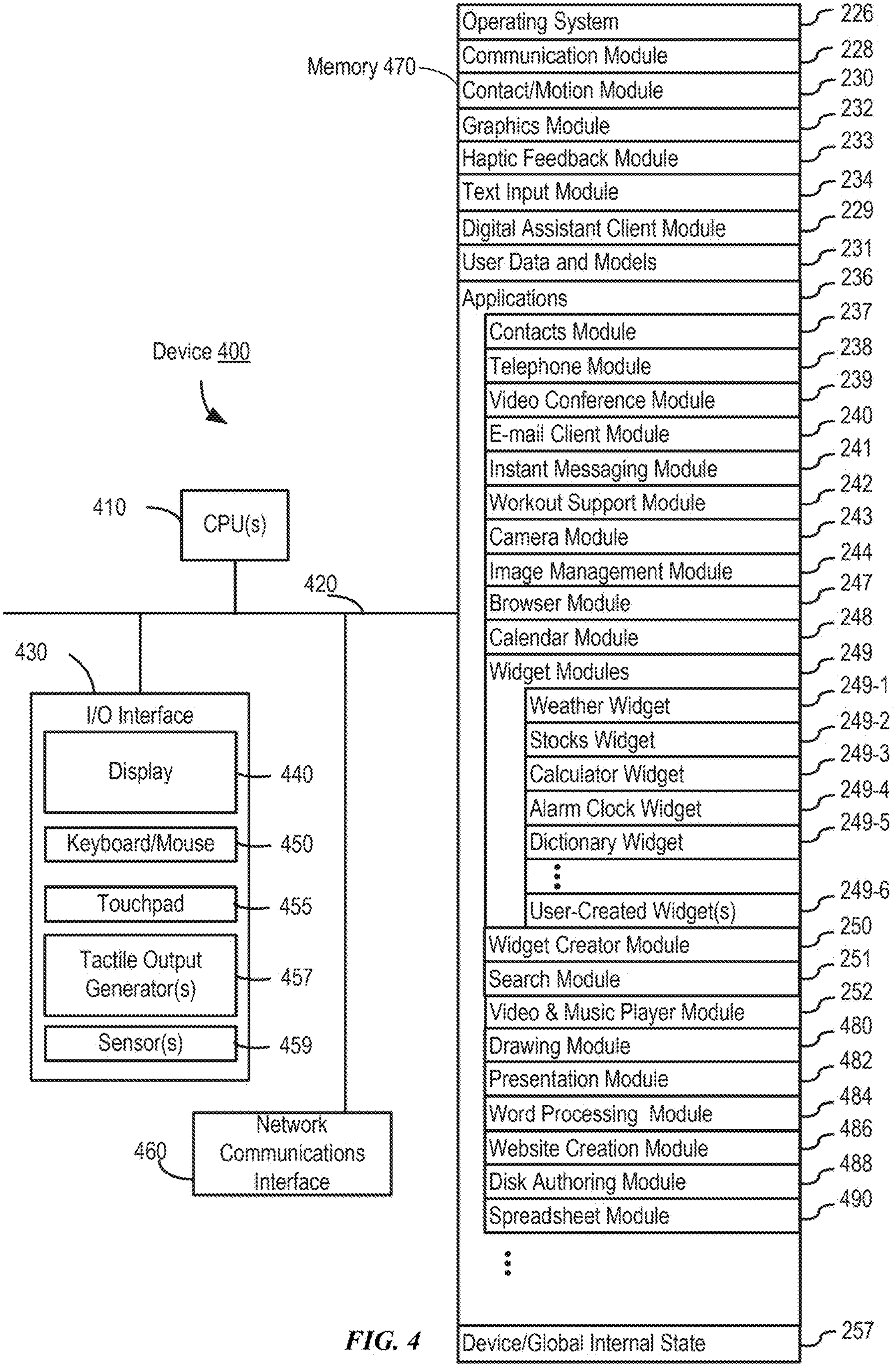
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email client module 240, IM 241, browser 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;

- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
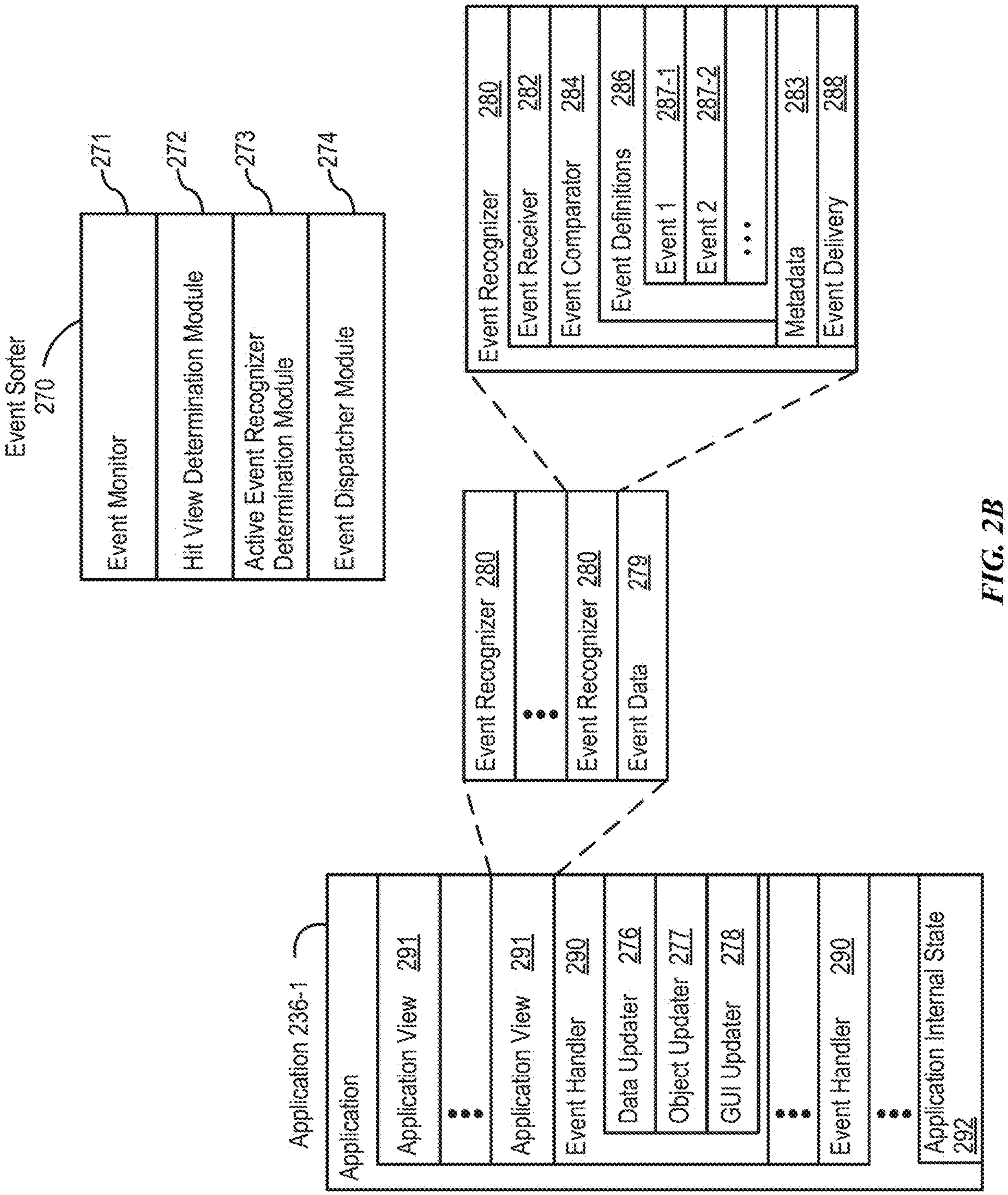
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
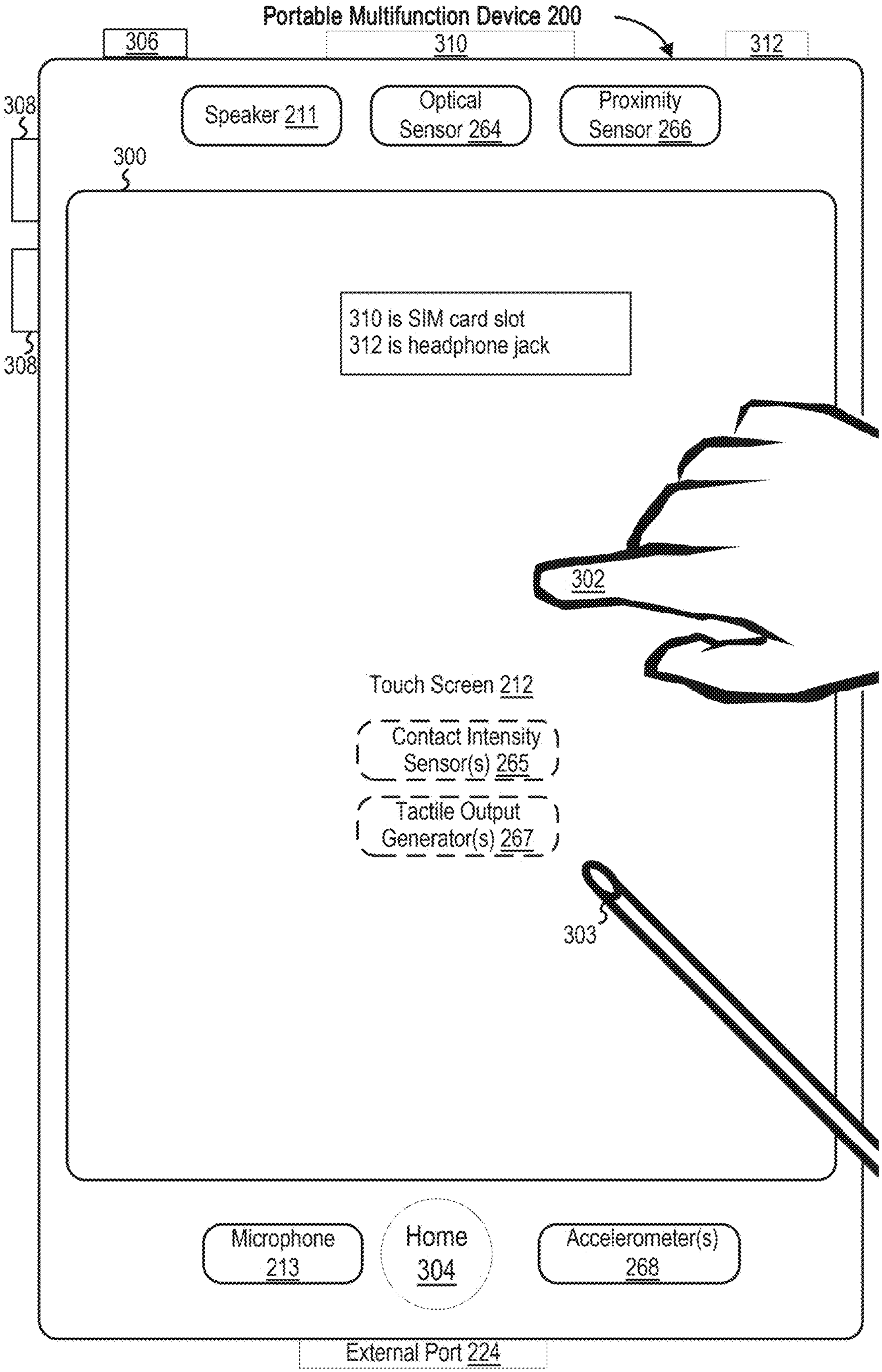
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
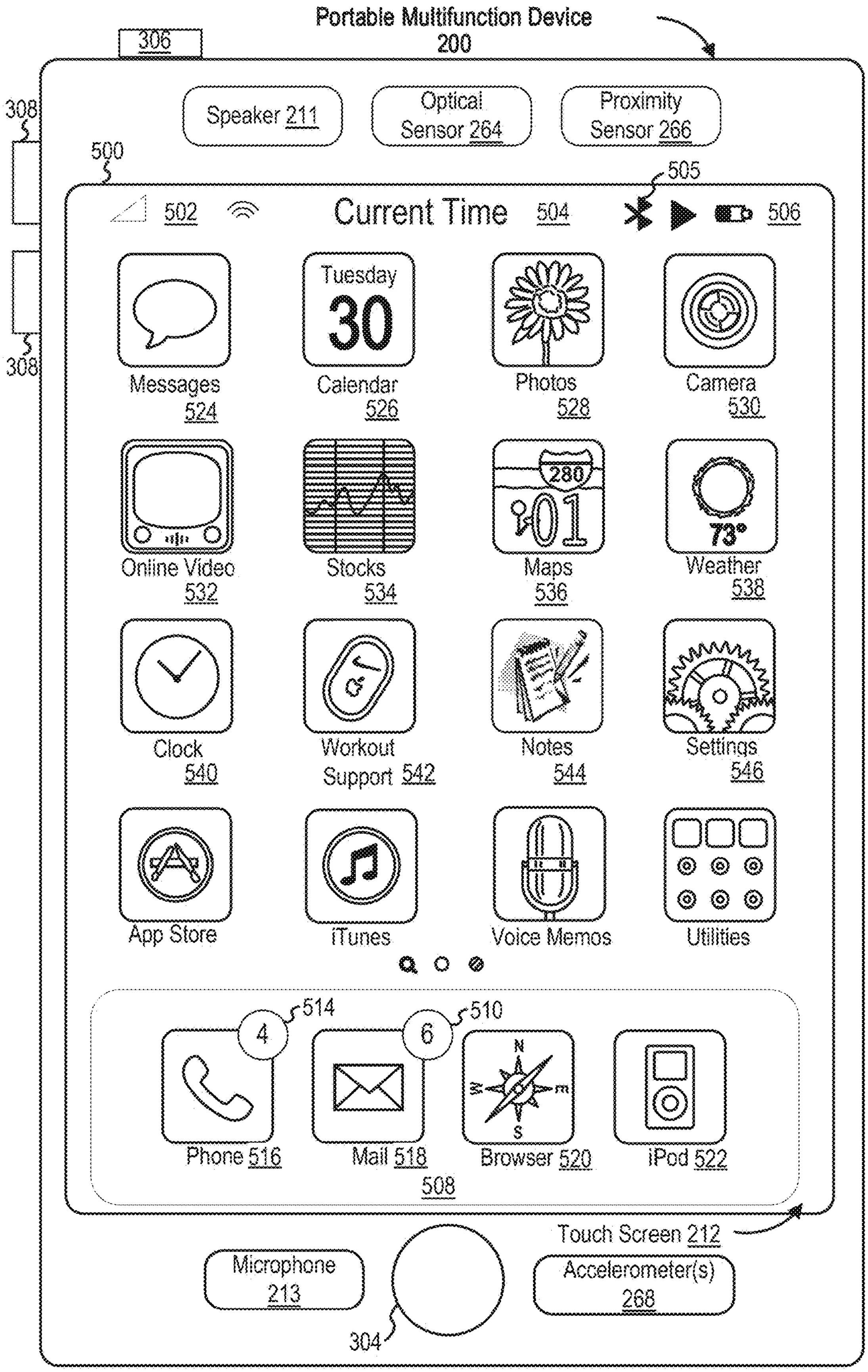
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
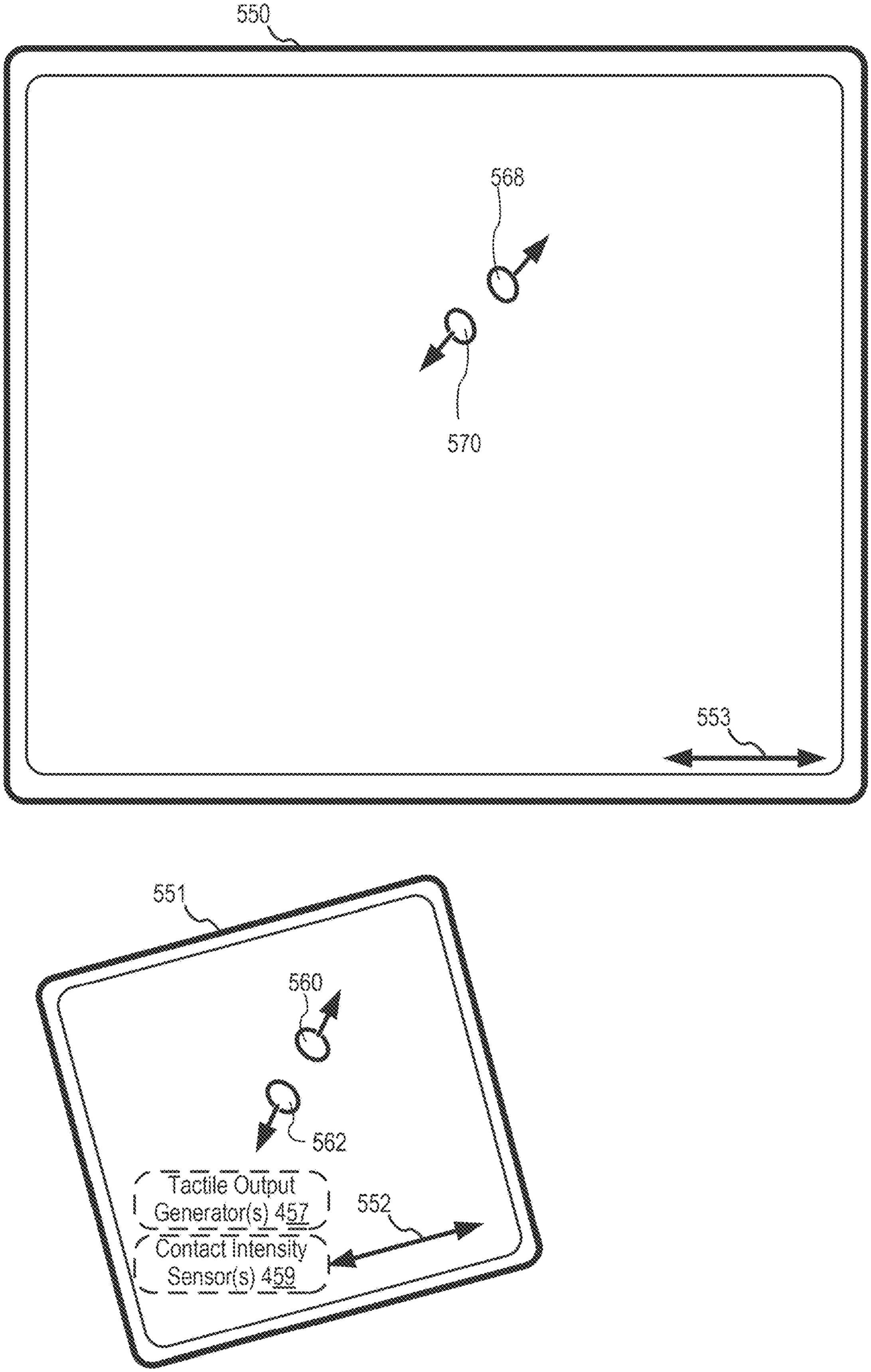
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212

(where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
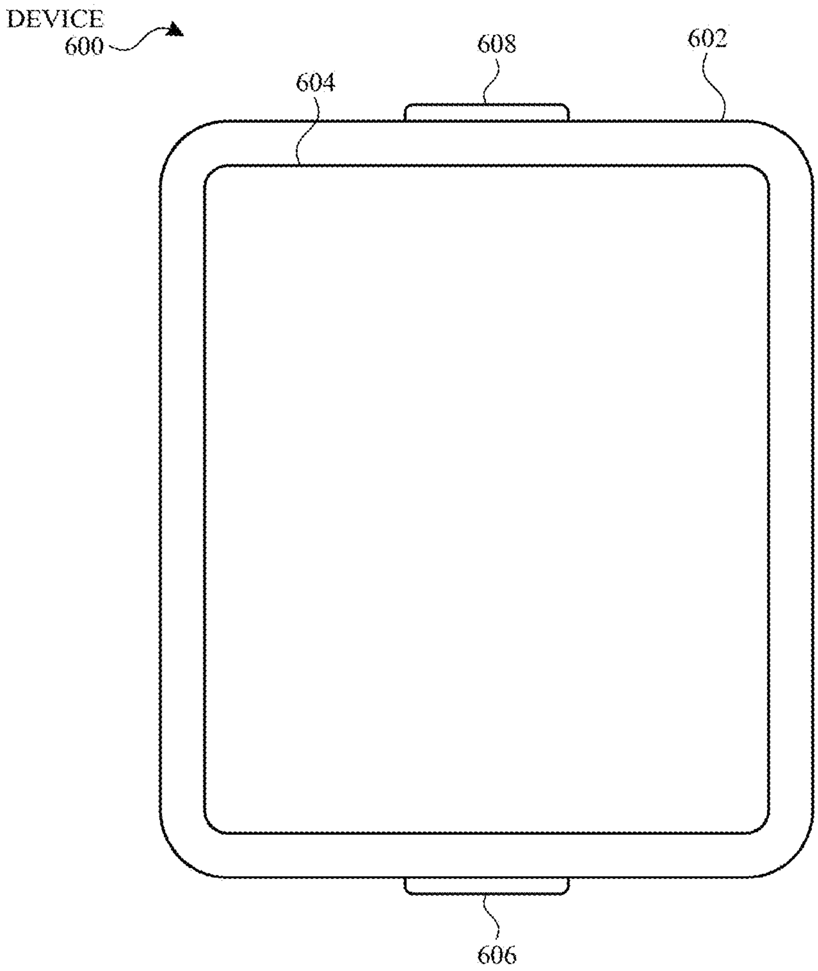
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
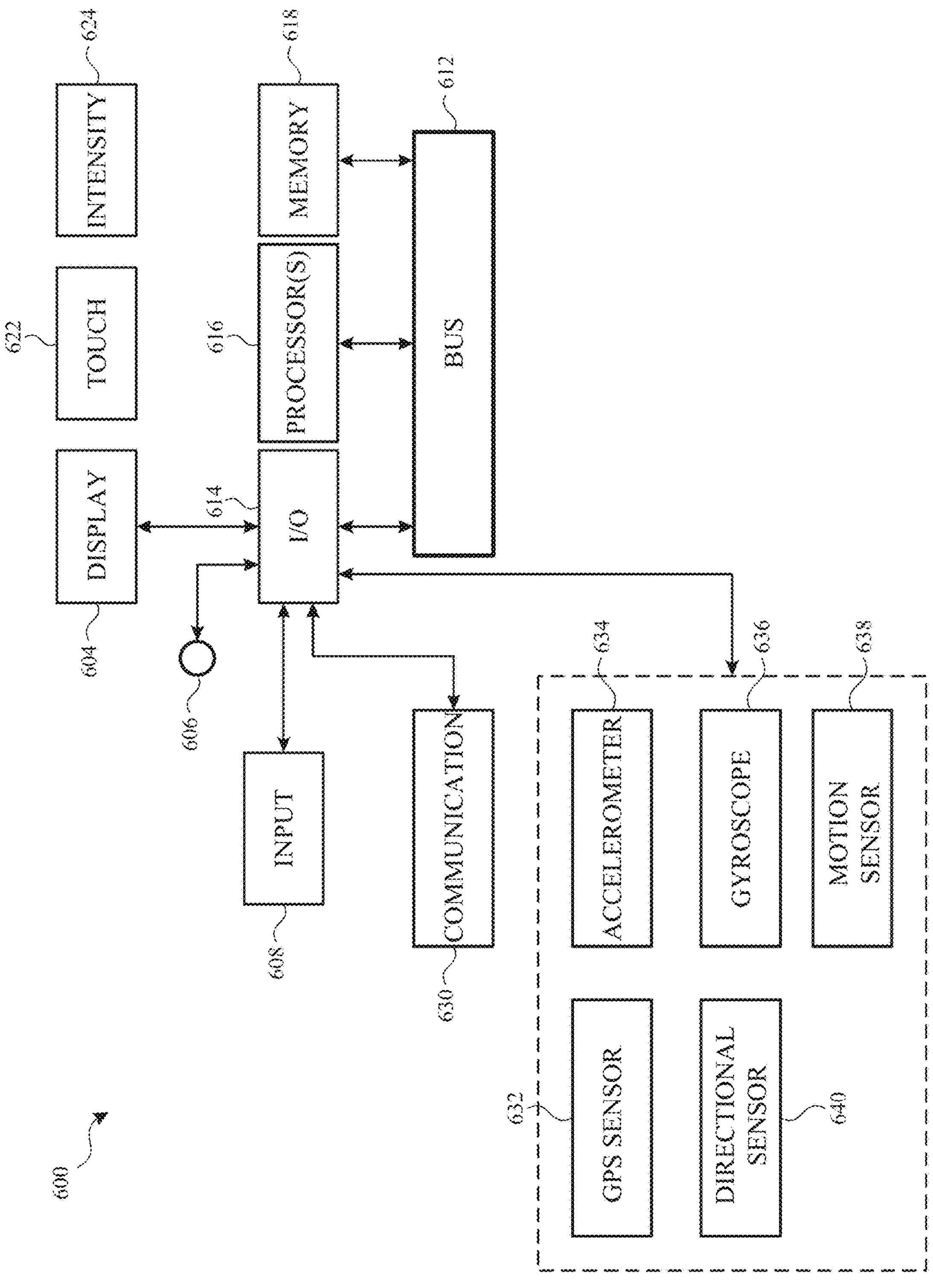
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 800, 900, 1000, and/or 1100 (FIGS. 2A, 4, 6A-6B, 8A-8B, 9A-9B, 10A-10B, and 11). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
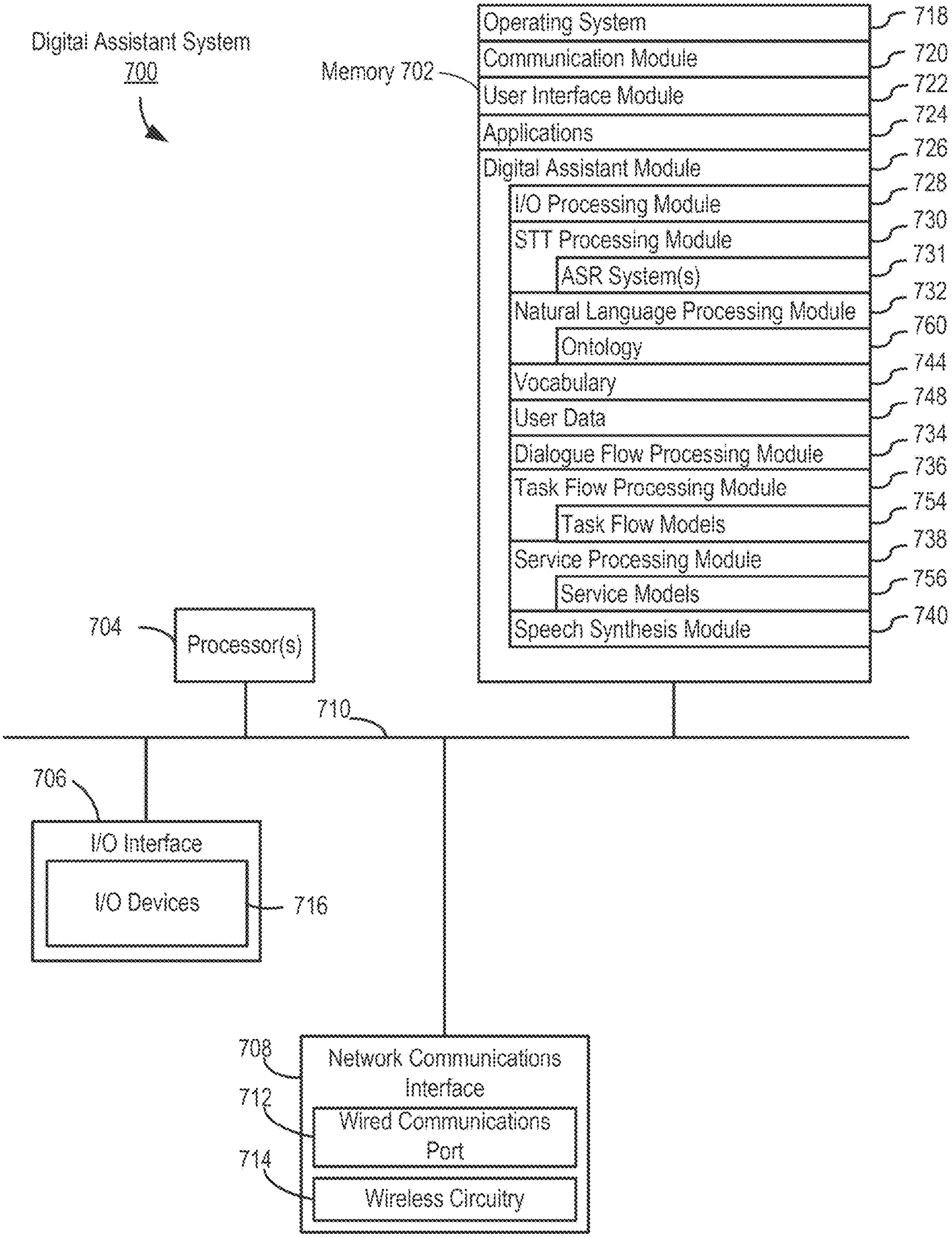
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 800, 900, 1000, or 1100) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 800, 900, 1000, or 1100 in FIGS. 2A, 4, 6A-6B, 8A-8B, 9A-9B, 10A-10B, and 11, respectively. In some examples, digital assistant system 700 represents the server portion of a digital assistant implementation, and can interact with the user through a client-side portion residing on a user device (e.g., devices 104, 200, 400, 600, 800, 900, 1000, or 1100).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VOIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
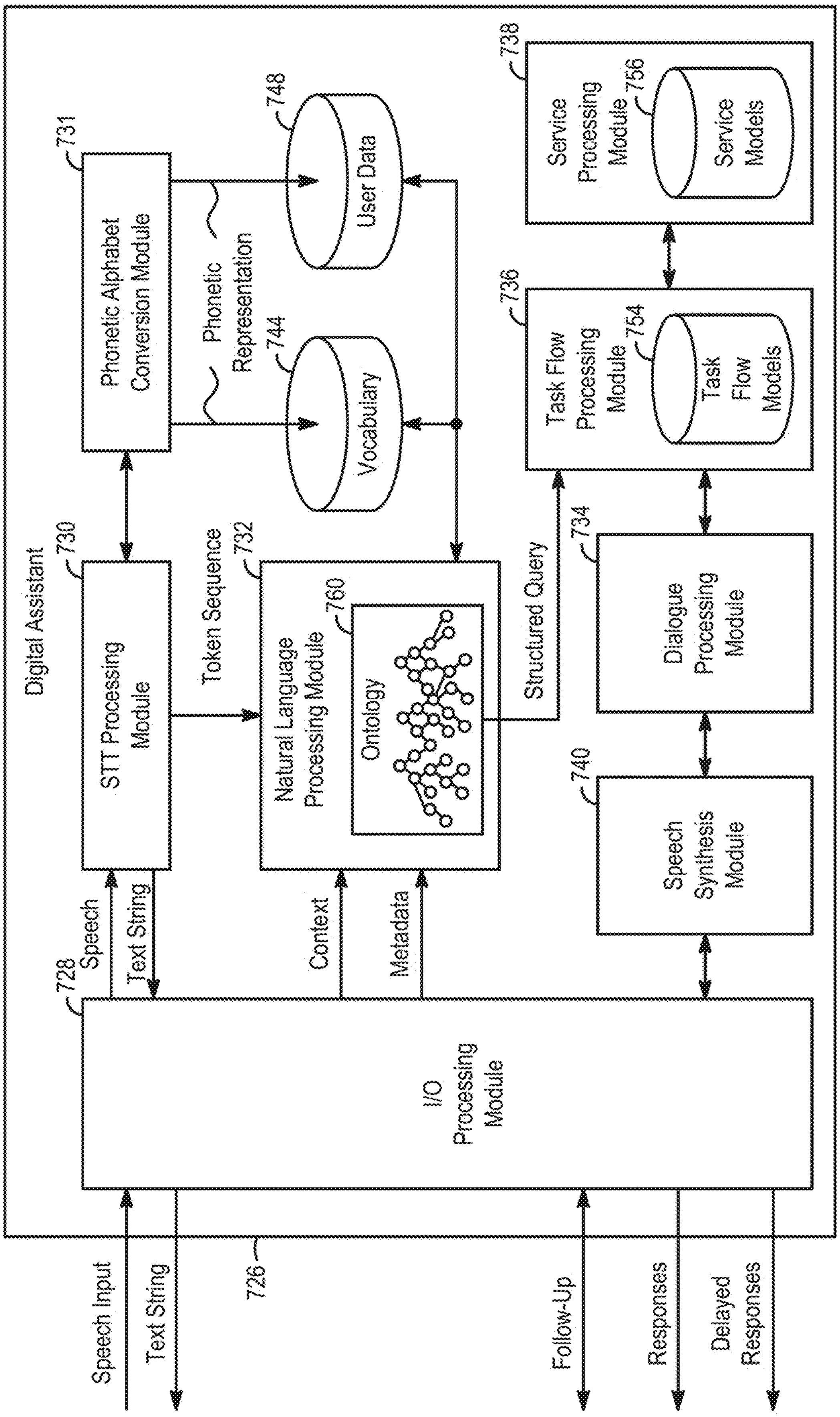
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems. The one or more ASR systems can process the speech input that is received through I/O processing module 728 to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of / /tə'meɪɾoʊ/ / and / /tə'mɑtoʊ/ /. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation / /tə'meɪɾoʊ/ / is ranked higher than / /tə'mɑtoʊ/ /, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation / /tə'meɪɾoʊ/ / is associated with the United States, whereas the candidate pronunciation / /tə'mɑtoʊ/ / is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation / /tə'meɪɾoʊ/ / (associated with the United States) is ranked higher than the candidate pronunciation / /tə'mɑtoʊ/ / (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes / /tə'meɪɾoʊ/ / corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes / /tə'meɪɾoʊ/ / corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
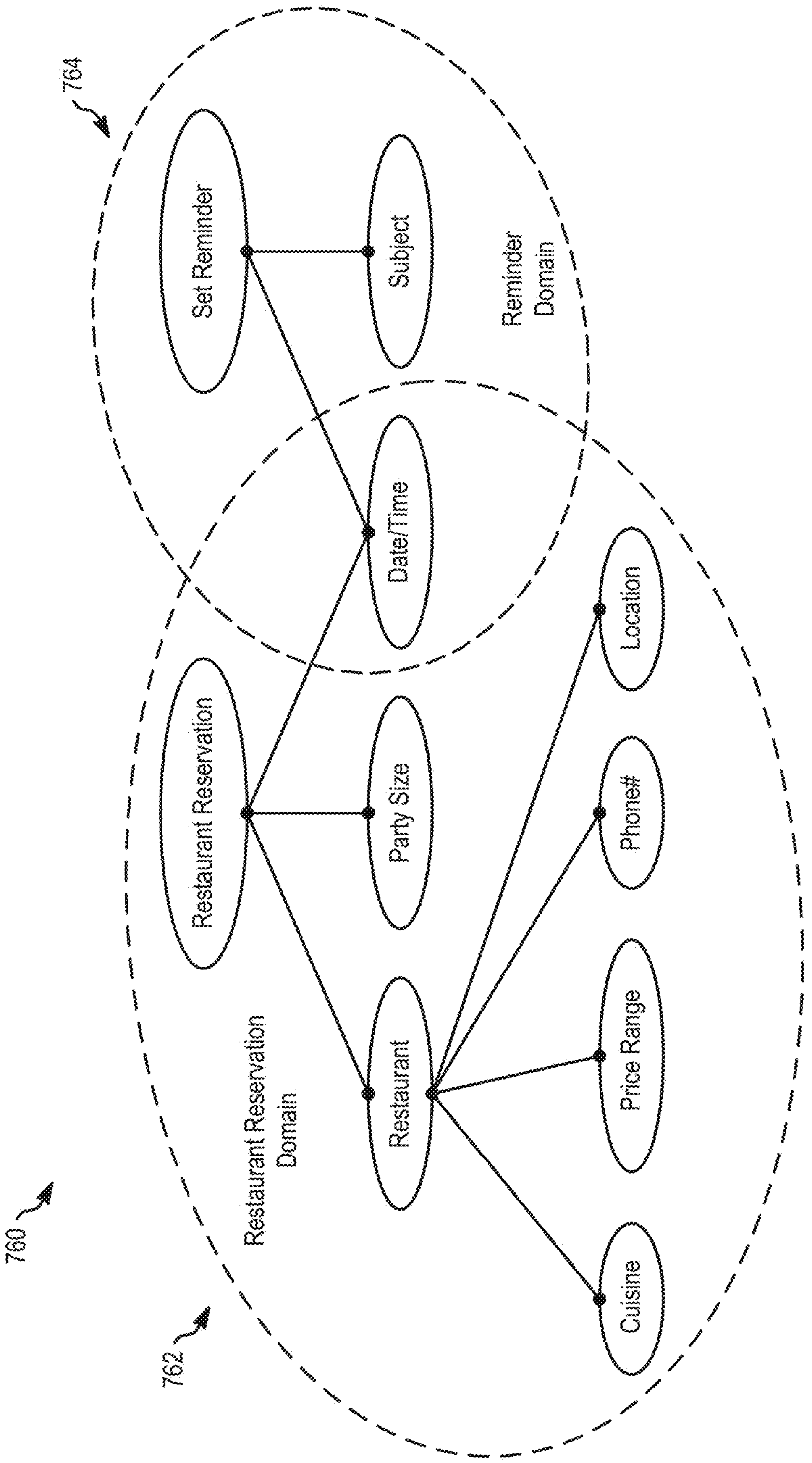
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked concept nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanism are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis module 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Techniques for Providing an Auditory-Based Interface of a Digital Assistant for Media Exploration FIGS. 8A-8B, 9A-9B, 10A-10B, and 11 illustrate exemplary techniques including exemplary user interfaces ("UI") for providing a digital assistant in accordance with some embodiments. These figures are also used to illustrate the processes described below, including the processes 1200, 1300, 1400, and 1500 of FIGS. 12-15, respectively.

Figure 8A:
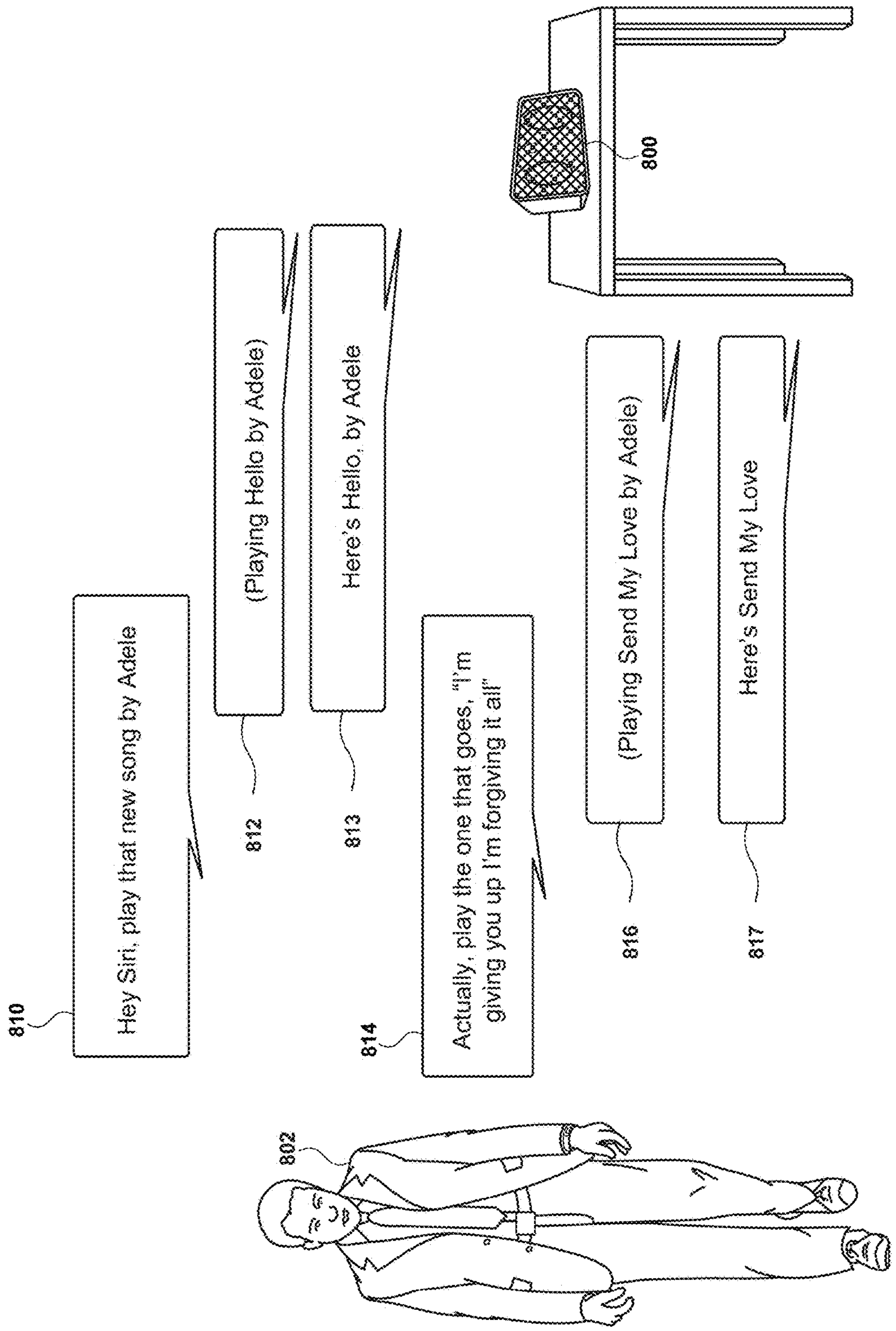
FIGS. 8A-B illustrate exemplary user interfaces of an electronic device in accordance with some embodiments.

FIG. 8A shows electronic device 800. Electronic device 800 may be any of devices 200, 400, and 600 (FIGS. 2A, 4, and 6A-6B) in some embodiments. In the illustrated example, the electronic device 800 is an electronic device with one or more speakers, though it will be appreciated that the electronic device may be a device of any type, such as a phone, laptop computer, desktop computer, tablet, wearable device (e.g., smart watch), set-top box, television, speaker, or any combination or subcombination thereof.

In operation, the electronic device 800 provides for the exchange of natural language speech between a user and an intelligent automated assistant (or digital assistant). In some examples, the exchange is purely auditory. In some examples, the exchange is additionally or alternatively visual (e.g., by way of graphical user interface and/or one or more light indicators) and/or haptic.

In FIG. 8A, the electronic device 800 receives (e.g., via a microphone) a natural-language speech input 810 indicative of a request to the digital assistant of the electronic device 800. The natural-language speech input 810 can include any request that can be directed to the digital assistant. In some examples, the natural-language speech input includes a predetermined trigger phrase (e.g., "Hey Siri"). In some examples, the natural-language speech input includes a request for media items (e.g., "play music Rich Rubin produced", "play a rap song", "play something from the 80s", "play something upbeat"). With reference to FIG. 8A, user 802 provides the natural-language speech input 810 that includes a trigger phrase and a request for media items of a particular artist: "Hey Siri, play that new song by Adele."

In some examples, the electronic device 800 processes the natural-language speech input 810 to perform one or more tasks. In some examples, processing the natural-language speech input 810 in this manner includes providing one or more candidate text representations (e.g., text strings) of the natural-language speech input, for instance, using the STT processing module 730. As described, each of the candidate text representations may be associated with a speech recognition confidence score, and the candidate text representations may be ranked accordingly. In other examples, the natural-language input is a textual input (e.g., inputted via a touchpad of the electronic device 800) and is provided as a candidate text representation, where n=1. Textual inputs provided as candidate text representations in this manner may be assigned a maximum speech recognition confidence score, or any other speech recognition confidence score. With reference to FIG. 8A, the digital assistant provides one or more candidate text representations including a candidate text representation "hey Siri, play that new song by Adele".

In some examples, the electronic device 800 provides one or more candidate intents based on the n-best (e.g., highest ranked) candidate text representations, for instance, using the natural language processing module 732. Each of the candidate intents may be associated with an intent confidence score, and the candidate intents may be ranked accordingly. In some examples, multiple candidate intents are identified for each candidate text representation. Further, in some examples, a structured query (partial or complete) with one or more parameters is generated for each candidate intent. With reference to FIG. 8A, the digital assistant of electronic device 800 provides one or more candidate intents including a candidate intent of "obtaining recommendations for media items", which is based on the candidate text representation "hey Siri, play that new song by Adele". Further, the digital assistant of the electronic device 800 determines a structured query with multiple parameters: {obtaining recommendations for media items, artist=Adele, media type=song, time period=new}.

Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as one or more task flows 754.

In some examples, the electronic device 800 performs a candidate task based on the identified parameters to obtain one or more results. For example, based on the structured query, a task flow processing module of the electronic device 800 (e.g., task flow processing module 736) invokes programs, methods, services, APIs, or the like, to obtain one or more results. Results may include, for example, information related to one or more media items including but not limited to a song, an audio book, a podcast, a station, a playlist, or any combination thereof. With reference to FIG. 8A, based on the structured query {obtaining recommendations for media items, artist=Adele, media type=song, time period=new}, the digital assistant performs a media search using search parameters "Adele", "song," and "new", and identifies a song titled "Hello" (hereinafter "first media item").

Thereafter, the electronic device 800 provides the first media item. With reference to FIG. 8A, the digital assistant of the electronic device 800 provides a playback 812 of the song "Hello". As depicted, the digital assistant also provides a natural-language speech output 813 including a description (e.g., verbal description) of the first media item ("Here's Hello, by Adele") while providing the playback of the first media item. The playback of the first media item and the description of the first media item may be provided concurrently in some examples.

In some examples, the electronic device 800 provides a playback of a portion of the first media item in response to the natural-language speech input 810. The portion of the first media item can be a representative sample of the media item (e.g., the chorus, the first verse). In some examples, the digital assistant provides the playback of the portion (e.g., the chorus) while providing a speech output indicative of a description associated with the first media item (e.g., "Here's Hello, by Adele"). If the user provides an affirmative response (e.g., natural-language response) to the speech output (e.g., "Ok play this"), the electronic device 800 provides a playback of the first media item in its entirety (e.g., from the beginning). More details of the mechanism for providing layered audio outputs are provided herein.

In some examples, the electronic device 800 provides a summary and/or a listing of multiple media items identified based on the natural-language speech input 810 (e.g., "You've got a lot from this artist. Here are the first 3 out of 10 songs: Hello, . . . "). In some examples, the electronic device 800 provides one or more suggestions (e.g., "Let me know if you hear something you like or if you would like to hear the next five") before providing the listing. In some examples, the electronic device foregoes providing a suggestion after presenting the suggestion for a predetermined number of times. For example, the electronic device can forego providing the suggestion "let me know if you hear something you like" after having providing it three times with respect to the same media request. Additional description of providing media recommendations is provided in U.S. Patent Application No. 62/399,232, "INTELLIGENT AUTOMATED ASSISTANT," filed Sep. 23, 2016, which is hereby incorporated by reference in its entirety.

The electronic device 800 can receive a natural-language speech input while providing the playback of a media item. With reference to FIG. 8A, while providing the playback of the song "Hello", the electronic device 800 receives a natural-language speech input 814 ("Actually, play the one that goes, 'I'm giving you up I'm forgiving it all'"). In some examples, in response to receiving the natural-language speech input 814, the electronic device adjusts the manner in which the current playback of the first media item is provided (e.g., providing the playback at a lower volume or rate). Additional exemplary description of adjusting audio output is provided in U.S. Patent Application No. 62/399, 232, "INTELLIGENT AUTOMATED ASSISTANT," filed Sep. 23, 2016, which is hereby incorporated by reference in its entirety.

The electronic device 800 processes the natural-language input 814 in a manner consistent with what is described above with respect to the natural-language input 812. Specifically, based on the natural-language input 814, the electronic device 800 provides one or more candidate text representations, one or more candidate intents, and performs a task associated with a highest ranked candidate intent. In the depicted example, one candidate intent corresponding to the natural language speech input 814 ("Actually, play the one that goes, 'I'm giving you up I'm forgiving it all'") is "refining a request for media". In some examples, the candidate intent is one of the m-best candidate intents.

In some examples, the electronic device 800 derives the user intent of refining a request for media based on one or more predefined phrases and natural-language equivalents of the one or more phrases. Exemplary predefined phrases include, but are not limited to: "yes, but", "what about", "how about", "only", "else", "other", "more", "less", "something more", "something less", "the new one", "the old one", "the one that goes", "the one that sounds like" "actually", "wait", "play", "no", "different", "skip", and "next". As such, the electronic device 800 can process exemplary inputs such as "Nah, what else do you have?", "Play something more upbeat", "Play something else", "Only stuff he produced in the 80s". With reference to FIG. 8A, the electronic device 800 can derive the user intent of refining a media request based on the predefined phrases in the natural-language speech input 814 (e.g., "actually", "play", "the one that goes"). Exemplary techniques for processing the natural-language input 814 are described above with respect to the natural language processing module 732. For instance, the electronic device 800 can receive a candidate text representation of the natural-language input 814 (a text string "Actually play the one that goes I'm giving you up I'm forgiving it all") (e.g., from STT processing module 730) and determine what nodes in an ontology of the digital assistant (e.g., ontology 760) are implicated by the words in the candidate text representation. Based on the quantity and/or relative importance of the activated nodes, the electronic device (more specifically, the natural language processing module) can select one of the actionable intents as the task that the user intended the digital assistant to perform.

In some examples, the electronic device 800 derives the user intent of refining a request for media based on context information. Context information includes one or more previous user interactions (e.g., user sessions) with the electronic device. For example, if the user's previous request is associated with a user intent of obtaining media recommendations (e.g., speech input 812) and/or if the user's current input corresponds to one or more properties (e.g., property nodes) in the media recommendation domain, the electronic device 800 can derive a user intent of refining the previous media request (e.g., using the one or more specified properties). The properties in the media recommendation domain can correspond to artist, genre, lyrics, release date, or any of the search parameters described below. With reference to FIG. 8A, the electronic device 800 can derive the user intent of refining a media request based on the user's previous speech input 912 and/or a property specified in the current speech input (lyrics "I'm giving you up I'm forgiving it all").

In some examples, the electronic device 800 identifies one or more candidate tasks and corresponding parameters based on the natural-language speech input 814. With reference to FIG. 8A, the electronic device 800 identifies a candidate task of "refining a previous media request" and a parameter of "I'm giving you up I'm forgiving it all" for refining the previous media request.

Parameters identified based on the natural-language speech input can be used to refine a media request. Exemplary parameters are provided herein. In some examples, the parameters correspond to: lyrical content of a media item (e.g., "Hey Jude"), a genre (e.g., "hip hop"), a song or album title (e.g., "Hotel California"), an occasion or a time period (e.g., a season, a holiday, time of the day, a decade), an activity (e.g., working out, driving, sleeping), a location (e.g., the beach, work, home, Hawaii), a mood (e.g., upbeat), an artist (e.g., singer, producer), or any combination thereof.

In some examples, the parameters correspond to a date (e.g., release date) within a predetermined time frame. For example, the electronic device 800 stores correlations between phrases (and the natural-language equivalents of these phrases) and time frames. For example, the electronic device 800 correlates "new" with a time frame of 1 month, "recent" with a time frame of 3 months, "just came out" and "latest" with a time frame of 1 week.

In some examples, the parameters correspond to one or more people (e.g., intended audience). For example, the natural-language speech input 814 can include reference to people associated with the user, such as "What are my friends listening to?", "What is Jason playing?", "Play more music from Amy", "Play something that my friends like". The electronic device 800 processes the natural-language speech input to identify words or phrases referring to the user (e.g., "me", "for me", "I", "my"), people other than the user (e.g., "Amy"), or any combination thereof (e.g., "our", "my friends and me"). Based on these words or phrases, the electronic device 800 obtains identification information from one or more sources (e.g., contact list, software services such as social media services and media services). In some examples, the electronic device 800 obtains the identification information by prompting the user to disambiguate between candidate interpretations (e.g., "Did you mean John Smith or John Doe?"). In some other examples, the electronic device 800 obtains the identification information based on context information such as physical presence of one or more people near the electronic device. Techniques for detecting physical presence of one or more people are discussed in more detail below.

In some examples, the parameters correspond to a source of media item. For example, the natural-language speech input 814 can include reference to a collection of media items (e.g., "what's in my library?", "play something from my weekend jam list"). As another example, the natural-language speech input 814 can include reference to an owner of media items (e.g., "play something from Jason's collection"). In response, the electronic device 800 obtains identification information and further identifies one or more media items with the appropriate permission settings, as discussed in more detail below.

In some examples, the electronic device 800 identifies the parameters for refining a media request based at least in part on context information. As discussed above, context information (or contextual information) can include information associated with an environment of the electronic device 800, e.g., lighting, ambient noise, ambient temperature, images or videos of the surrounding environment, etc. In some examples, context information includes the physical state of the electronic device 800, e.g., device orientation, device location, device temperature, power level, speed, acceleration, motion patterns, cellular signals strength, etc. Device location can be absolute (e.g., based on GPS coordinates) or relative (e.g., the device is in the user's living room, garage, bedroom). In some examples, context information includes a current time at the electronic device. In some examples, context information includes information related to a state of the digital assistant server (e.g., DA server 106), e.g., running processes, installed programs, past and present network activities, background services, error logs, resources usage, etc., and of the electronic device 800.

In some examples, context information comprises identities of people in physical proximity to the electronic device 800. In some examples, electronic device 800 can detect physical presence and/or identities of one or more users by obtaining information from one or more sources and comparing the information with known information about the one or more users to make one or more identifications. For example, the electronic device 800 can detect the physical presence of a person based on information related to an electronic device associated with the person, such as connectivity information of the person's electronic device (e.g., on the same Wi-Fi network, within Bluetooth range, within NFC range). As another example, the electronic device 800 can detect the physical presence of a person based on facial characteristics and/or voice characteristics of the person (captured via, for instance, cameras and microphones). As another example, the electronic device 800 can detect the physical presence of a person based on information available locally, such as contacts listed in a calendar invite (set for the current time) or an email message. As still another example, the electronic device 800 can detect the physical presence of a person based on credentials provided by the person (e.g., user name and password). In some examples, the electronic device 800 prompts for disambiguation input (e.g., "is that Jason or John that I'm hearing?") and/or confirmation (e.g., "Did John just join the party?") after detecting the physical presence of a person.

In some examples, context information comprises information related to the people in physical proximity with the electronic device 800. For example, context information can include the preferences, media collections, history of each of the people detected to be in physical proximity the electronic device. For example, if the electronic device 800 determines that the user's friend Amy has uttered "Play something I'd also like", the electronic device identifies Amy's preferences (favorite genre, explicit language settings) from one or more sources and uses the preferences as search parameters for refining the media request. Additional information regarding providing a merged preference profile for multiple people is provided below.

In some examples, context information comprises information related to the first media item. For example, if the user utters "play something more recent than this" in response to the recommendation of the first media item, the electronic device 800 derives a time parameter based on the release date of the first media item.

It should be appreciated that the above-described parameters for refining a media request are merely exemplary. It should be further appreciated that the electronic device can receive a user request for refining a media request at any time when the electronic device is processing the original media request and/or when the electronic device is providing (e.g. providing information related to or playback of) one or more media items based on the original media request. It should be further appreciated that the use of a natural-language speech input (e.g., the natural-language speech input 814) to refine a media request is merely exemplary. In some examples, the electronic device 800 can initiate a process for refining a media request and/or providing additional media items in response to receiving an input via one or more sensors of the electronic device (e.g., a tactile input, a gesture input, a button press). Additional exemplary descriptions of performing media searches are provided in U.S. Patent Application No. 62/347,480, "INTELLIGENT AUTOMATED ASSISTANT FOR MEDIA EXPLORATION", filed Jun. 8, 2016, which is hereby incorporated by reference in its entirety. Additional exemplary descriptions of obtaining context information is provided in U.S. Provisional Patent Application No. 62/507,056, "PROVIDING AN AUDITORY-BASED INTERFACE OF A DIGITAL ASSISTANT", filed May 16, 2017, which is hereby incorporated by reference in its entirety.

After determining that the natural-language speech input 814 corresponds to the user intent of refining the previous media request (e.g., one of the m-best candidate intents), the electronic device identifies a second media item different from the first media item. The second media item can be a song, an audio book, a podcast, a station, a playlist, or any combination thereof. With reference to FIG. 8A, the electronic device 800 identifies the second media item (e.g., "Send My Love") based on the parameters in the speech input 812 ("Adele", "new", "song") and the parameters in the speech input 814 ("I've giving you up I'm forgiving it all").

In some examples, based on the natural-language speech input 812 ("Hey Siri, play that new song by Adele"), the electronic device 800 identifies a first set of media items (e.g., a set of songs by Adele released in the past three months). From the first set of media items, the electronic device selects the song "Hello" (e.g., based on a popularity ranking) to provide to the user. Thereafter, based on the subsequent natural-language speech input 814, the electronic device 800 identifies a subset of the first set of media items based on the specified parameter derived from the natural-language speech input 814 (e.g., only songs including the lyrics "I'm giving you up I'm forgiving it all" from the first set of songs). In some examples, identifying the subset of the first set of media items comprises determining whether a media item of the first set is associated with content (e.g., lyrics, script) or metadata (genre, release date) that matches the specified parameter in the natural-language input 814. If so, the electronic device 800 then selects the second media item (the song "Send My Love") from the subset to provide to the user. If not, the electronic device 800 foregoes selecting the second media item to provide to the user.

In some examples, the electronic device identifies the first media item and/or the second media item from a user-specific corpus of media items. In some examples, the electronic device 800 identifies the user-specific corpus based on acoustic information associated with a user input (e.g., natural-language speech input 814). The user-specific corpus is generated based on data associated with the user (e.g., preferences, settings, previous requests, previous selections, previous rejections, previous user purchases, user-specific playlists). In some examples, at least part of the user-specific corpus is generated based on a software service (e.g., a media service or social media service). For example, the user-specific corpus associates media items previously rejected or disliked by the user (e.g., on a software service) with low rankings, or does not include these media items. As another example, the user-specific corpus includes data corresponding to media items owned/purchased by the user on the software service. As yet another example, the user-specific corpus includes data corresponding to media items created by the user on the software service (e.g., a playlist). As discussed above, the electronic device can identify a media item by determining whether a media item in the user-specific corpus is associated with metadata or content that matches the specified search parameters. In some examples, at least one media item in the user-specified corpus includes metadata indicative of: an activity (e.g., working out, sleeping); a mood (e.g., upbeat, calming, sad); an occasion (e.g., birthday); a time period (e.g., 80s), a location; a curator (e.g., Rolling stones lists); a collection (e.g., summer playlist); one or more previous user inputs (previous rejections by user, previous likes by user); or any combination thereof. Additional exemplary descriptions of a user-specific corpus is provided in U.S. Patent Application No. 62/347,480, "INTELLIGENT AUTOMATED ASSISTANT FOR MEDIA EXPLORATION," filed Jun. 8, 2016, which is hereby incorporated by reference in its entirety.

In some examples, at least one media item in the user-specific corpus includes metadata that is based on information from a person different from the user that has provided the media request. For example, a media item can be associated with the "beach" location based on the frequency at which it is played by all users of a software application (e.g., a media service such as iTunes) at locations corresponding to beaches. As another example, a media item can be associated with an activity (e.g., partying) based on the number of times it has been played by the user's friends (i.e., associated with the user on a social media service) and/or by people from a similar demographic segment. In some examples, the metadata is generated on a remote device different from the electronic device 800. In some examples, at least one media item in the user-specific corpus is a media item that the user is not authorized to access (e.g., has not purchased), but another person in physical proximity to the electronic device 800 is authorized to, as discussed in more detail.

Thereafter, the electronic device 800 provides the second media item. In some examples, the second media item is provided in a manner consistent with what is described above with respect to the first media item. With reference to FIG. 8A, the digital assistant of the electronic device 800 provides a playback 816 of the song "Send My Love". As depicted, the digital assistant also provides a natural-language speech output 817 including a description of the second media item ("Here's Send My Love"), for instance, while providing the playback of the second media item. In some examples (not depicted), the electronic device 800 provides a playback of a representative sample of the second media item in response to the natural-language speech input 814 and requires a user confirmation before providing the second media item in its entirety. In some examples, the electronic device 800 provides a summary and/or a listing of multiple media items identified based on the natural-language speech input 814 (e.g., "I've found two songs with those lyrics: Send My Love, Send My Love Acoustic Version . . . ").

Figure 8B:
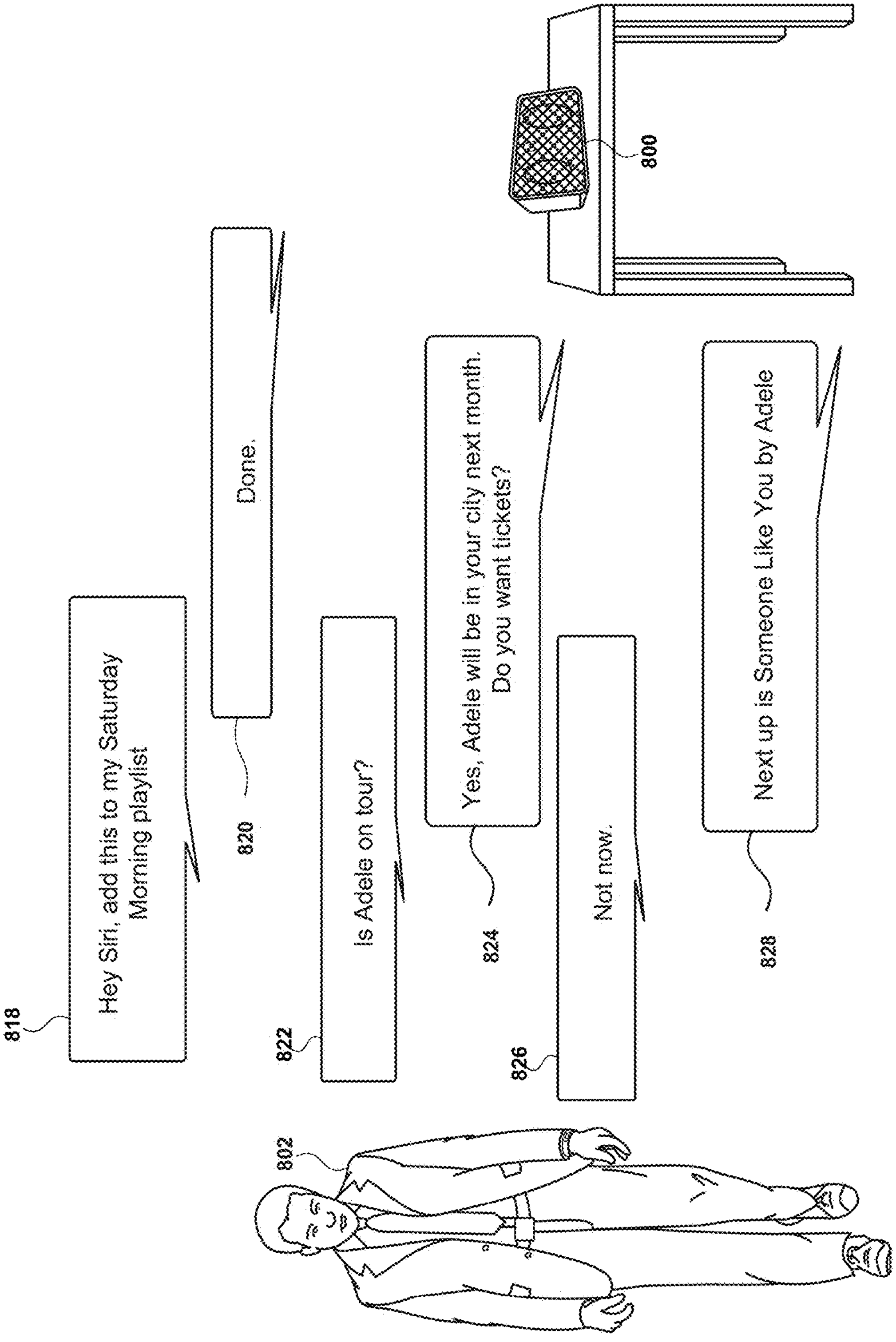

In some examples, with reference to FIG. 8B, the electronic device 800 receives a third natural-language speech input 818 ("Hey Siri, add this to my Saturday Morning playlist"). Based on the third natural-language speech input 818, the electronic device determines a user intent of associating a media item with a collection of media items. The electronic device can determine the user intent based on context information (e.g., currently/previously played media items). In the depicted example, the electronic device 800 associates the currently played song "Send My Love" to a playlist named "Saturday Morning" and provides a speech output 820 indicative of the association ("Done"). In another example (not depicted), the electronic device can receive a natural-language speech input "Add the last 10 songs to a new playlist called New Favs". In response, the electronic device can create a new collection of media items named "New Favs" and associate the previously played 10 songs with the new collection.

In some examples, the electronic device 800 receives a fourth natural-language speech input 822 ("Is Adele on tour?") while providing the playback of "Send My Love". Based on the fourth natural-language speech input 822, the electronic device determines a user intent of obtaining information (e.g., the artist, the release date, related interviews, back story, meaning of the lyrics, touring information, which of the user's friends have listened to the media item) related to a particular media item. In some examples, the particular media item is identified based on context information (the song being played, the song previously played). In the depicted example, the electronic device 800 determines a user intent of obtaining touring information related to Adele, the singer of the currently played song, and provides a speech output 824 indicative of the information ("Yes, Adele will be in your city next month. Do you want tickets?"). In the depicted example, the user provides a negative response 826 ("Not now"). In another example (not depicted), the user can provide an affirmative response, and the electronic device 800 can initiate a process for purchasing concert tickets. In some examples, the electronic device 800 provides the information automatically without the fourth natural-language speech input 822.

In some examples, while playing a media item, the electronic device 800 may provide a speech output indicative of another media item. By way of example, while providing the second media item ("Send My Love"), the electronic device 800 provides a speech output 828 indicative of a third media item to be played ("Next up is Someone Like You by Adele"). After providing the second media item, the electronic device 800 provides the third media item. In some examples, while playing a media item, the electronic device 800 may receive a natural-language speech input indicative of a location (e.g., "Play this in the garage"). In response, the electronic device 800 identifies another electronic device (e.g., a speaker associated with the user's garage, a phone that is physically located in the user's garage) based on the specified location and causes the identified electronic device to provide the playback of the media item. In some examples, the electronic device 800 can send information related to the playback (e.g., identification information of the media item, progress of the playback, playback settings such as volume) to the identified electronic device (e.g., directly or via a remote device). Additional descriptions for processing a natural-language speech input indicative of a location and processing a media request accordingly can be found, for example, in U.S. Utility application Ser. No. 14/503,105, entitled "INTELLIGENT ASSISTANT FOR HOME AUTOMATION", filed Sep. 30, 2014, U.S. Provisional Patent Application Ser. No. 62/348,015, entitled "INTELLIGENT AUTOMATED ASSISTANT IN A HOME ENVIRONMENT," filed Jun. 9, 2016, and U.S. Provisional Patent Application Ser. No. 62/348,896, entitled "INTELLIGENT DEVICE ARBITRATION AND CONTROL," filed Jun. 11, 2016, the entire disclosures of which are incorporated herein by reference.

Figure 9A:
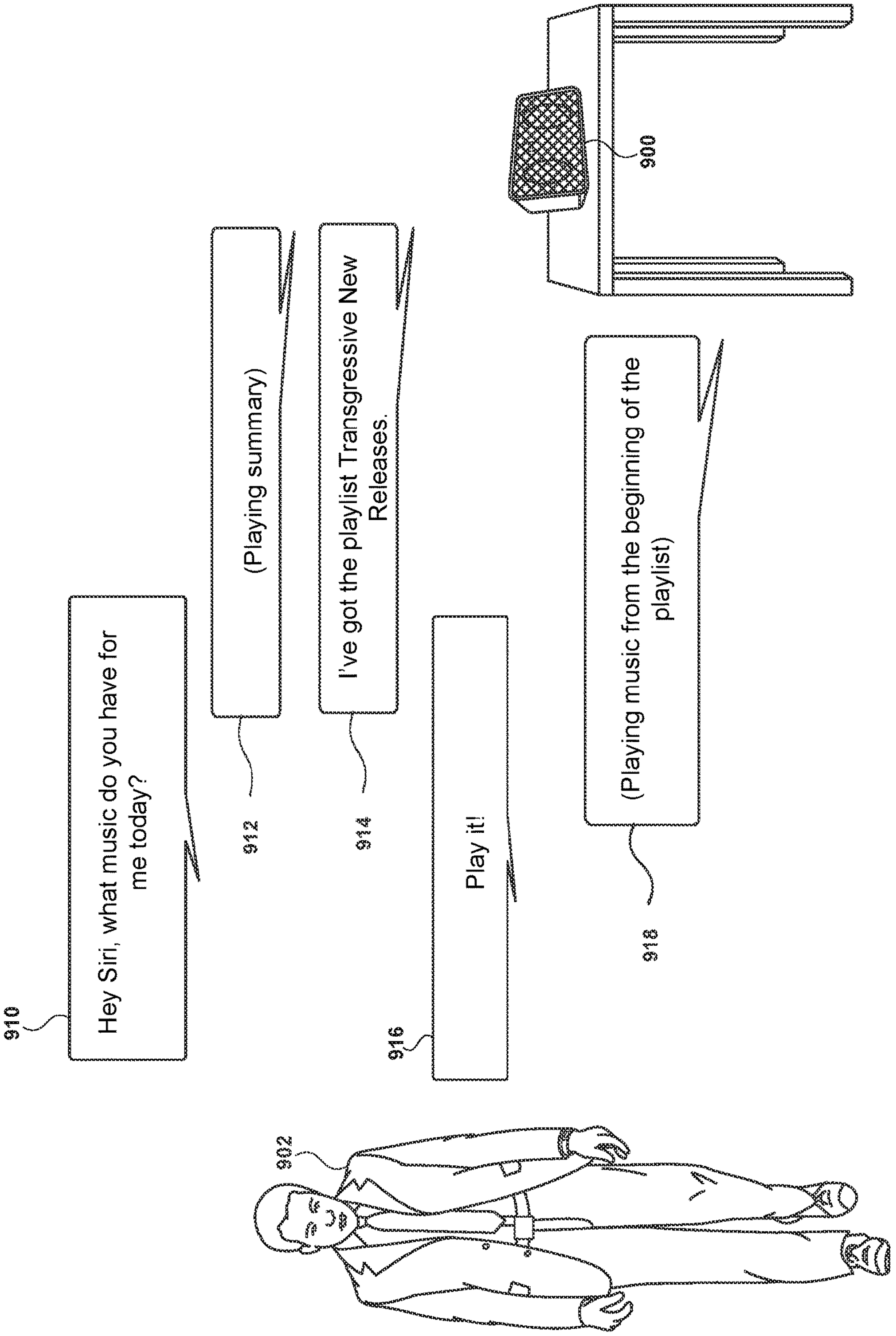
FIGS. 9A-B illustrate exemplary user interfaces of an electronic device in accordance with some embodiments.
Figure 9B:
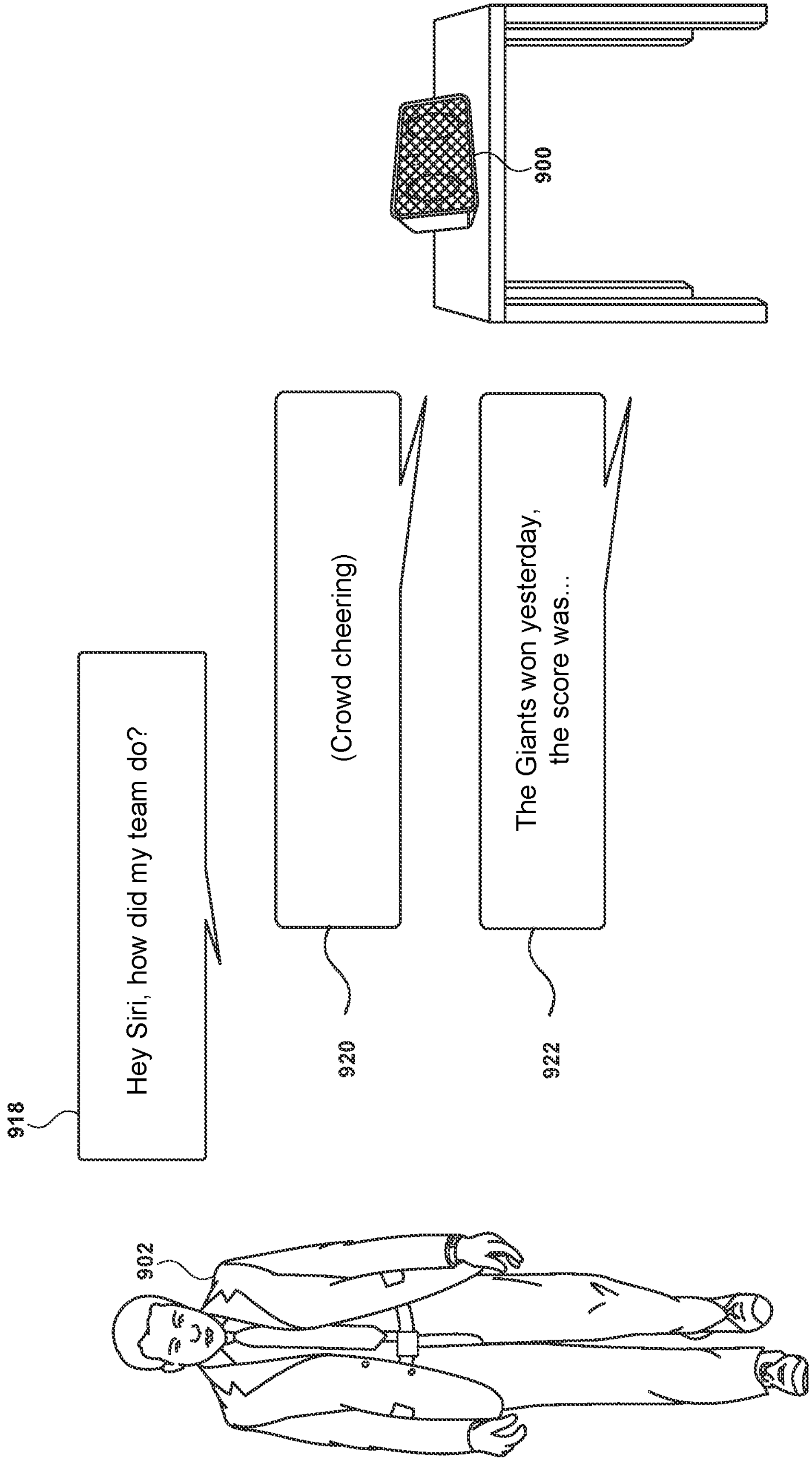

FIGS. 9A-9B show electronic device 900. Electronic device 900 may be any of devices 200, 400, 600, and 800 (FIGS. 2A, 4, 6A-6B and 8A-8B) in some embodiments. In the illustrated example, the electronic device 900 is an electronic device with one or more speakers, though it will be appreciated that the electronic device may be a device of any type, such as a phone, laptop computer, desktop computer, tablet, wearable device (e.g., smart watch), set-top box, television, speaker, or any combination or subcombination thereof.

With reference to FIG. 9A, the electronic device 900 receives (e.g., via a microphone) a natural-language speech input 910 indicative of a request to the digital assistant of the electronic device 900. The natural-language speech input 910 can include any request that can be directed to the digital assistant. In some examples, the natural-language speech input includes a predetermined trigger phrase (e.g., "Hey Siri"). In the depicted example in FIG. 9A, the user 902 provides the natural-language speech input 910 that includes a trigger phrase and a request for media items: "Hey Siri, what music do you have for me today?"

The electronic device 900 processes natural-language speech inputs in a manner consistent with what is discussed above with respect to electronic device 800. For example, the electronic device 900 processes the natural-language speech input 910 to provide one or more candidate text representations (e.g., a text representation "hey Siri, what music do you have for me today") and one or more candidate intents (e.g., a user intent of "obtaining media recommendations").

The electronic device 900 identifies a task based on the natural-language speech input 910. In some examples, the electronic device 900 identifies one or more candidate tasks based on the one or more candidate intents (which in turn are identified based on one or more candidate text representations), as discussed above. Further, the electronic device performs a candidate task to obtain one or more results. The one or more results can include information related to a media item such as a song, an audio book, a podcast, a station, a playlist, or a combination thereof. In the depicted example in FIG. 9A, the electronic device 900 identifies a candidate task of "providing a media item" with parameters "for me" and "music" based on the natural-language speech input 910. Further, the electronic device 900 performs the identified task to obtain information related to a playlist "Transgressive New Releases".

With reference to FIG. 9A, the electronic device 900 provides a speech output 914 indicative of a verbal response associated with the identified task. Specifically, the electronic device 900 provides a verbal description of the identified playlist ("I've got the playlist Transgressive New Releases"). In some examples, the verbal description provided to the user includes information (e.g., metadata) corresponding to the identified media item, parameters identified from the user request, or a combination thereof. For example, in response to a user request "Play something from my favorite artists", the electronic device 900 can provide a speech output "Here's a song by Adele, one of your favorite singers, released last week". The electronic device 900 can determine the user's favorite singers based on metadata of a user-specific corpus. As discussed with reference to FIGS. 8A-8B, in some examples, at least one media item in the user-specified corpus includes metadata indicative of one or more previous user inputs (previously rejected by user, previously liked by user, previously searched by user). Alternatively, in some other examples, the electronic device 900 can determine the user's favorite singers based on user preference data (e.g., user data and models 231).

In some examples, the electronic device 900 provides the speech output 914 in accordance with one or more text-to-speech modes. For example, the speech output 914 can be provided in a voice of the digital assistant, a voice (e.g., artist, DJ) associated with the media item, or a combination thereof. Additional exemplary descriptions of using different text-to-speech modes is provided in U.S. Provisional Patent Application No. 62/507,056, "PROVIDING AN AUDITORY-BASED INTERFACE OF A DIGITAL ASSISTANT", filed May 16, 2017, which is hereby incorporated by reference in its entirety.

While providing the speech output indicative of a verbal response (e.g., speech output 914), the electronic device 900 simultaneously provides an audio output 912, which is a playback of a media item corresponding to the verbal response. In some examples, the media item being played back is a portion (e.g., a representative sample) of the identified media item. For example, if the identified media item is a single song, the playback can include the chorus or first verse of the song. As another example, if the identified media item is a playlist, the playback can include a 5-second segment for each of the songs in the playlist.

In some examples, the electronic device 900 provides the playback at a different volume (e.g., lower) than the speech output. In some examples, the electronic device 900 provides the playback at a different fidelity (e.g., lower) than the speech output. In some examples, the electronic device 900 begins providing the audio output 912 prior to providing the speech output 914. In other examples, the electronic device 900 begins providing the audio output 912 and the speech output 914 simultaneously. In yet other examples, the electronic device 900 begins providing the speech output 914 prior to providing the audio output 912. Additional description of adjusting audio during playback is provided in U.S. Patent Application No. 62/399,232, "INTELLIGENT AUTOMATED ASSISTANT," filed Sep. 23, 2016, which is hereby incorporated by reference in its entirety.

In some examples, while providing playback 912, the electronic device receives a natural language speech input 916 ("Play it!"). In response to receiving the natural-language speech input 916, the electronic device 900 provides an audio output 918, which is a playback of the identified media item in its entirety (e.g., from the beginning). In some examples, the playback 918 is provided at a different volume and/or fidelity than the playback 912.

In some examples, while providing playback 918, the electronic device 800 provides a speech output (not depicted) indicative of information related to a media item. The information can correspond to, for instance, trivia of a song ("this was released last week"), touring information of an artist ("This artist is coming to California next month. Want tickets?"), or news ("This artist just got engaged. Let me know if you want to know more about that."). The media item can be the media item being played back, previously played, or to be played by the electronic device 900.

In some examples, instead of simultaneously providing two layers of audio (e.g., a verbal description and a representative sample of the identified media item), the electronic device 900 provides a description of the identified media item without providing a playback of a representative sample. In some examples, the user 902 can provide a follow-up request to hear the representative sample (e.g., "What does it sound like?", "What kind of songs is in the playlist?"). In response, the electronic device 900 provides a playback of the representative sample (e.g., "Let's take a listen. <30-second summary>") and, in some instances, prompts user for additional input ("Would you like me to play it?").

It should be appreciated that the above-described techniques for providing multiple layers of audio are merely exemplary. Generally, the electronic device 900 can provide layered and/or coordinated audio information as part of any interaction between the digital assistant and the user. For example, with reference to FIG. 9B, the electronic device 900 receives a natural-language speech input 918 ("Hey Siri, how did my team do?"). Based on the input, the electronic device 900 identifies a task (e.g., a candidate task of "obtaining scores of a sports event") and one or more parameters (e.g., "Giants"), and performs the task to obtain one or more results (e.g., scores). In some other examples, the electronic device 900 can determine the one or more parameters based on user preference data (e.g., user data and models 231). The electronic device 900 provides a speech output 922 indicative of a verbal response associated with the identified task. In the depicted example, the speech output 922 is indicative of a verbal description of the obtained results ("The Giants won yesterday, the score was . . . ").

While providing the speech output 922, the electronic device 900 also provides a playback 920 of a media item corresponding to the verbal response. In the depicted example, the media item is a sound effect corresponding to a winning score (e.g., crowd cheering). In some examples, the sound effect is a pre-recorded audio (e.g., generic sound effect, audio recorded at the related sports event) or a live stream (e.g., sound of rain at the current location of the electronic device). In some examples, the speech output 922 is provided at a different volume (e.g., higher) and/or fidelity (e.g., higher) than the playback 920.

It should be appreciated that the digital assistant of the electronic device 900 can interact with a user (e.g., provide information) in a variety of text-to-speech modes, voices, and sequences. Generally, the digital assistant can coordinate between the various layers (e.g., background audio, foreground audio) and various types (e.g., sound effects, speech, music) of audio outputs to provide an intuitive, rich, and natural user interface. For example, the electronic device can adjust the timing, volume, fidelity, and content of the background audio based on the timing, volume, fidelity, and content of the foreground audio.

Figure 10A:
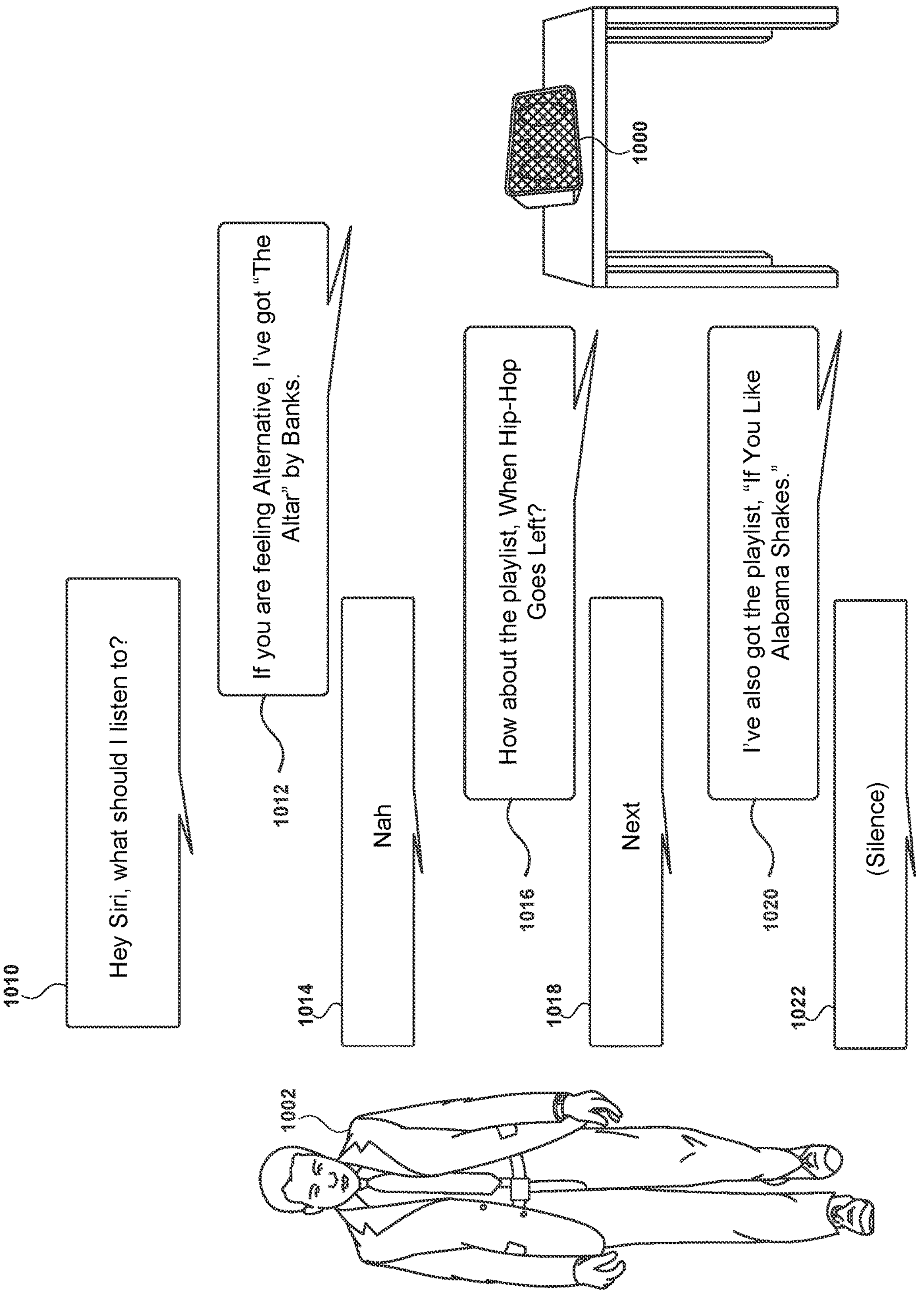
FIGS. 10A-B illustrate exemplary user interfaces of an electronic device in accordance with some embodiments.
Figure 10B:
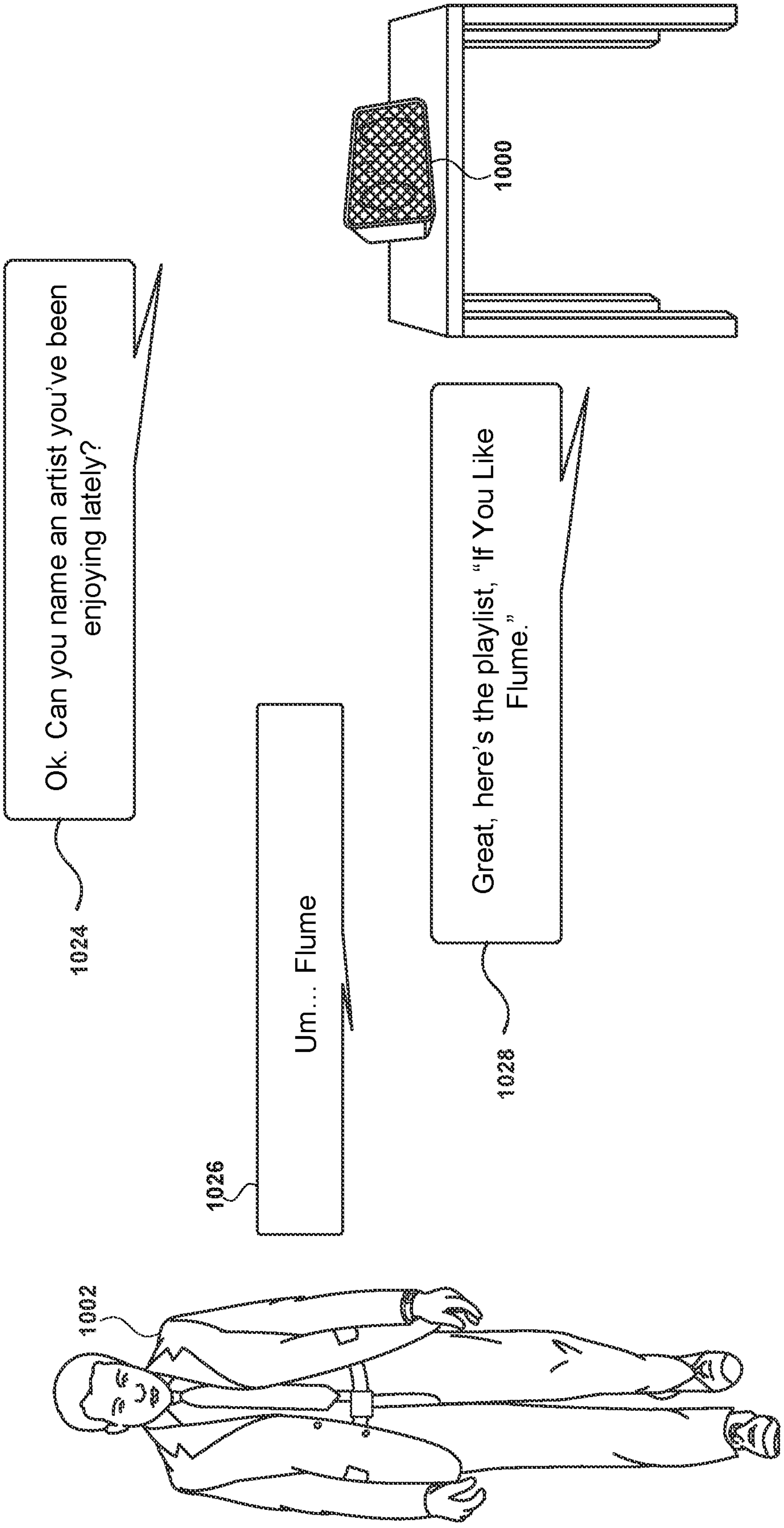

FIGS. 10A-10B show electronic device 1000. Electronic device 1000 may be any of devices 200, 400, 600, 800, and 900 (FIGS. 2A, 4, 6A-6B, 8A-8B, and 9A-9B) in some embodiments. In the illustrated example, the electronic device 1000 is an electronic device with one or more speakers, though it will be appreciated that the electronic device may be a device of any type, such as a phone, laptop computer, desktop computer, tablet, wearable device (e.g., smart watch), set-top box, television, speaker, or any combination or subcombination thereof.

With reference to FIG. 10A, the electronic device 1000 receives (e.g., via a microphone) a natural-language speech input 1010 indicative of a request for media to the digital assistant of the electronic device 1000 ("Hey Siri, what should I listen to?"). The electronic device 1000 processes natural-language speech inputs in a manner consistent with what is described above with respect to electronic devices 800 and 900. For example, the electronic device 1000 processes the natural-language speech input 1010 to provide one or more candidate text representations (e.g., a text representation "hey Siri, what should I listen to?") and one or more candidate intents (e.g., a user intent of "obtaining media recommendations").

The electronic device 1000 identifies a task based on the natural-language speech input 1010. In some examples, the electronic device 1000 identifies one or more candidate tasks based on the one or more candidate intents, as discussed above, and performs the highest ranking candidate task to obtain one or more results. In some examples, the one or more results include information related to: a song, an audio book, a podcast, a station, a playlist, or a combination thereof. In the depicted example in FIG. 10A, the electronic device 1000 identifies a candidate task of "providing a media item" with a parameter "for me" and performs the task to obtain a first media item ("The Altar" by Banks).

In response to receiving the speech input 1010, the electronic device 1000 provides an audio output 1012 indicative of a suggestion of the first media item ("If you are feeling Alternative, I've got 'The Altar' by Banks"). In some examples, the suggestion of the first media item includes additional information to contextualize the media recommendation, such as metadata of the media item (e.g., genre, artist) and reason(s) as to why the media item is recommended (e.g., "If you are feeling Alternative . . . "). In some examples, the electronic device 1000 simultaneously provides a playback of a portion of the recommended media item.

In some examples, after providing the audio output 1012, the electronic device 1000 receives a speech input 1014 ("Nah"). The electronic device determines whether the speech input 1014 is indicative of a non-affirmative response corresponding to the request for media (e.g., "no", "next", "don't like it", "hate it", "a couple more" and natural-language equivalents of any phrases indicative of a rejection). In accordance with a determination that the speech input 1014 is indicative of a non-affirmative response, the electronic device updates the number of consecutive non-affirmative responses corresponding to the request. On the other hand, in accordance with a determination that the speech input 1014 is not indicative of a non-affirmative response, the electronic device foregoes updating the number. In the depicted example, the electronic device updates the number from 0 to 1 based on the speech input 1014.

With reference to FIG. 10A, in some examples, the electronic device 1000 provides another audio output 1016 indicative of a suggestion of the second media item ("How about the playlist, When Hip-Hop Goes Left?"). In some examples, the electronic device 900 identifies the first media item and the second media item as part of a single search, and the first media item has a higher confidence score than the second media item and is thus suggested first by the electronic device. In some examples, the electronic device performs two separate searches to identify the first media item and the second media item, respectively, and the second search is performed after the user provides a non-affirmative response to the suggestion of the first media item (e.g., audio input 1014).

After providing a suggestion of the second media item, the electronic device 1000 receives a speech input 1018 ("Next"). The electronic device determines whether the speech input 1018 is indicative of a non-affirmative response corresponding to the request for media in a manner consistent with what is described with respect to the speech input 1014. In the depicted example, the electronic device determines that the speech input 1018 is indicative of a non-affirmative response and updates the number from 1 to 2.

With reference to FIG. 10A, in some examples, the electronic device 1000 provides yet another audio output 1020 indicative of a suggestion of the third media item ("I've also got the playlist, 'If You Like Alabama Shakes.'"). The electronic device 900 can identify the first media item, the second media item, and the third media item in a single search or in different searches (e.g., using different search parameters and/or context information).

After providing a suggestion of the third media item, the electronic device 1000 samples (e.g., via a microphone) for inputs from the user. In some examples, the electronic device determines that a response is not received within a predetermined period of time (e.g., 5 seconds). In accordance with the determination, the electronic device updates the number of consecutive non-affirmative responses corresponding to the request. In the depicted example, the electronic device determines that no response is received within a predetermined period of time (e.g., silence) and updates the number from 2 to 3.

The electronic device 1000 determines whether the number of consecutive non-affirmative responses corresponding to the request for media satisfies a threshold. In some examples, the electronic device makes the determination after providing each of the audio outputs 1012, 1016, and 1020. In accordance with a determination that the number of consecutive non-affirmative responses does not satisfy the threshold, the electronic device provides an audio output indicative of a suggestion of another media item. For example, after receiving audio output 1018 ("Next"), the electronic device determines that the number of consecutive non-affirmative responses (2) is not equal to a predetermined threshold (e.g., 3). Accordingly, the electronic device provides speech output 1020 to suggest another media item different from what has been suggested.

In accordance with a determination that the number of consecutive non-affirmative responses satisfies the threshold, the electronic device foregoes providing a suggestion of another media item and instead provides an audio output indicative of a request for user input. For example, after receiving a non-affirmative response 1022 (e.g., silence for a predetermined amount of time), the electronic device determines that the number of consecutive non-affirmative responses (3) is equal to the predetermined threshold (e.g., 3). Accordingly, with reference to FIG. 10B, the electronic device provides speech output 1024 ("Ok. Can you name an artist you've been enjoying lately?").

In some examples, the speech output 1024 is indicative of a prompt for one or more parameters for the request for media. In the depicted example, the electronic device 1000 prompts the user for an artist parameter ("Can you name an artist you've been enjoying lately?") and receives a speech input 1026 ("Um . . . Flume"). The speech input 1026 is indicative of a parameter for the request for media (artist=Flume). Based on the received parameter, the electronic device 1000 identifies another media item different from the previously recommended media items. Accordingly, the electronic device 1000 provides the identified media item via speech output 1028 ("Great, here's the playlist, 'If You Like Flume.'"). In some examples, based on the received parameter, the electronic device updates the user preference data (e.g., user data and models 231) and/or the user-specific corpus accordingly.

In some examples, alternatively or additionally to providing the speech output 1024, the electronic device 1000 provides a speech output indicative of a prompt for a user selection among a plurality of media items previously suggested (e.g., "Do any of these sound good?"). In some examples, the electronic device receives a speech input indicative of a user selection (e.g., "Yeah, the second one", "the hip hop one", "the one by Adele") and interprets the speech input based on context information. The context information can include the plurality of media items previously suggested by the electronic device.

Figure 11:
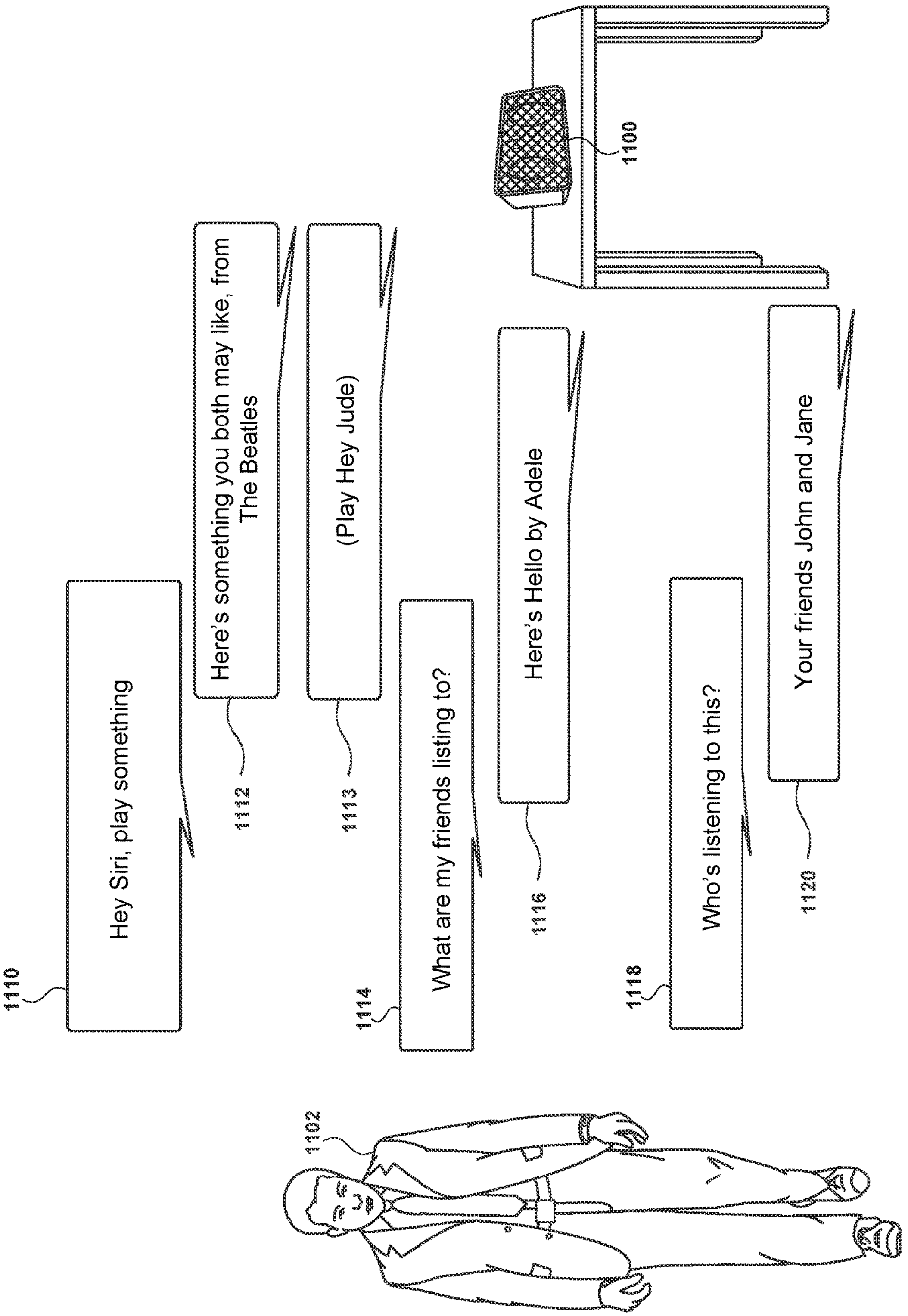
FIG. 11 illustrates exemplary user interfaces of an electronic device in accordance with some embodiments.

FIG. 11 shows electronic device 1100. Electronic device 1100 may be any of devices 200, 400, 600, 800, 900, and 1000 (FIGS. 2A, 4, 6A-6B, 8A-8B, 9A-9B, and 10A-10B) in some embodiments. In the illustrated example, the electronic device 1100 is an electronic device with one or more speakers, though it will be appreciated that the electronic device may be a device of any type, such as a phone, laptop computer, desktop computer, tablet, wearable device (e.g., smart watch), set-top box, television, speaker, or any combination or subcombination thereof.

In operation, the electronic device 1100 receives (e.g., via a microphone) a natural-language speech input 1110 indicative of a request for media to the digital assistant of the electronic device 1100 ("Hey Siri, play something"), uttered by user 1102. In the depicted example, the electronic device 1100 is associated with the user 1102. The electronic device 1100 processes natural-language speech inputs in a manner consistent with what is described above with respect to electronic devices 800, 900, and 1000. For example, the electronic device 1100 processes the natural-language speech input 1110 to provide one or more candidate text representations (e.g., a text representation "hey Siri, play something") and one or more candidate intents (e.g., a user intent of "obtaining media recommendations").

The electronic device 1100 detects the physical presence of a plurality of users in proximity to the electronic device. In some examples, the electronic device 1100 can detect the physical presence of a person based on information related to an electronic device associated with the person, such as connectivity status of the person's electronic device (e.g., on the same Wi-Fi network, within Bluetooth range, within NFC range), information on the person's electronic device, etc. For instance, if the user's sister is also in physical proximity with the electronic device 1100 and has her phone on her, the electronic device 1100 can receive information corresponding to the sister's phone. For example, the electronic device 1100 can receive identification information (e.g., phone number, user name) from the sister's device (e.g., via a Bluetooth connection). As another example, the electronic device 1100 can receive identification information from a routing device (e.g., a wireless router that both electronic device 1100 and the sister's device are connected to).

In some examples, the electronic device 1100 can detect the physical presence of a person based on facial characteristics and/or voice characteristics of the person (captured via, for instance, cameras and microphones). In other examples, the electronic device 800 can detect the physical presence of a person based on information available locally, such as contacts listed in a calendar invite or an email message. In still some other examples, the electronic device 800 can detect the physical presence of a person based on credentials provided by the person (e.g., user name and password). In some examples, the electronic device 1100 prompts for disambiguation input (e.g., "is that Jason or John that I'm hearing?") and/or confirmation input (e.g., "Did John just join the party?") after detecting the physical presence of a person.

In response to detecting the physical presence of the plurality of users (e.g., family members, visitors), the electronic device 1100 obtains a plurality of preference profiles corresponding to the plurality of users. In some examples, the electronic device 1100 receives a preference profile corresponding to a person other than the user 1102 (e.g., the user's sister) from a remote device (e.g., a server device). In some examples, the electronic device 1100 receives a preference profile corresponding to a person other than the user 1102 (e.g., the user 1102's sister) directly from the person's electronic device (e.g., the sister's phone). In some examples, the electronic device 1100 stores the preference profile of a person other than the user 1102 locally. For instance, user 1102 may have previously asked the digital assistant to store the preference locally (e.g., "Hey Siri, remember that my sister likes The Beatles").

Based on the plurality of preference profiles, the electronic device 1100 provides a merged preference profile. In some examples, providing a merged preference profile comprises identifying one or more preferences shared by each of the plurality of preference profiles. In the depicted example, the electronic device 1100 provides a merged preference profile based on the user's preference profile and the sister's preference profile. Because both the user and the sister have a preference for The Beatles, the merged preference profile includes a preference for The Beatles. On the other hand, because only the user, but not the sister, has a preference for Banks, the merged preference profile may not include a preference for Banks, in some examples.

Based on the merged preference profile, the electronic device 1100 identifies a media item. The identified media item can be a song, an audio book, a podcast, a station, a playlist, or any combination thereof. For example, the electronic device 1100 identifies a song "Hey Jude" because the metadata of the song (e.g., artist) matches one or more preferences of the merged profile (e.g., The Beatles). Accordingly, the electronic device 1100 provides an audio output 1112 ("Here's something you both may like, from the Beatles"). The audio output 1112 includes a description of the identified media item ("from The Beatles") and makes a reference to the merged profile (e.g., "something you both may like"). The electronic device 1100 also provides an audio output 1113 including the identified media (a playback of the song "Hey Jude").

In some examples, identifying the media item based on the merged preference profile includes identifying the media item from a plurality of media items. In some examples, the plurality of media items includes a first set of media items associated with the first user (e.g., that the first user is authorized to access) and a second set of media items associated with the second user (e.g., that the second user is authorized to access). In the depicted example, the identified media item is not part of the first set of media items but is part of the second set of media items (i.e., the user does not have access to the song "Hey Jude", but the user's sister does).

In some examples, after detecting physical presence of multiple users including a second user (e.g., the sister), the electronic device 1100 detects a lack of presence of the second user. The electronic device 1100 can detect the lack of presence of the second user using techniques similar to those for detecting the presence of the second user. For example, the electronic device 1100 can detect the lack of presence by obtaining information (e.g., whether the sister's device is still connected to the wireless network) related to the electronic device of the second user. The information can be obtained from the second user's device directly or from a network router. After detecting the lack of presence of the second user, the electronic device 1100 updates the merged preference profile and/or the plurality of media items to search from. For example, if the electronic device 1100 detects a lack of presence of the user's sister, the electronic device 1100 removes media items that only the sister has access to (e.g., the sister's The Beatles collection) from the plurality of media items to search from.

In some examples, the electronic device 1100 receives a natural-language speech input 1114 indicative of a request for media based on preferences and/or activities of a person other than the user. In the depicted example in FIG. 11, the user 1102 provides an audio output 1114 ("What are my friends listening to?"). In response, the electronic device 1100 identifies one or more people (e.g., via contact list, software services such as social media services and media services, and other user-specific data). The electronic device furthermore obtains information related to the preferences (e.g., preferred genre, preferred artist) and/or activities (recently played songs) of the one or more people from one or more sources (e.g., software services such as social media services and media services). For example, the electronic device 1100 can identify one or more people that are associated with the user on a software service and identifies a media item that some or all of these people have played using the software service. Alternatively, the electronic device 1100 identifies the media item by searching for media items with the appropriate metadata (e.g., a friend tag) in a database (e.g., the user-specific corpus discussed above). In the depicted example, the electronic device 1100 provides an audio output 1116 ("Here's Hello by Adele") to provide the identified media item.

In some examples, the electronic device receives a natural-language speech input 1118 indicative of a request for information ("Who's listening to this?"). In response, the electronic device 1100 provides identification information of the one or more people associated with the media item (e.g., using the user-specific corpus, using related software services). The identification information can be obtained locally and/or from one or more remote devices. In the depicted example, the electronic device 1100 provides audio output 1120 ("Your friends John and Jane") to provide the identification information.

Figure 12:
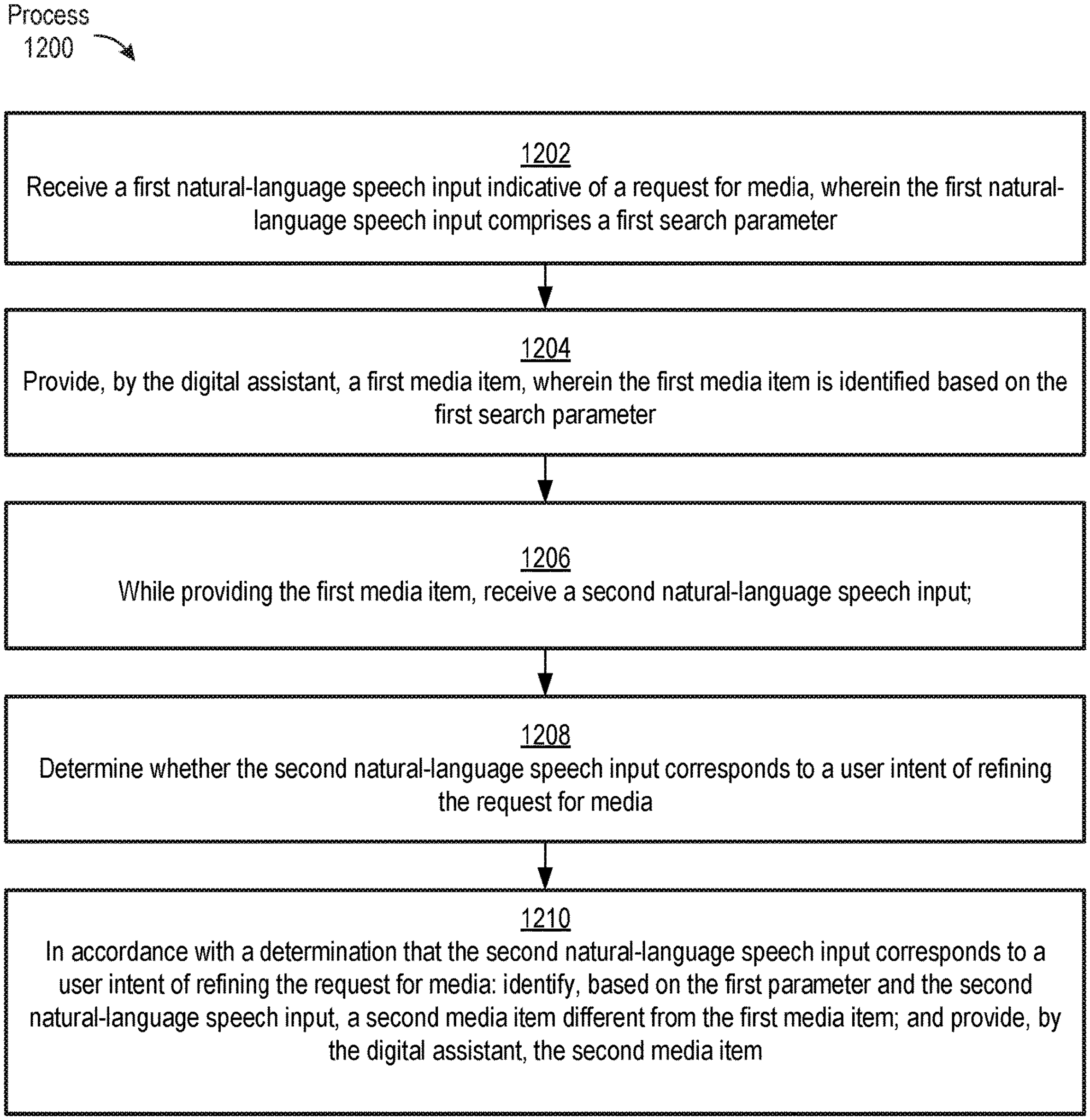
FIG. 12 illustrates a process for providing an auditory-based interface of a digital assistant, according to various examples.

4. Processes for Providing an Auditory-Based Interface of a Digital Assistant for Media Exploration FIG. 12 illustrates process 1200 for providing an auditory-based interface of a digital assistant, according to various examples. Process 1200 is performed, for example, using one or more electronic devices implementing a digital assistant. In some examples, process 1200 is performed using a client-server system (e.g., system 100), and the blocks of process 1200 are divided up in any manner between the server (e.g., DA server 106) and a client device. In other examples, the blocks of process 1200 are divided up between the server and multiple client devices (e.g., a mobile phone and a smart watch). Thus, while portions of process 1200 are described herein as being performed by particular devices of a client-server system, it will be appreciated that process 1200 is not so limited. In other examples, process 1200 is performed using only a client device (e.g., user device 104) or only multiple client devices. In process 1200, some blocks are, optionally, combined, the order of some blocks is, optionally, changed, and some blocks are, optionally, omitted. In some examples, additional steps may be performed in combination with the process 1200.

At block 1202, the electronic device receives a first natural-language speech input indicative of a request for media. The first natural-language speech input comprises a first search parameter. In some examples, the electronic device obtains, based on the first natural-language speech input, a text string. Further, the electronic device determines, based on the text string, a representation of user intent of obtaining recommendations for media items. Further, the electronic device determines, based on the representation of user intent, a task and one or more parameters for performing the task, which include the first search parameter.

At block 1204, the electronic device (or the digital assistant of the electronic device) provides a first media item. The first media item is identified based on the first search parameter. In some examples, the first media item is a song, an audio book, a podcast, a station, a playlist, or any combination thereof.

In some examples, providing the first media item comprises: providing, by the digital assistant, a speech output indicative of a verbal response associated with the first media item. Providing the first media item further comprises: while providing the speech output indicative of the verbal response, providing, by the digital assistant, playback of a portion of the first media item. In some other examples, providing the first media item comprises providing, by the digital assistant, playback of the first media item. In some other examples, providing the first media item comprises providing, by the digital assistant, a plurality of media items, which includes the first media item.

At block 1206, while providing the first media item, the electronic device receives a second natural-language speech input. In some examples, in response to receiving the second natural-language speech input, the electronic device adjusts the manner in which the first media item is provided.

At block 1208, the electronic device determines whether the second natural-language speech input corresponds to a user intent of refining the request for media. In some examples, determining whether the second natural-language speech input corresponds to a user intent of refining the request for media comprises deriving a representation of user intent of refining the request for media based on one or more predefined phrases and natural-language equivalents of the one or more phrases. In some examples, determining whether the second natural-language speech input corresponds to a user intent of refining the request for media comprises deriving a representation of user intent of refining the request for media based on context information.

In some examples, the electronic device obtains based on the second natural-language speech input, one or more parameters for refining the request for media. In some examples, a parameter of the one or more parameters corresponds to: lyrical content of a media item, an occasion or a time period, an activity, a location, a mood, a release date within a predetermined time frame, an intended audience, a collection of media items, or any combination thereof. In some examples, the second natural-language speech input is associated with a first user, and a parameter of the one or more parameters corresponds to a second user different from the first user.

In some examples, obtaining the one or more parameters for refining the request for media comprises determining the one or more parameters based on context information. In some examples, the context information comprises information related to the first media item.

In some examples, the electronic device detects physical presence of one or more users, and the context information comprises information related to the one or more users. In some examples, the context information comprises a setting associated with one or more users of the electronic device.

At block 1210, in accordance with a determination that the second natural-language speech input corresponds to a user intent of refining the request for media, the electronic device (or the digital assistant) identifies, based on the first parameter and the second natural-language speech input, a second media item different from the first media item, and provides the second media item. The second media item can be a song, an audio book, a podcast, a station, a playlist, or any combination thereof.

In some examples, the electronic device obtains, based on the first natural-language speech input, a first set of media items and selects the first media item from the first set of media items. Further, the electronic device obtains, based on the second natural-language speech input, a second set of media items, which is a subset of the first set of media items, and selects the second media item from the set second set of media items. In some examples, obtaining the second set of media items comprises selecting, from the first set of media items, one or more media items based on the one or more parameters for refining the request for media.

In some examples, identifying the second media item comprises determining whether content associated with the second media item matches at least one of the one or more parameters. In some other examples, identifying the second media item comprises determining whether metadata associated with the second media item matches at least one of the one or more parameters.

In some examples, the electronic device obtains the second media item from a user-specific corpus of media items, the user-specific corpus of media items generated based on data associated with a user. In some examples, the electronic device identifies the user-specific corpus of media items based on acoustic information associated with the second natural-language speech input. In some examples, a media item in the user-specific corpus of media items includes metadata indicative of: an activity; a mood; an occasion; a location; a time; a curator; a playlist; one or more previous user inputs; or any combination thereof. In some examples, at least a portion of the metadata is based on information from a second user different from the first user.

In some examples, providing the second media item comprises providing, by the digital assistant, a speech output indicative of a verbal response associated with the second media item. Further, providing the second media item comprises, while providing the speech output indicative of the verbal response, providing, by the digital assistant, playback of a portion of the second media item.

In some examples, providing the second media item comprises providing, by the digital assistant, playback of the second media item. In some other examples, providing the second media item comprises providing, by the digital assistant, a plurality of media items, which includes the second media item.

In some examples, the electronic device receives a third natural-language speech input and determines, based on the third natural-language speech input, a representation of user intent of associating the second media item with a collection of media items. Further, the electronic device associates the second media item with the collection of media items and provides, by the digital assistant, an audio output indicative of the association.

In some examples, while providing the second media item, the electronic device receives a fourth natural-language speech input. Further, the electronic device determines, based on the fourth natural-language speech input, a representation of user intent of obtaining information related to a particular media item, and provides, by the digital assistant, the information related to the particular media item. In some examples, the electronic device selects the particular media item based on context information.

In some examples, while providing the second media item, the electronic device (or the digital assistant of the electronic device) provides a speech output indicative of a third media item and, after providing the second media item, provides the third media item.

In some examples, the electronic device is a computer, a set-top box, a speaker, a smart watch, a phone, or a combination thereof.

The operations described above with reference to FIG. 12 are optionally implemented by components depicted in FIGS. 1-4, 6A-6B, and 7A-7C. For example, the operations of process 1200 may be implemented by any device, or component thereof, described herein, including but not limited to, devices 104, 200, 400, 600, 800, 900, 1000, and 1100. It would be clear to a person having ordinary skill in the art how other processes are implemented based on the components depicted in FIGS. 1-4, 6A-6B, and 7A-7C.

Figure 13:
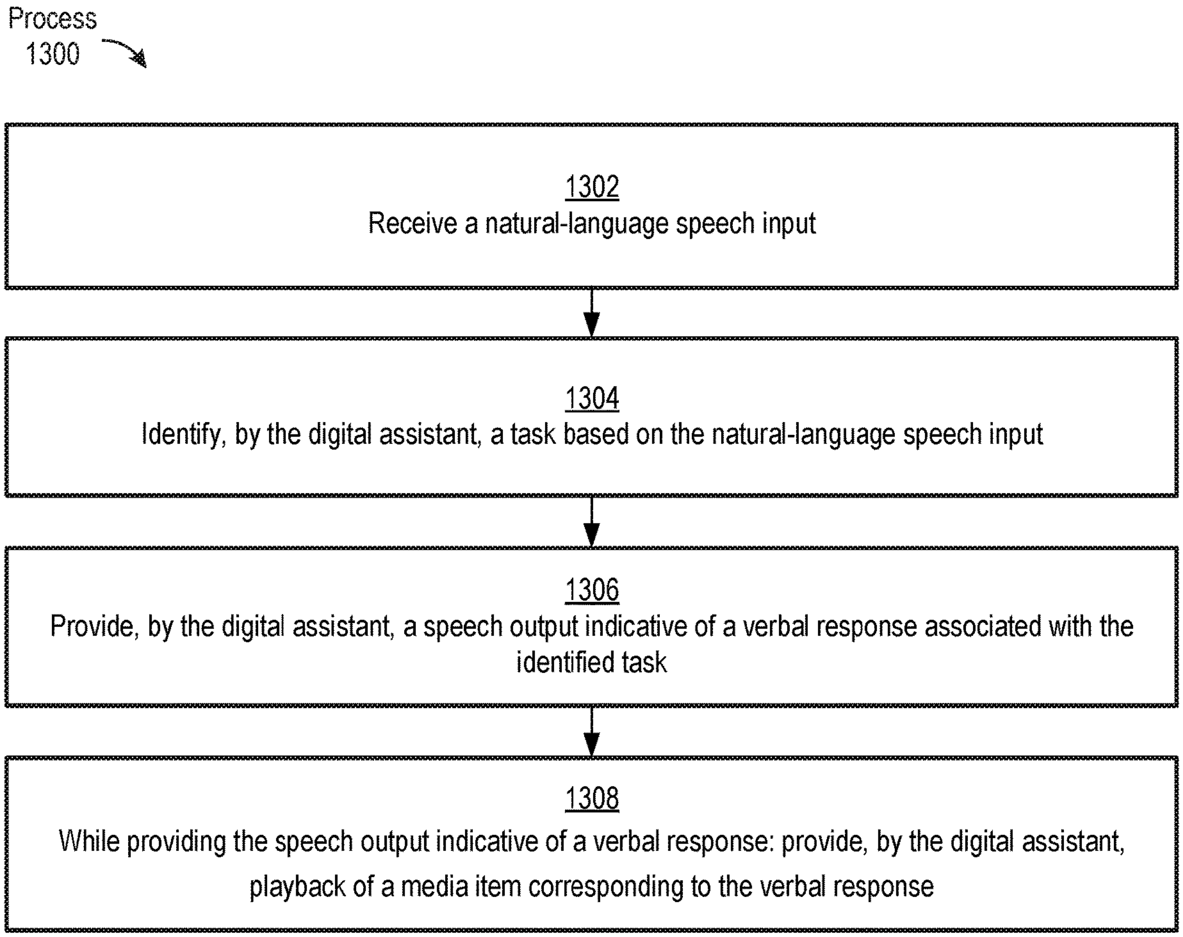
FIG. 13 illustrates a process for providing an auditory-based interface of a digital assistant, according to various examples.

FIG. 13 illustrates process 1300 for providing an auditory-based interface of a digital assistant, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

At block 1302, the electronic device receives a natural-language speech input. In some examples, the natural-language speech input is indicative of a request for one or more media items.

At block 1304, the electronic device (or the digital assistant of the electronic device) identifies a task based on the natural-language speech input. In some examples, identifying the task comprises: obtaining a text string based on the natural-language speech input; interpreting the text string to obtain a representation of user intent; and determining the task based on the representation of user intent.

In some examples, identifying the task based on the natural-language speech input comprises identifying a task of providing one or more media items. In some examples, the electronic device identifies a media item (hereinafter "the second media item") based on the speech input and obtains information corresponding to the media item (e.g., by performing the identified task). In some examples, the second media item comprises: a song, an audio book, a podcast, a station, a playlist, or a combination thereof. In some other examples, the electronic device performs the task to obtain one or more results (e.g., search results).

At block 1306, the electronic device (or the digital assistant of the electronic device) provides a speech output indicative of a verbal response associated with the identified task. In some examples, providing the speech output comprises providing a verbal description of the second media item. In some examples, the speech output is provided in a voice of the digital assistant, a voice associated with the second media item, or a combination thereof. In some examples, providing a speech output indicative of a verbal response associated with the identified task comprises providing a speech output indicative of a verbal description of a result of the one or more results (e.g., search results).

At block 1308, while providing the speech output indicative of a verbal response, the electronic device (or the digital assistant of the electronic device) provides playback of a media item (hereinafter "the first media item") corresponding to the verbal response. In some examples, the played back media item corresponds to a portion of the second media item. For example, the played back media item is a representative sample of the second media item.

In some examples, while providing playback of the first media item, the electronic device receives a second natural-language speech input. In response to receiving the second natural-language speech input, the electronic device provides the playback of the second media item. In some examples, the playback of the second media item is provided at a different volume from the playback of the first media item.

In some examples, the speech output indicative of a verbal response associated with the identified task is a first speech output. While providing the playback of the second media item, the electronic device provides a second speech output.

In some examples, providing playback of a media item corresponding to the verbal response comprises providing playback of a sound effect corresponding to the result. In some examples, the speech output indicative of a verbal response associated with the identified task is provided at a first volume, and the playback of a media item (e.g., sound effect) is provided at a second volume different from the first volume.

In some examples, the electronic device is a computer, a set-top box, a speaker, a smart watch, a phone, or a combination thereof.

The operations described above with reference to FIG. 13 are optionally implemented by components depicted in FIGS. 1-4, 6A-6B, and 7A-7C. For example, the operations of process 1300 may be implemented by any device, or component thereof, described herein, including but not limited to, devices 104, 200, 400, 600, 800, 900, 1000, and 1100. It would be clear to a person having ordinary skill in the art how other processes are implemented based on the components depicted in FIGS. 1-4, 6A-6B, and 7A-7C.

Figure 14:
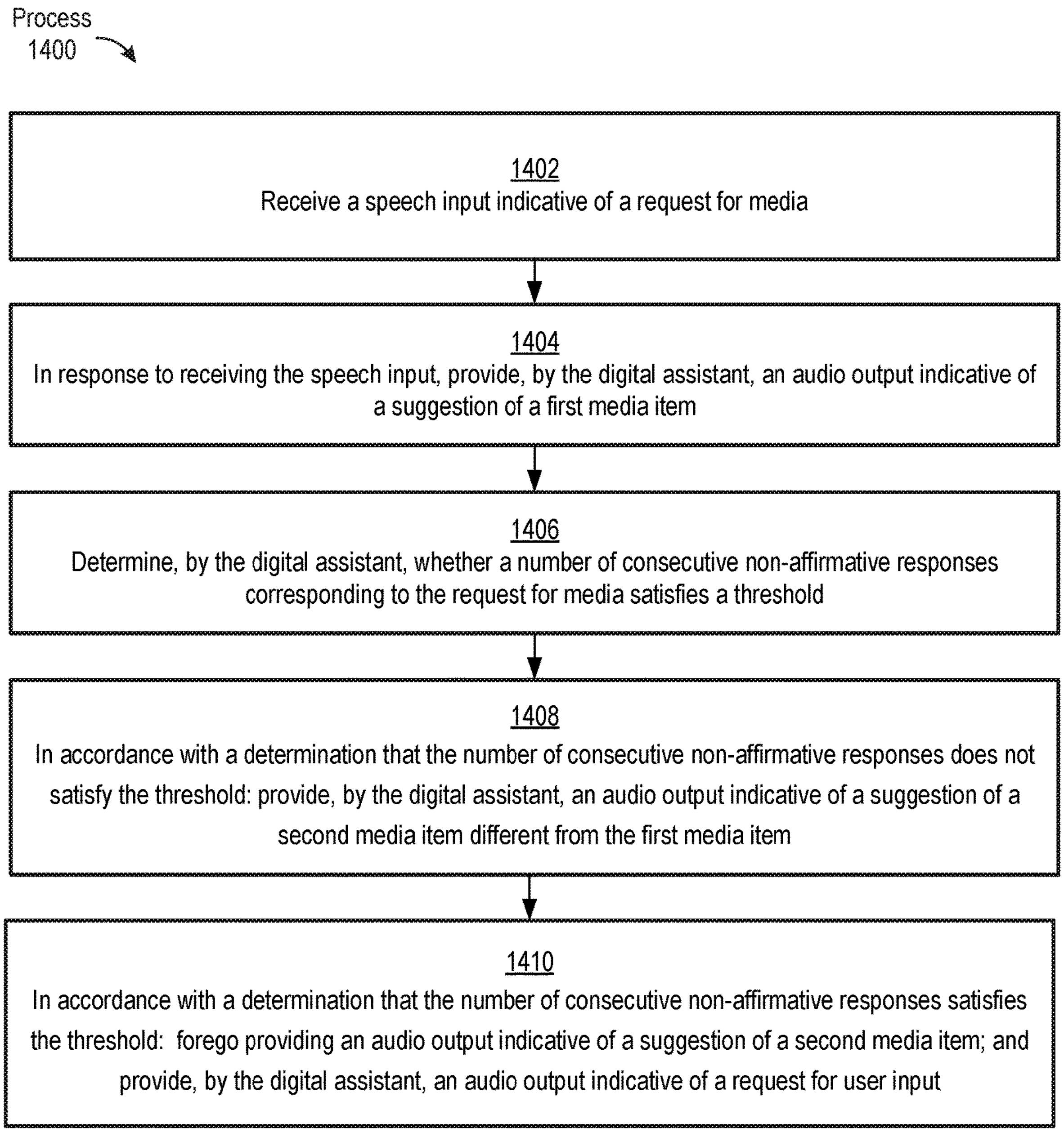
FIG. 14 illustrates a process for providing an auditory-based interface of a digital assistant, according to various examples.

FIG. 14 illustrates process 1400 for providing an auditory-based interface of a digital assistant, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

At block 1402, the electronic device receives a speech input indicative of a request for media. In some examples, the electronic device obtains, based on the speech input indicative of the request for media, a text string. In some examples, the electronic device further determines, based on the obtained text string, a representation of user intent and obtains, based on the representation of user intent, information related to one or more media items.

At block 1404, in response to receiving the speech input, the electronic device (or the digital assistant of the electronic device) provides an audio output indicative of a suggestion of a first media item. In some examples, the first media item is part of the one or more media items. In some examples, the first media item is a song, an audio book, a podcast, a station, a playlist, or any combination thereof.

At block 1406, the electronic device (or the digital assistant of the electronic device) determines whether a number of consecutive non-affirmative responses corresponding to the request for media satisfies a threshold.

In some examples, the speech input indicative of the request for media is a first speech input. Further, determining whether the number of consecutive non-affirmative responses corresponding to the request for media satisfies the threshold comprises: after providing the audio output indicative of the suggestion of the first media item, receiving a second speech input; and determining whether the second speech input is indicative of a non-affirmative response corresponding to the request for media. Further, in accordance with a determination that the second speech input is indicative of a non-affirmative response, the electronic device updates the number of consecutive non-affirmative responses corresponding to the request. In accordance with a determination that the second speech input is not indicative of a non-affirmative response, the electronic device foregoes updating the number of consecutive non-affirmative responses corresponding to the request.

In some examples, determining whether the second speech input is indicative of a non-affirmative response to the request for media comprises: determining whether the second speech input is indicative of a rejection.

In some examples, determining whether the number of consecutive non-affirmative responses corresponding to the request for media satisfies the threshold comprises: after providing the audio output indicative of the suggestion of the first media item, determining that a response corresponding to the request is not received within a predefined period of time. Determining whether the number of consecutive non-affirmative responses corresponding to the request for media satisfies the threshold further comprises: updating the number of consecutive non-affirmative responses corresponding to the request.

At block 1408, in accordance with a determination that the number of consecutive non-affirmative responses does not satisfy the threshold, the electronic device (or the digital assistant of the electronic device) provides an audio output indicative of a suggestion of a second media item different from the first media item. In some examples, the second media item is part of the one or more media items. In some examples, the second media item is a song, an audio book, a podcast, a station, a playlist, or any combination thereof.

At block 1410, in accordance with a determination that the number of consecutive non-affirmative responses satisfies the threshold, the electronic device (or the digital assistant of the electronic device) foregoes providing an audio output indicative of a suggestion of a second media item and provides an audio output indicative of a request for user input.

In some examples, providing an audio output indicative of a request for user input comprises: providing, by the digital assistant, a speech output indicative of a prompt for a user selection among a plurality of media items previously suggested by the digital assistant. In some examples, after providing the audio output indicative of a request for user input, the electronic device receives a speech input indicative of a user selection and interprets, based on context information, the speech input indicative of the user selection. In some examples, the context information includes the plurality of media items previously suggested by the digital assistant.

In some examples, providing an audio output indicative of a request for user input comprises: providing, by the digital assistant, a speech output indicative of a prompt for one or more parameters for the request for media. In some examples, after providing the audio output indicative of a request for user input, the electronic device receives a speech input indicative of one or more parameters for the request for media. In some examples, the electronic device obtains a third media item based on the one or more parameters. The third media item is different from the first media item and the second media item.

In some examples, the electronic device is a computer, a set-top box, a speaker, a smart watch, a phone, or a combination thereof.

The operations described above with reference to FIG. 14 are optionally implemented by components depicted in FIGS. 1-4, 6A-6B, and 7A-7C. For example, the operations of process 1400 may be implemented by any device, or component thereof, described herein, including but not limited to, devices 104, 200, 400, 600, 800, 900, 1000, and 1100. It would be clear to a person having ordinary skill in the art how other processes are implemented based on the components depicted in FIGS. 1-4, 6A-6B, and 7A-7C.

Figure 15:
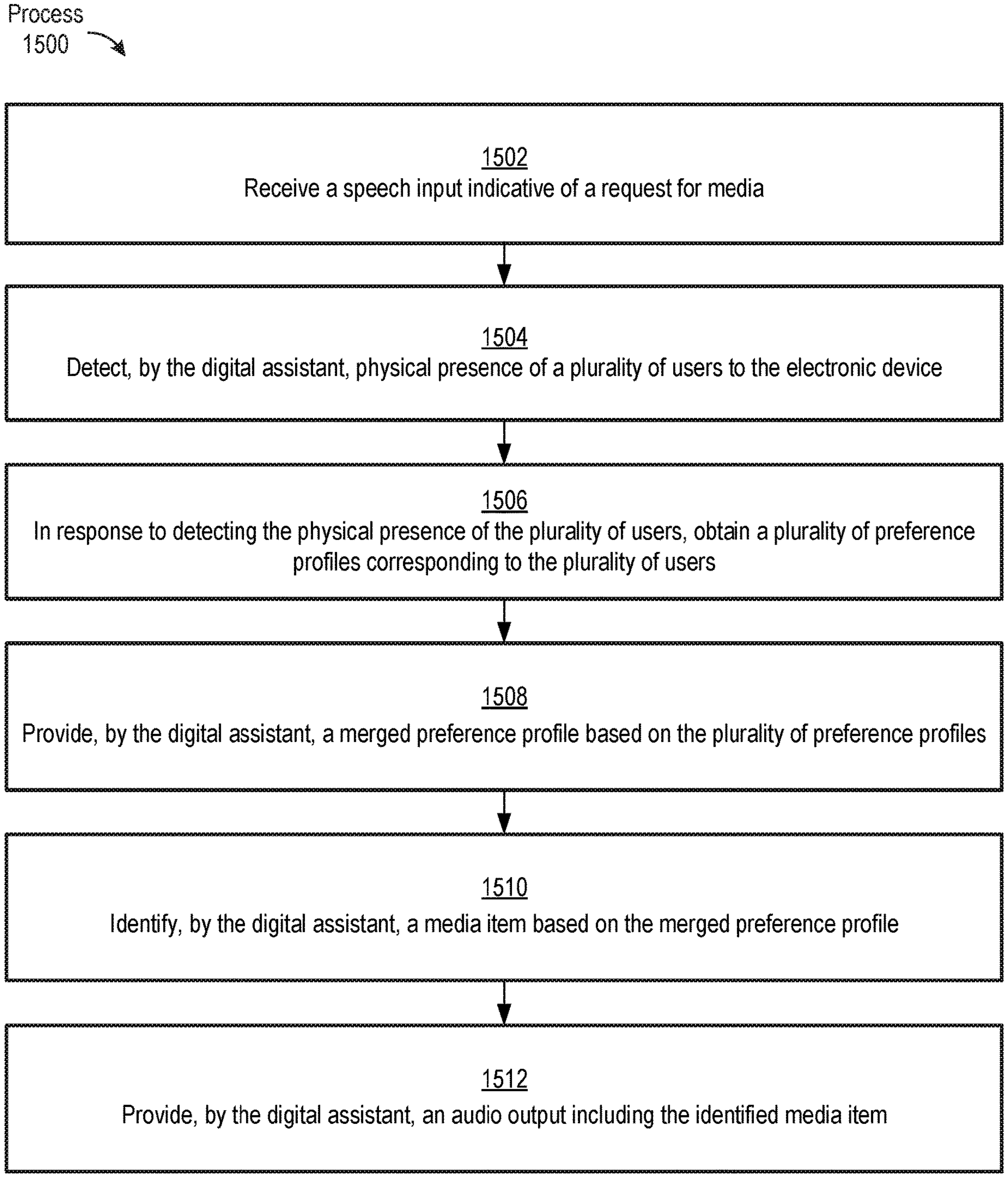
FIG. 15 illustrates a process for providing an auditory-based interface of a digital assistant, according to various examples.

FIG. 15 illustrates process 1500 for providing an auditory-based interface of a digital assistant, according to various examples. Process 1500 is performed, for example, using one or more electronic devices implementing a digital assistant. In some examples, process 1500 is performed using a client-server system (e.g., system 100), and the blocks of process 1500 are divided up in any manner between the server (e.g., DA server 106) and a client device. In other examples, the blocks of process 1500 are divided up between the server and multiple client devices (e.g., a mobile phone and a smart watch). Thus, while portions of process 1500 are described herein as being performed by particular devices of a client-server system, it will be appreciated that process 1500 is not so limited. In other examples, process 1500 is performed using only a client device (e.g., user device 104) or only multiple client devices. In process 1500, some blocks are, optionally, combined, the order of some blocks is, optionally, changed, and some blocks are, optionally, omitted. In some examples, additional steps may be performed in combination with the process 1500.

At block 1502, the electronic device receives a speech input indicative of a request for media. At block 1504, the electronic device (or the digital assistant of the electronic device) detects physical presence of a plurality of users to the electronic device. In some examples, the electronic device is a first electronic device associated with a first user of the plurality of users. Further, detecting physical presence of the plurality of users to the electronic device comprises: receiving information corresponding to a second electronic device associated with a second user of the plurality of users.

In some examples, receiving information corresponding to the second electronic device comprises: receiving, at the first electronic device, identification information from the second electronic device. In some examples, receiving information corresponding to the second electronic device comprises: receiving identification information from a routing device, which is connected to the first electronic device and the second electronic device.

At block 1506, in response to detecting the physical presence of the plurality of users, the electronic device obtains a plurality of preference profiles corresponding to the plurality of users. In some examples, the electronic device receives a preference profile corresponding to the second user from a remote device. In other examples, the preference profile corresponding to the second user is stored on the electronic device.

At block 1508, the electronic device (or the digital assistant of the electronic device) provides a merged preference profile based on the plurality of preference profiles. In some examples, providing the merged preference profile comprises: identifying one or more preferences shared by each of the plurality of preference profiles.

At block 1510, the electronic device (or the digital assistant of the electronic device) identifies a media item based on the merged preference profile. In some examples, the identified media item is associated with metadata matching the one or more preferences. The identified media item can be a song, an audio book, a podcast, a station, a playlist, or any combination thereof.

In some examples, identifying a media item based on the merged preference profile comprises: identifying the media item from a plurality of media items. The plurality of media items comprises a first set of media items associated with the first user and a second set of media items associated with the second user. In some examples, the identified media item is not part of the first set of media items, but is part of the second set of media items.

At block 1512, the electronic device (or the digital assistant of the electronic device) provides an audio output including the identified media item. In some examples, the audio output includes a verbal description of the identified media item. In some examples, the audio output includes a speech output indicative of the merged profile.

In some examples, after detecting physical presence of the plurality of users, the electronic device (or the digital assistant of the electronic device) detects a lack of presence of the second user. After detecting the lack of presence of the second user, the electronic device updates the plurality of media items and updates the merged preference profile. In some examples, updating the plurality of media items comprises removing the media item from the plurality of media items.

In some examples, the electronic device is a computer, a set-top box, a speaker, a smart watch, a phone, or a combination thereof.

The operations described above with reference to FIG. 15 are optionally implemented by components depicted in FIGS. 1-4, 6A-6B, and 7A-7C. For example, the operations of process 1500 may be implemented by any device, or component thereof, described herein, including but not limited to, devices 104, 200, 400, 600, 800, 900, 1000, and 1100. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
- one or more processors;
- a memory; and
- one or more programs, wherein the one or more programs are stored in the memory and configured to be executed by the one or more processors, the one or more programs including instructions for:
  - receiving a natural-language speech input, wherein the natural-language speech input is indicative of a request for one or more media items;
  - identifying, by a digital assistant, a task of providing one or more media items based on the natural-language speech input;
  - providing, by the digital assistant, a speech output indicative of a verbal response associated with the identified task; and
  - while providing the speech output indicative of the verbal response:
    - providing, by the digital assistant, playback of a media item of the one or more media items corresponding to the verbal response.

2. The electronic device of claim 1, wherein identifying a task based on the speech input comprises:
- obtaining a text string based on the natural-language speech input;
- interpreting the text string to obtain a representation of user intent; and
- determining the task based on the representation of user intent.

3. The electronic device of claim 1, wherein the media item is a first media item, and wherein the one or more programs further include instructions for:
- identifying, based on the speech input, a second media item;
- obtaining information corresponding to the second media item.

4. The electronic device of claim 3, wherein providing the speech output indicative of the verbal response associated with the identified task comprises:
- providing a verbal description of the second media item.

5. The electronic device of claim 3, wherein the speech output indicative of a verbal response is provided in:
- a voice of the digital assistant,
- a voice associated with the second media item,
- or a combination thereof.

6. The electronic device of claim 3, wherein the first media item corresponds to a portion of the second media item.

7. The electronic device of claim 3, wherein the one or more programs further include instructions for:
- while providing playback of the first media item:
  - receiving a second natural-language speech input;
  - in response to receiving the second natural-language speech input, providing playback of the second media item.

8. The electronic device of claim 7, wherein the playback of the second media item is provided at a different volume from the playback of the first media item.

9. The electronic device of claim 3, wherein the speech output indicative of a verbal response associated with the identified task is a first speech output, and wherein the one or more programs further include instructions for:
- while providing the playback of the second media item, providing a second speech output.

10. The electronic device of claim 3, wherein the second media item comprises: a song, an audio book, a podcast, a station, a playlist, or a combination thereof.

11. The electronic device of claim 1, wherein the one or more programs further include instructions for: performing the task to obtain one or more results.

12. The electronic device of claim 11,
- wherein providing a speech output indicative of a verbal response associated with the identified task comprises: providing a speech output indicative of a verbal description of a result of the one or more results, and
- wherein providing playback of the media item corresponding to the verbal response comprises: providing playback of a sound effect corresponding to the result.

13. The electronic device of claim 11, wherein the one or more results includes the media item, and wherein the media item is identified based on a user-specific corpus.

14. The electronic device of claim 1, wherein the speech output is provided at a first volume, and wherein the playback of a media item is provided at a second volume different from the first volume.

15. The electronic device of claim 1, wherein the electronic device is a computer, a set-top box, a speaker, a smart watch, a phone, or a combination thereof.

16. The electronic device of claim 1, wherein the verbal response includes information corresponding to the media item, and wherein the information is identified based on the natural language input and a user-specific corpus.

17. The electronic device of claim 16, wherein the user-specific corpus is generated based on data associated with the user, wherein the data associated with the user includes at least one of: previous requests, previous selections, previous rejections, previous user purchases, and/or user-specific playlists.

18. A method for operating a digital assistant, comprising:
at an electronic device with one or more processors and memory:
receiving a natural-language speech input, wherein the natural-language speech input is indicative of a request for one or more media items;
identifying, by the digital assistant, a task of providing one or more media items based on the natural-language speech input;
providing, by the digital assistant, a speech output indicative of a verbal response associated with the identified task; and
while providing the speech output indicative of the verbal response:
providing, by the digital assistant, playback of a media item of the one or more media items corresponding to the verbal response.

19. The method of claim 18, wherein the media item is a first media item, and further comprising:
identifying, based on the speech input, a second media item;
obtaining information corresponding to the second media item.

20. The method of claim 19, wherein providing the speech output indicative of the verbal response associated with the identified task comprises:
providing a verbal description of the second media item.

21. The method of claim 19, wherein the speech output indicative of a verbal response is provided in:
a voice of the digital assistant,
a voice associated with the second media item,
or a combination thereof.

22. The method of claim 19, further comprising:
while providing playback of the first media item:
receiving a second natural-language speech input;
in response to receiving the second natural-language speech input, providing playback of the second media item.

23. The method of claim 19, wherein the speech output indicative of a verbal response associated with the identified task is a first speech output, and further comprising:
while providing the playback of the second media item, providing a second speech output.

24. The method of claim 18, further comprising performing the task to obtain one or more results,
wherein providing a speech output indicative of a verbal response associated with the identified task comprises: providing a speech output indicative of a verbal description of a result of the one or more results, and
wherein providing playback of the media item corresponding to the verbal response comprises: providing playback of a sound effect corresponding to the result.

25. The method of claim 18, wherein the speech output is provided at a first volume, and wherein the playback of a media item is provided at a second volume different from the first volume.

26. The method of claim 18, wherein the verbal response includes information corresponding to the media item, and wherein the information is identified based on the natural language input and a user-specific corpus.

27. The method of claim 26, wherein the user-specific corpus is generated based on data associated with the user, wherein the data associated with the user includes at least one of: previous requests, previous selections, previous rejections, previous user purchases, and/or user-specific playlists.

28. A non-transitory computer-readable storage medium storing one or more programs, the one or more programs comprising instructions, which when executed by one or more processors of an electronic device, cause the electronic device to:
receive a natural-language speech input, wherein the natural-language speech input is indicative of a request for one or more media items;
identify, by a digital assistant, a task of providing one or more media items based on the natural-language speech input;
provide, by the digital assistant, a speech output indicative of a verbal response associated with the identified task; and
while providing the speech output indicative of the verbal response:
provide, by the digital assistant, playback of a media item of the one or more media items corresponding to the verbal response.

29. The non-transitory computer-readable storage medium of claim 28, wherein the media item is a first media item, and wherein the one or more programs further comprise instructions, which when executed by the one or more processors of the electronic device, further cause the electronic device to:
identify, based on the speech input, a second media item;
obtain information corresponding to the second media item.

30. The non-transitory computer-readable storage medium of claim 29, wherein providing the speech output indicative of the verbal response associated with the identified task comprises:
providing a verbal description of the second media item.

31. The non-transitory computer-readable storage medium of claim 29, wherein the speech output indicative of a verbal response is provided in:
a voice of the digital assistant,
a voice associated with the second media item,
or a combination thereof.

32. The non-transitory computer-readable storage medium of claim 29, wherein the one or more programs further comprise instructions, which when executed by the one or more processors of the electronic device, further cause the electronic device to:
while providing playback of the first media item:
receive a second natural-language speech input;
in response to receiving the second natural-language speech input, provide playback of the second media item.

33. The non-transitory computer-readable storage medium of claim 29, wherein the speech output indicative of a verbal response associated with the identified task is a first speech output, and wherein the one or more programs further comprise instructions, which when executed by the one or more processors of the electronic device, further cause the electronic device to:
while providing the playback of the second media item, provide a second speech output.

34. The non-transitory computer-readable storage medium of claim 28, wherein the one or more programs further comprise instructions, which when executed by the one or more processors of the electronic device, further cause the electronic device to, perform the task to obtain one or more results, wherein providing a speech output indicative of a verbal response associated with the identified task comprises: providing a speech output indicative of a verbal description of a result of the one or more results, and wherein providing playback of the media item corresponding to the verbal response comprises: providing playback of a sound effect corresponding to the result.

35. The non-transitory computer-readable storage medium of claim 28, wherein the speech output is provided at a first volume, and wherein the playback of a media item is provided at a second volume different from the first volume.

36. The non-transitory computer-readable storage medium of claim 28, wherein the verbal response includes information corresponding to the media item, and wherein the information is identified based on the natural language input and a user-specific corpus.

37. The non-transitory computer-readable storage medium of claim 36, wherein the user-specific corpus is generated based on data associated with the user, wherein the data associated with the user includes at least one of: previous requests, previous selections, previous rejections, previous user purchases, and/or user-specific playlists.

* * * * *